US012585469B2

(12) United States Patent
Vuyyuru et al.

(10) Patent No.: US 12,585,469 B2
(45) Date of Patent: Mar. 24, 2026

(54) TRACE CACHE ACCESS PREDICTION AND READ ENABLE

(71) Applicant: Apple Inc., Cupertino, CA (US)

(72) Inventors: Pruthivi Vuyyuru, Santa Clara, CA (US); Niket K. Choudhary, Santa Clara, CA (US); Muawya M. Al-Otoom, Lake Oswego, OR (US); Ilhyun Kim, Portland, OR (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 18/627,035

(22) Filed: Apr. 4, 2024

(65) Prior Publication Data

US 2025/0315263 A1     Oct. 9, 2025

(51) Int. Cl.
| | |
|---|---|
| *G06F 9/38* | (2018.01) |
| *G06F 9/30* | (2018.01) |
| *G06F 12/0811* | (2016.01) |
| *G06F 12/0875* | (2016.01) |

(52) U.S. Cl.
CPC ........ *G06F 9/3806* (2013.01); *G06F 9/30047* (2013.01); *G06F 9/3808* (2013.01); *G06F 12/0811* (2013.01); *G06F 12/0875* (2013.01)

(58) Field of Classification Search
CPC ............... G06F 9/3806; G06F 9/30047; G06F 9/3808; G06F 12/0811; G06F 12/0875
See application file for complete search history.

(56) References Cited

U.S. PATENT DOCUMENTS

| | | | | | |
|---|---|---|---|---|---|
| 6,014,742 | A | * | 1/2000 | Krick | G06F 9/3808 |
| | | | | | 712/236 |
| 6,055,630 | A | | 4/2000 | D'Sa et al. | |
| 6,101,577 | A | | 8/2000 | Tran | |
| 7,555,633 | B1 | | 6/2009 | Smaus et al. | |
| 7,822,925 | B2 | | 10/2010 | Morrow | |
| 7,966,479 | B1 | | 6/2011 | Thaik et al. | |
| 8,069,336 | B2 | | 11/2011 | Alsup et al. | |
| 8,719,806 | B2 | | 5/2014 | Wang et al. | |
| 9,311,098 | B2 | * | 4/2016 | Hall | G06F 12/0864 |
| 9,965,280 | B2 | | 5/2018 | Spear et al. | |
| 10,445,102 | B1 | * | 10/2019 | Pistol | G06F 9/3832 |
| 10,459,824 | B2 | | 10/2019 | Mola | |
| 10,496,537 | B2 | | 12/2019 | Mola | |
| 10,747,539 | B1 | | 8/2020 | Hakewill et al. | |
| 11,288,071 | B2 | | 3/2022 | Homer | |

(Continued)

*Primary Examiner* — Shawn Doman

(74) *Attorney, Agent, or Firm* — Kowert, Hood, Munyon, Rankin & Goetzel, P.C.; Michael B. Davis; Dean M. Munyon

(57) ABSTRACT

Disclosed embodiments relate to predicting when a fetch address will hit in a trace cache, e.g., to reduce power consumption when a hit is not predicted. In some embodiments, a processor caches instructions sequentially in a given cache line of instruction cache circuitry. The processor may identify traces of instructions that satisfy one or more criteria and store identified traces in a trace cache. The processor may predict whether a fetch address will hit in the trace cache circuitry. The processor may read in response to a prediction that the fetch address will not hit in the trace cache, instruction data from the instruction cache circuitry and not the trace cache circuitry for the fetch address. The processor may reduce power to (e.g., clock gate) portions of the trace cache circuitry in this scenario.

20 Claims, 29 Drawing Sheets

*Example pipeline portion with trace cache*

(56)          References Cited

U.S. PATENT DOCUMENTS

| | | | |
|---|---|---|---|
| 12,288,075 B1* | 4/2025 | DiTomaso | G06F 9/3861 |
| 2001/0049782 A1 | 12/2001 | Hsu et al. | |
| 2003/0126366 A1* | 7/2003 | Jourdan | G06F 9/3802 |
| | | | 712/E9.055 |
| 2004/0154011 A1 | 8/2004 | Wang et al. | |
| 2004/0193857 A1 | 9/2004 | Miller et al. | |
| 2005/0125632 A1 | 6/2005 | Alsup et al. | |
| 2005/0138341 A1 | 6/2005 | Maiyuran et al. | |
| 2005/0149709 A1 | 7/2005 | Jourdan | |
| 2007/0083735 A1 | 4/2007 | Glew | |
| 2007/0162895 A1 | 7/2007 | Altman et al. | |
| 2008/0086597 A1 | 4/2008 | Davis et al. | |
| 2008/0114964 A1 | 5/2008 | Davis et al. | |
| 2011/0078425 A1 | 3/2011 | Shah et al. | |
| 2014/0075156 A1 | 3/2014 | Blasco-Allue et al. | |
| 2014/0082327 A1 | 3/2014 | Ghose | |
| 2015/0046682 A1 | 2/2015 | Heil et al. | |
| 2015/0205725 A1 | 7/2015 | Al-Otoom et al. | |
| 2017/0277538 A1 | 9/2017 | Friedmann et al. | |
| 2018/0285114 A1 | 10/2018 | Shah et al. | |
| 2019/0286218 A1* | 9/2019 | Blasco | G06F 9/3802 |
| 2020/0167164 A1 | 5/2020 | Jarvis et al. | |
| 2023/0023860 A1* | 1/2023 | Holman | G06F 9/3806 |
| 2023/0222066 A1 | 7/2023 | Karve et al. | |
| 2024/0118895 A1* | 4/2024 | Zhang | G06F 9/30047 |
| 2024/0201998 A1* | 6/2024 | Abulila | G06F 9/3806 |
| 2024/0231887 A1* | 7/2024 | Ma | G06F 12/0862 |

* cited by examiner

*Example pipeline portion with trace cache*

Branch predictor(s) *130*

*Fetch PC*

⋮

*Next fetch PC MUX 140*

Instruction cache tag *125*

Instruction cache *120*

*iTLB 135*

Trace cache tag *115*

Trace cache *110*

155

Decode *160*

⋯

*Stitch logic and stitch queue 150*

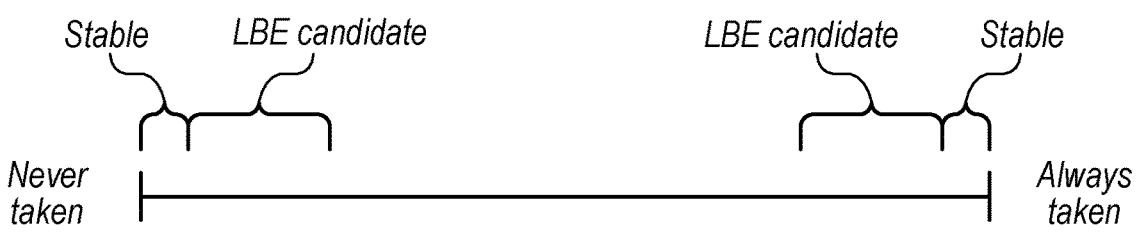

Stable          LBE candidate                    LBE candidate          Stable

Never taken                                                            Always taken

*FIG. 2A*

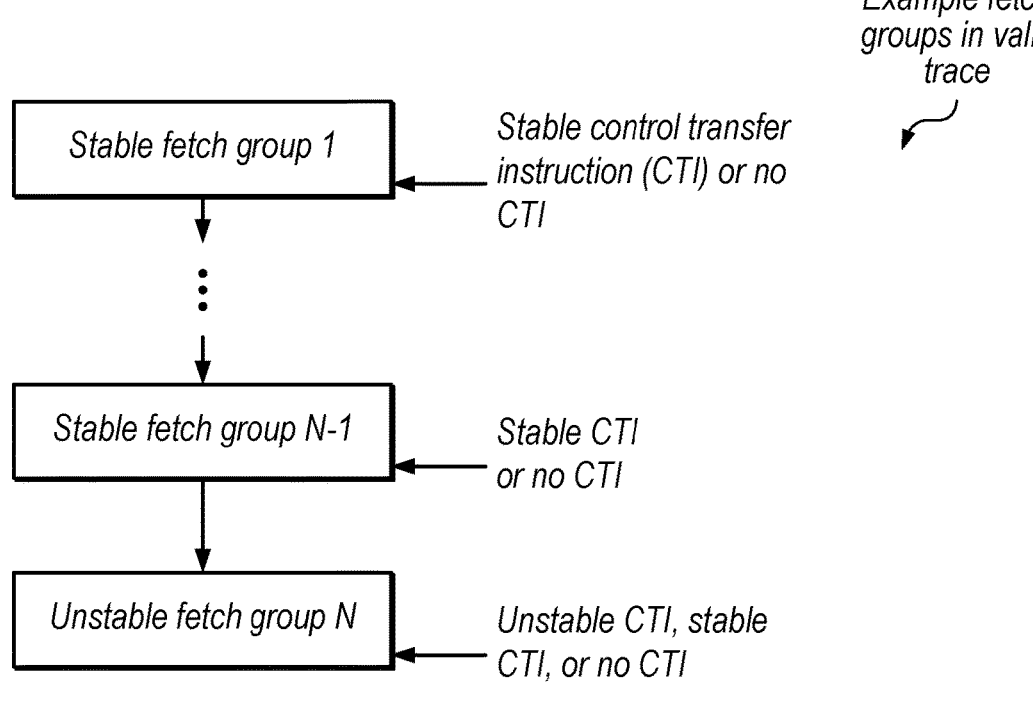

*Example fetch groups in valid trace*

Stable fetch group 1 — Stable control transfer instruction (CTI) or no CTI

Stable fetch group N-1 — Stable CTI or no CTI

Unstable fetch group N — Unstable CTI, stable CTI, or no CTI

*FIG. 2B*

*Example fields of trace cache entry*

| Tag 310 | Valid 320 | Trace data (up to N instructions from up to M fetch groups) 330 | Replacement 340 |
|---|---|---|---|

*FIG. 3*

*Next fetch PC MUX*
*140*

*Predicted PC after current fetch group*

*Next fetch predictor*
*410*

*Sequential next PC*

*Trace next fetch predictor*
*420*

*Predicted PC after end of hit trace (multiple fetch groups away)*

*In "less-stable before end" (LBE) embodiments, less-stable control transfer instruction(s) allowed in one or more locations mid-trace*

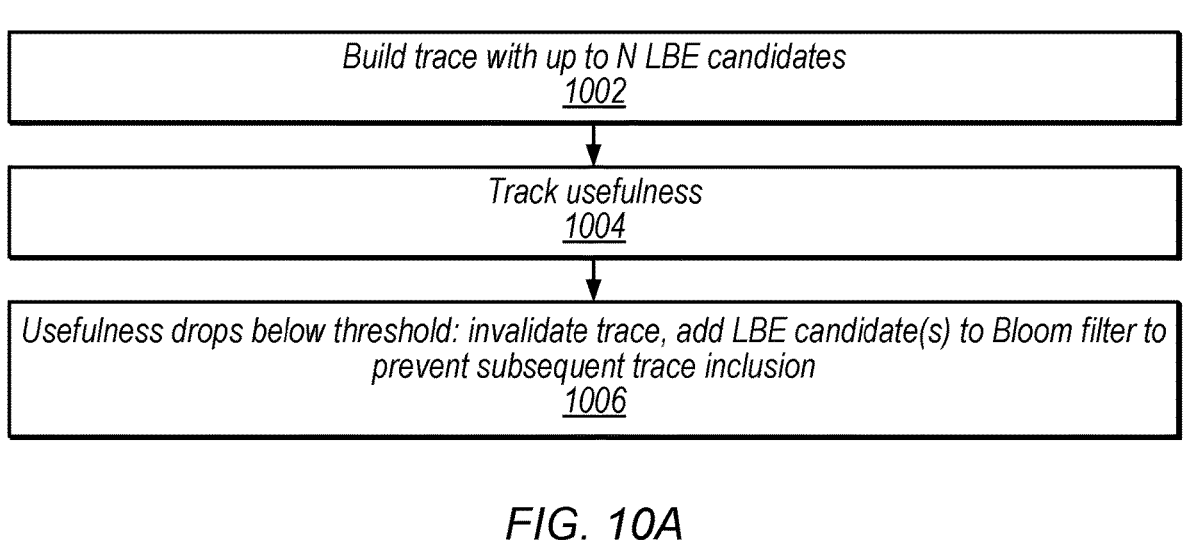

| Build trace with up to N LBE candidates 1002 |
| --- |
| Track usefulness 1004 |
| Usefulness drops below threshold: invalidate trace, add LBE candidate(s) to Bloom filter to prevent subsequent trace inclusion 1006 |

*FIG. 10A*

*Example fields of trace cache entry*

| Tag 310 | Valid 320 | Trace data (up to N instructions from up to M fetch groups) 330 | Usefulness 1040 | LBE? 1010 | Position 1020 |
| --- | --- | --- | --- | --- | --- |

*FIG. 10B*

*Example fields of trace NFP entry*

| Tag 610 | Predicted next fetch address after end of trace 620 | Pre-hashed history token 630 | LBE prediction 1012 |
| --- | --- | --- | --- |

*FIG. 10C*

*Example trace cache instruction array that supports multiple trace lengths*

| Trace instructions 1310 | Extended entry? 1320 | Pointer 1330 |
|---|---|---|
| Trace A instructions | No | - |
| Trace B instructions | Yes | Index X |

| Overflow buffer 1340 |
|---|
| Additional trace B instructions |
| |

*Example trace cache implementation with wider traces in certain arrays only*

Trace width up to N

L1 trace cache *1110*

Promotion (for non-extended entries only)

| Ext? 1440 | Fast array *1240* |
|---|---|

Trace width up to N + M

Trace prefetching

| L2 instruction array *1410* | Ext? 1420 | PTR 1430 |
|---|---|---|

Width N

Overflow buffer *1340*

Overflow width M

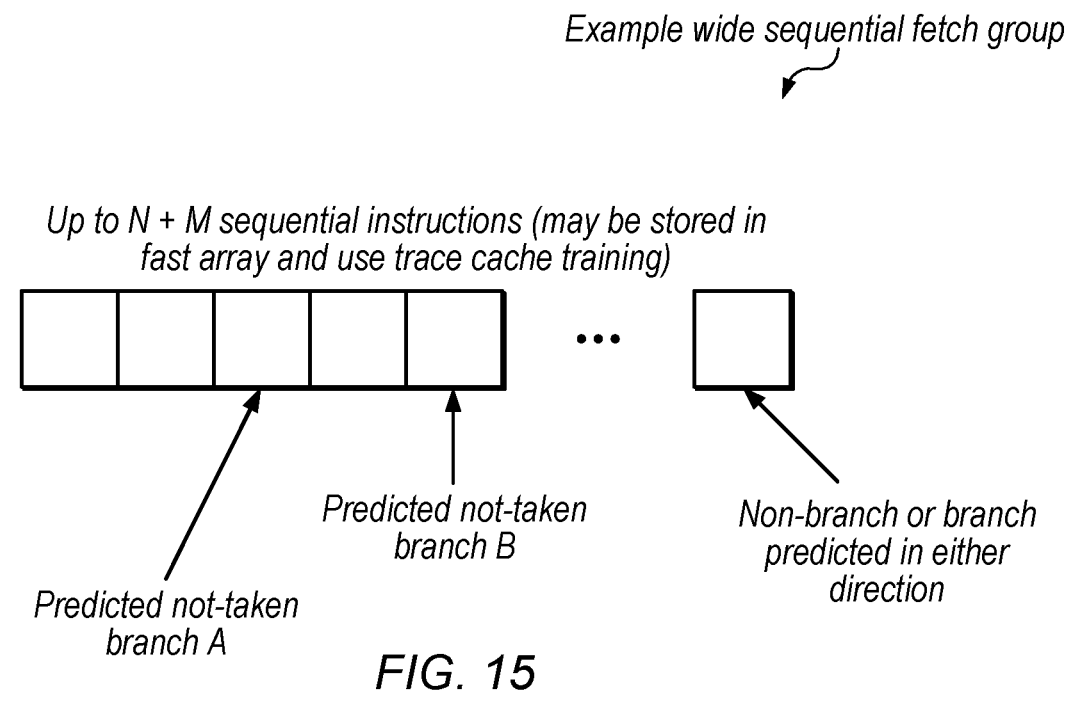

*Example wide sequential fetch group*

*Up to N + M sequential instructions (may be stored in fast array and use trace cache training)*

*Predicted not-taken branch B*

*Non-branch or branch predicted in either direction*

*Predicted not-taken branch A*

*FIG. 15*

*Example relevant states for up to three branches in wide sequential fetch group*

|  | State A | State B | State C | State D |
|---|---|---|---|---|
| Branch 0 | T | N | N | N |
| Branch 1 | X | T | N | N |
| Branch 2 | X | X | N | T |

*Example 3-bit branch
predictor counter
implementation*

*Example 3-bit branch predictor counter interpretation for wide sequential fetch groups with three unstable branches*

*Example permission change tracking (e.g., to avoid L2 flush on at least some permission changes)*

*Example trace cache power control*

*Example sequential trace cache read predictor*

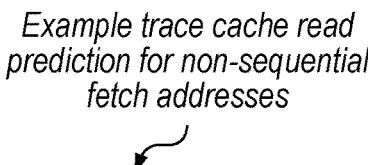
Example trace cache read prediction for non-sequential fetch addresses
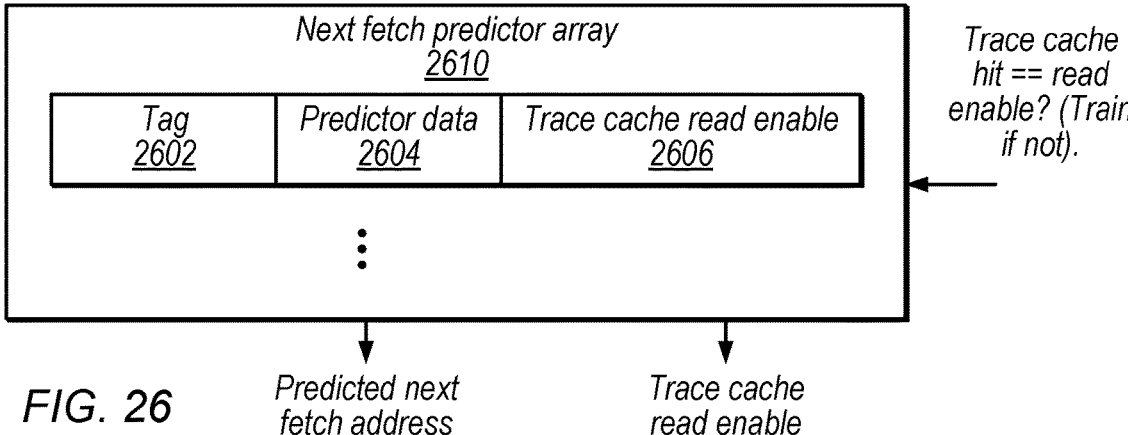
FIG. 26
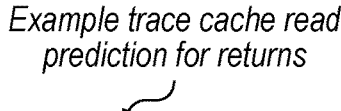
Example trace cache read prediction for returns
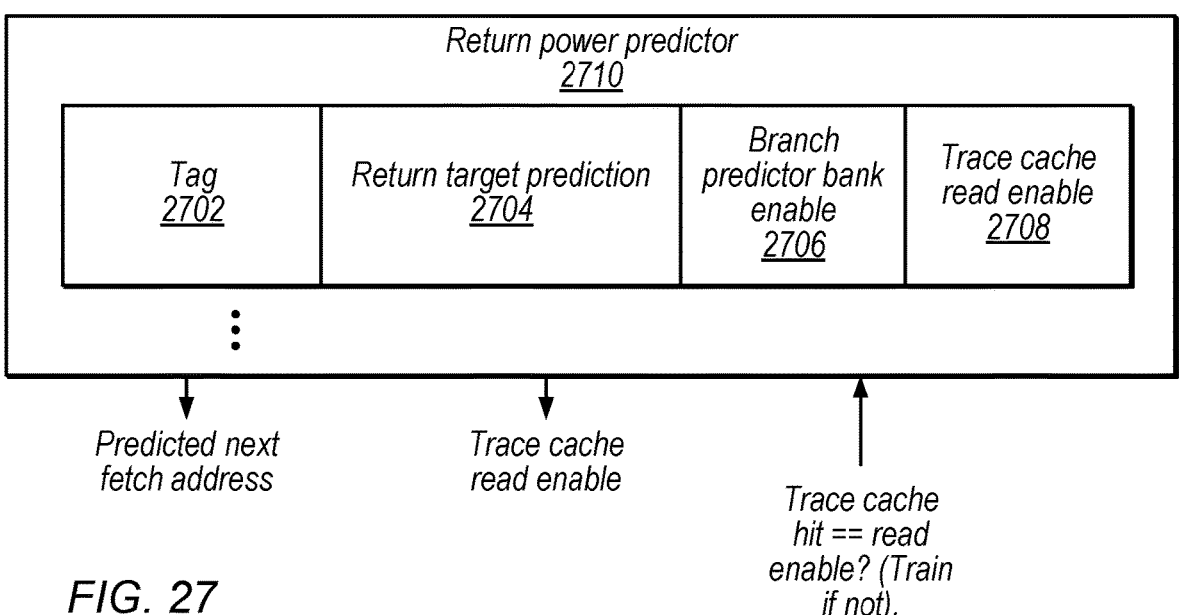
FIG. 27

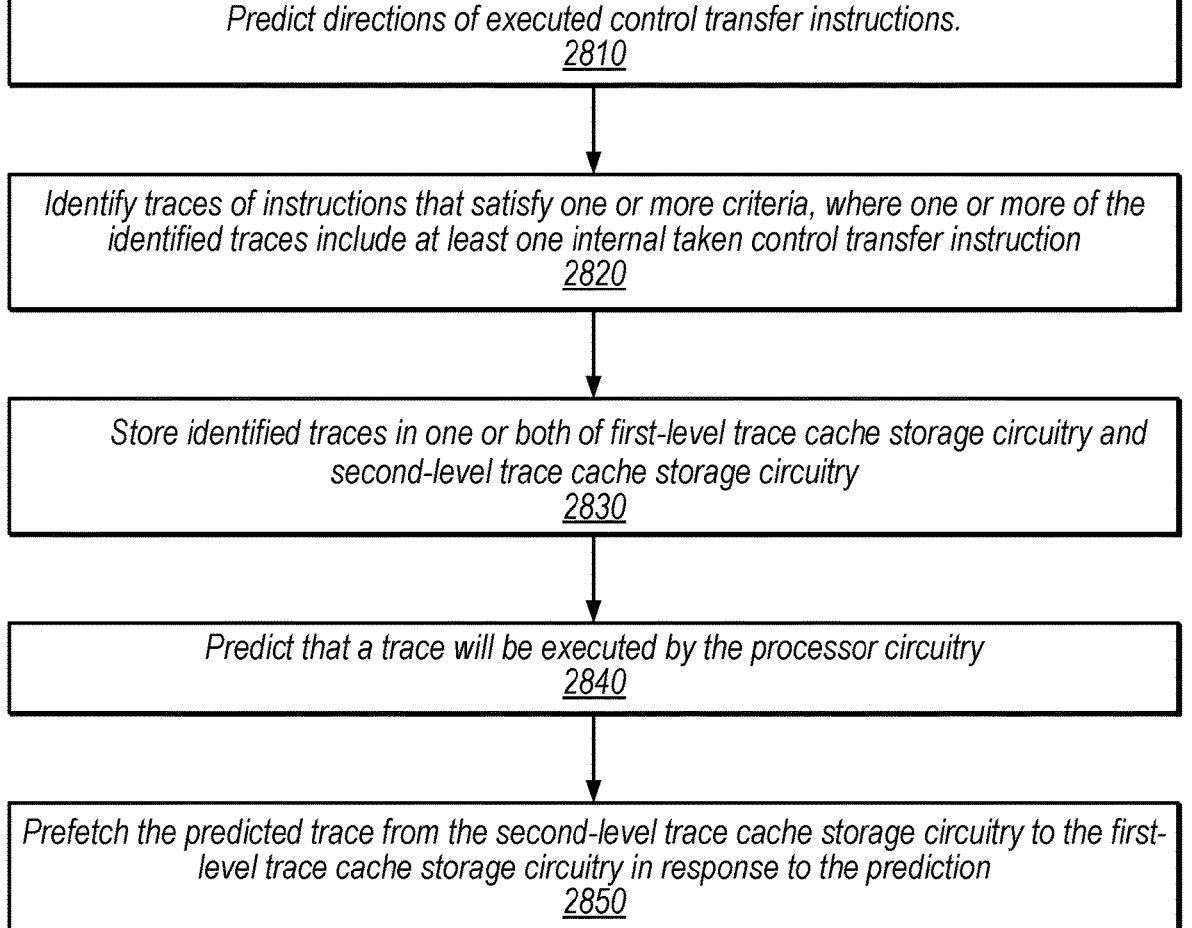

Predict directions of executed control transfer instructions.
2810

Identify traces of instructions that satisfy one or more criteria, where one or more of the identified traces include at least one internal taken control transfer instruction
2820

Store identified traces in one or both of first-level trace cache storage circuitry and second-level trace cache storage circuitry
2830

Predict that a trace will be executed by the processor circuitry
2840

Prefetch the predicted trace from the second-level trace cache storage circuitry to the first-level trace cache storage circuitry in response to the prediction
2850

FIG. 28

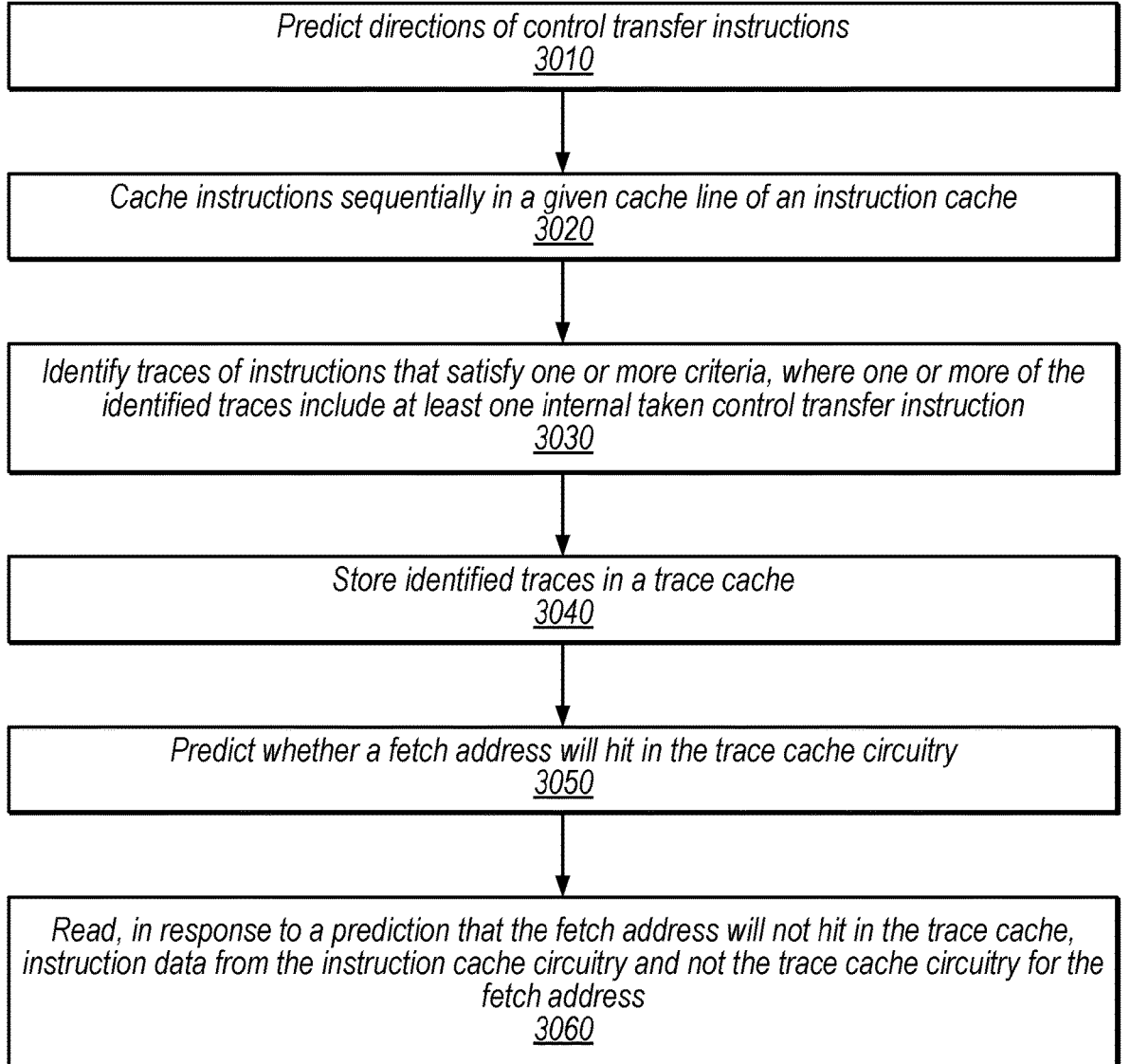

Predict directions of control transfer instructions
3010

Cache instructions sequentially in a given cache line of an instruction cache
3020

Identify traces of instructions that satisfy one or more criteria, where one or more of the identified traces include at least one internal taken control transfer instruction
3030

Store identified traces in a trace cache
3040

Predict whether a fetch address will hit in the trace cache circuitry
3050

Read, in response to a prediction that the fetch address will not hit in the trace cache, instruction data from the instruction cache circuitry and not the trace cache circuitry for the fetch address
3060

FIG. 30

TRACE CACHE ACCESS PREDICTION AND READ ENABLE

CROSS REFERENCE TO RELATED APPLICATIONS

This application is related to the following U.S. Applications filed on Apr. 4, 2024: U.S. application Ser. No. 18/626,929 and U.S. application Ser. No. 18/627,001. Each of the above-referenced applications is hereby incorporated by reference as if entirely set forth herein.

BACKGROUND

Technical Field

This disclosure relates generally to computer processor architecture and more particularly to trace caches.

Description of Related Art

Trace caches store traces of instructions, where a trace typically includes at least one internal taken branch and may end with a branch. Trace caches may substantially improve performance by increasing instruction fetch bandwidth (relative to fetching multiple times from an instruction cache) and also may reduce fetch power consumption. It may be costly when a branch unexpectedly exits a trace in the trace cache, however, and a trace cache and its control circuitry may utilize substantial processor area and power. These tradeoffs have impeded practical trace cache implementations in traditional processor designs.

BRIEF DESCRIPTION OF DRAWINGS

FIG. 2A is a diagram illustrating example branch stability categories, according to some embodiments.

FIG. 2B is a diagram illustrating example stable/unstable fetch group positions allowed in a trace, according to some embodiments.

FIG. 3 is a diagram illustrating example fields of a trace cache entry, according to some embodiments.

FIG. 10A is a diagram illustrating an example filter-based less-stable before end (LBE) trace cache technique, according to some embodiments.

FIG. 10B is a diagram illustrating another example of trace cache entry fields, according to some embodiments.

FIG. 10C is a diagram illustrating example fields of a next fetch predictor entry, according to some embodiments.

FIG. 15 is a block diagram illustrating an example wide fetch group of sequential instructions, according to some embodiments.

FIG. 26 is a block diagram illustrating example read predictor information for non-sequential addresses, according to some embodiments.

FIG. 27 is a block diagram illustrating example read predictor circuitry for return operations, according to some embodiments.

FIG. 28 is a flow diagram illustrating an example method for operating hierarchical trace caches, according to some embodiments.

FIG. 30 is a flow diagram illustrating an example method for predicting hits in a trace cache, according to some embodiments.

DETAILED DESCRIPTION

Figure 1:
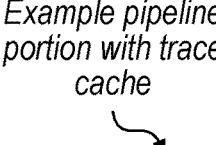
FIG. 1 is a block diagram illustrating an example processor pipeline that includes a trace cache, according to some embodiments.

The present disclosure is organized in three sections. Section I introduces various trace cache improvements and embodiment. Section II provides example trace cache implementations. Section III discusses detailed example embodiments of the techniques introduced in section I. Note that U.S. patent application Ser. No. 18/352,309 titled "Trace Cache Techniques Based on Biased Control Transfer Instructions" and filed Jul. 14, 2023 includes various discussion included in Section II of the present disclosure.

Section I—Introduction

Introduction to Hierarchical Trace Caches

The '309 application discusses example techniques in which trace cache training is constrained based on stability of branches (e.g., such that only traces with internal branches that meet a stability threshold are cached in the trace cache). Traditionally, a trace cache may be sized for performance, with restrictions on the number entries. This may allow fast trace cache access but may not provide sufficient coverage to enable all the performance increases that could be achieved by caching/tracking a larger number of traces.

Therefore, in disclosed embodiments, trace caching is implemented hierarchically, e.g., with a larger L2 trace cache implemented in addition to the trace cache described in the '309 application, which may be implemented as an L1 trace cache. The L2 trace cache may be larger than the L1 trace cache and may not provide sufficient performance to provide a trace based on the current fetch group address. Rather, in some embodiments, control circuitry is configured to predict when a trace will be executed and prefetch predicted traces from the L2 trace cache to the L1 trace cache.

The prefetching may be signature-based and utilize lookahead techniques. Further, the prefetching may use a fast array prefetch buffer between the L1 and L2 trace caches. The prefetch circuitry may also prefetch target addresses for next fetch predictor circuitry.

Note that L1 and L2 trace cache levels are discussed herein for purposes of illustration, but any appropriate number of trace cache levels may be implemented. Further, techniques discussed for a given trace cache level may be applied to other level(s) in various embodiments.

Introduction to Wide Fetch Techniques

Generally (including outside of the trace cache context), it may be desirable to fetch a greater number of instructions in each cycle. This may allow the processor front-end to keep the processor pipeline circuitry busy. This may be true for both traces and for sequences of instructions that do not include taken branches. Increasing the fetch width, however, may increase circuit area and power consumption throughout the processor front-end (e.g., instruction buffers, instruction cache lines, trace cache entries, etc. may need to be wider to handle more instructions in parallel).

Therefore, in some embodiments, the L2 trace cache discussed above is configured to cache traces having a greater number of instructions than traces in the L1 trace cache, a greater number of instructions than stored in a given cache line of an instruction cache, or both. The L2 trace cache may use the same width as the L1 trace cache for entries in its main array, with an overflow buffer for entries that use additional width (e.g., where a wide entry in the L2 trace cache includes a pointer to an entry of the overflow buffer for its extra instructions). The L2 trace cache may also store sequences of instructions that do not have any predicted-taken internal branches, to provide greater fetch width for those sequences. Usage of sequential sets of instructions may be tracked and up to a threshold number of the most-used sequences may be stored in the L2 trace cache, e.g., to avoid overwhelming trace caching.

In embodiments in which the L1 trace cache does not support wider traces, a separate buffer (which may be referred to as a "fast array") may store various prefetched trace sizes and deliver wider traces for execution under certain conditions. This may advantageously increase the overall number of instructions fetched per cycle, at least for certain workloads.

In some embodiments, branch prediction circuitry is configured to re-interpret branch predictor counter states for wide sequences of instructions (e.g., to train for internal predicted-not-taken branches). This may allow accurate predictions for those instruction sequences with limited changes to branch predictor circuitry.

Introduction to Power Prediction

Trace caches typically improve performance but also may increase processor power consumption when active. Therefore, it may be desirable to reduce power to portions of the trace cache when the trace cache will not be able to provide instructions for a current fetch address (e.g., by clock gating those portions). In disclosed embodiments, prediction circuitry predicts whether a given instruction fetch will hit in the trace cache. Prediction information may be generated in various locations, e.g., in a predictor for sequential fetch group addresses, in a branch prediction entry for non-sequential fetches, in other predictors such as a return power predictor, etc.

If a trace cache hit is not predicted, the front end may utilize the instruction cache and not the trace cache (and may clock gate parts of the trace cache). Therefore, the front-end may not read from the trace cache data array when no hit in the trace cache is predicted. The prediction circuitry may train based on over/under power situations for the trace cache, based on accurate predictions, or both. Disclosed techniques may advantageously reduce trace cache power consumption while maintaining performance, in some embodiments.

Introduction to Cache Maintenance Control Techniques

Processors may perform cache maintenance operations, which may include invalidating trace cache data. For example, instruction cache invalidates, translation lookaside buffer invalidates, or permission changes may mean that corresponding trace instructions should be invalidated.

In some disclosed embodiments, rather than flushing an entire trace cache level or tracking operations at very low-level granularity, filter circuitry is configured to determine which operations should potentially cause trace cache flushes at intermediate granularity (e.g., using Bloom filters) . This may advantageously preserve trace cache performance with limited increases in circuit area and power consumption for tracking cache maintenance operations.

Further, when invalidations are required, circuitry configured to walk the trace cache may rebuild filter information during the walk, which may reduce situations where the filter becomes stale. To properly detect permission changes, trace cache circuitry may store information to access a permission table and verify permissions before prefetching trace data to another trace cache level.

Note that various techniques described herein are relevant to both trace caches that use bias/stability such as examples described in the '309 application as well as traditional trace caches. As non-limiting examples, disclosed techniques relating to hierarchical trace caches, trace prefetching, handling cache maintenance operations, and power prediction may be implemented in trace cache embodiment that do not impose stability/bias constraints on internal branches.

Section II—Trace Cache Examples

Overview and Brief Outline of this Section

Figure 5:
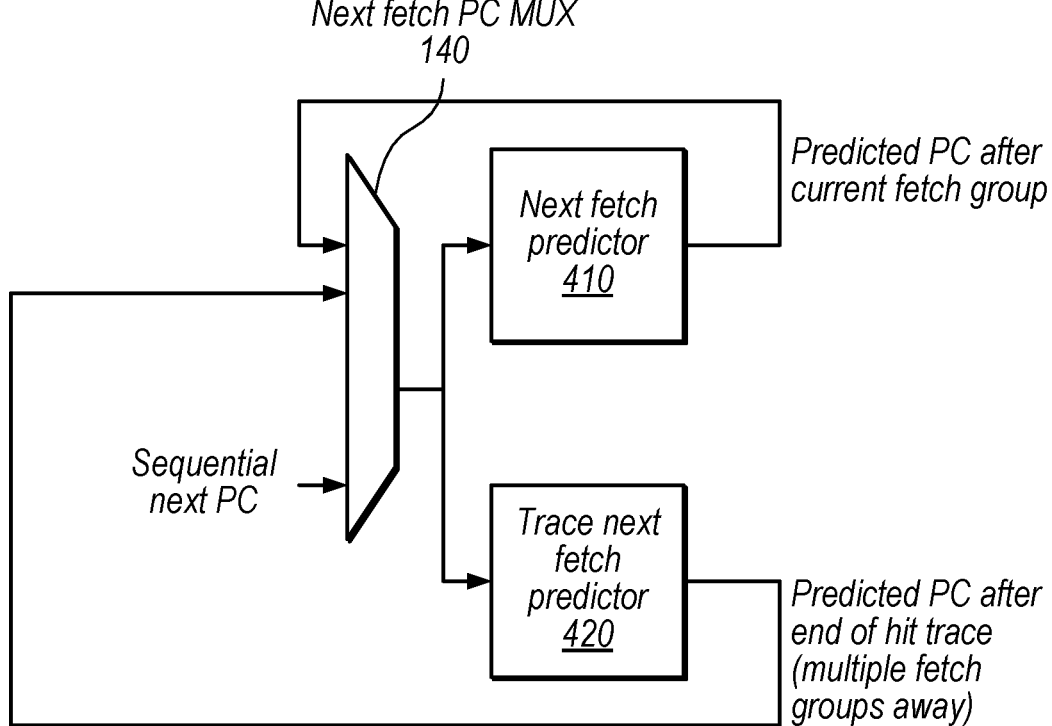
FIG. 5 is a block diagram illustrating an example trace next fetch predictor, according to some embodiments.
Figure 6:
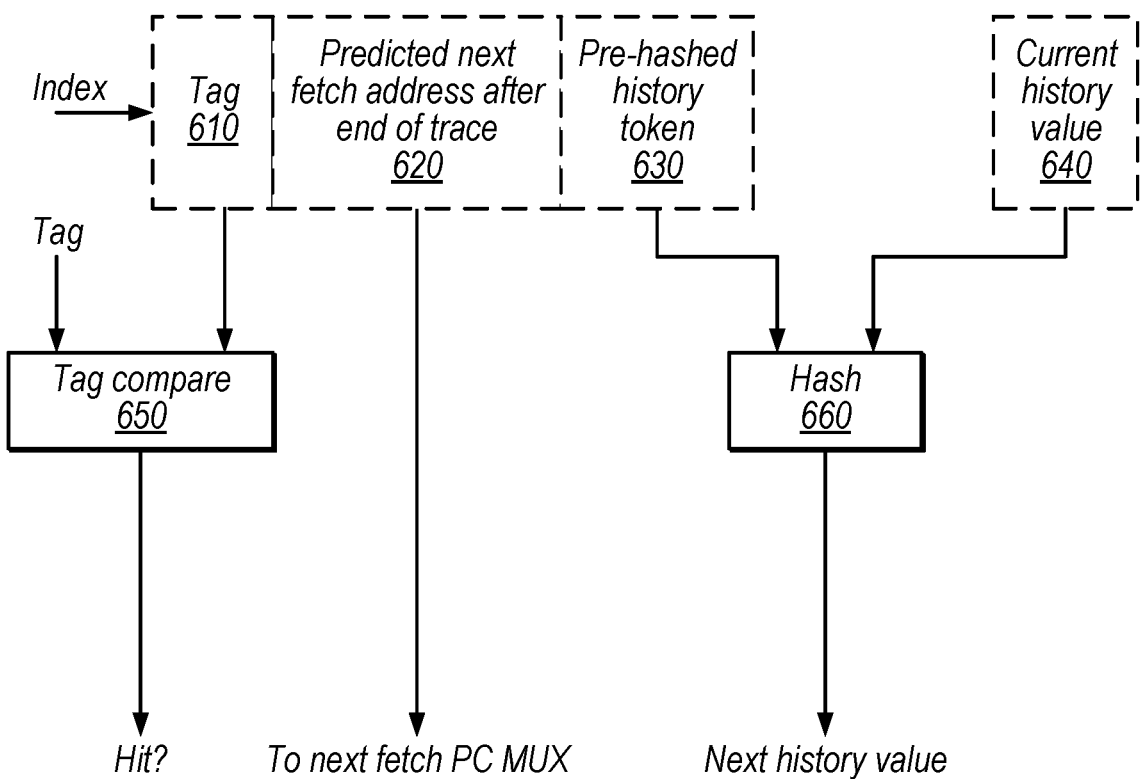
FIG. 6 is a block diagram illustrating an example pre-hashed branch history token, according to some embodiments.
Figure 7:
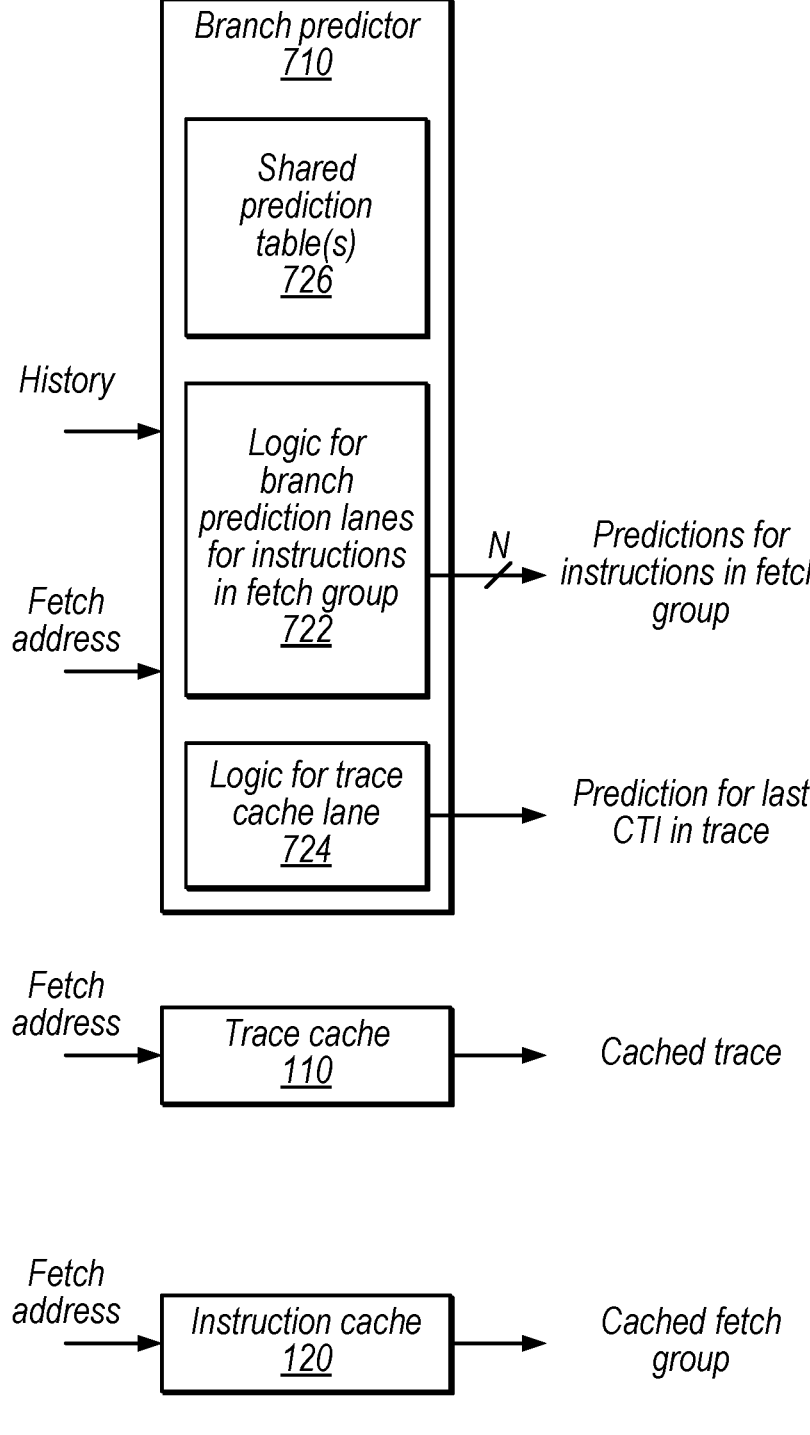
FIG. 7 is a block diagram illustrating an example trace prediction lane for a branch predictor with shared resources, according to some embodiments.
Figure 8:
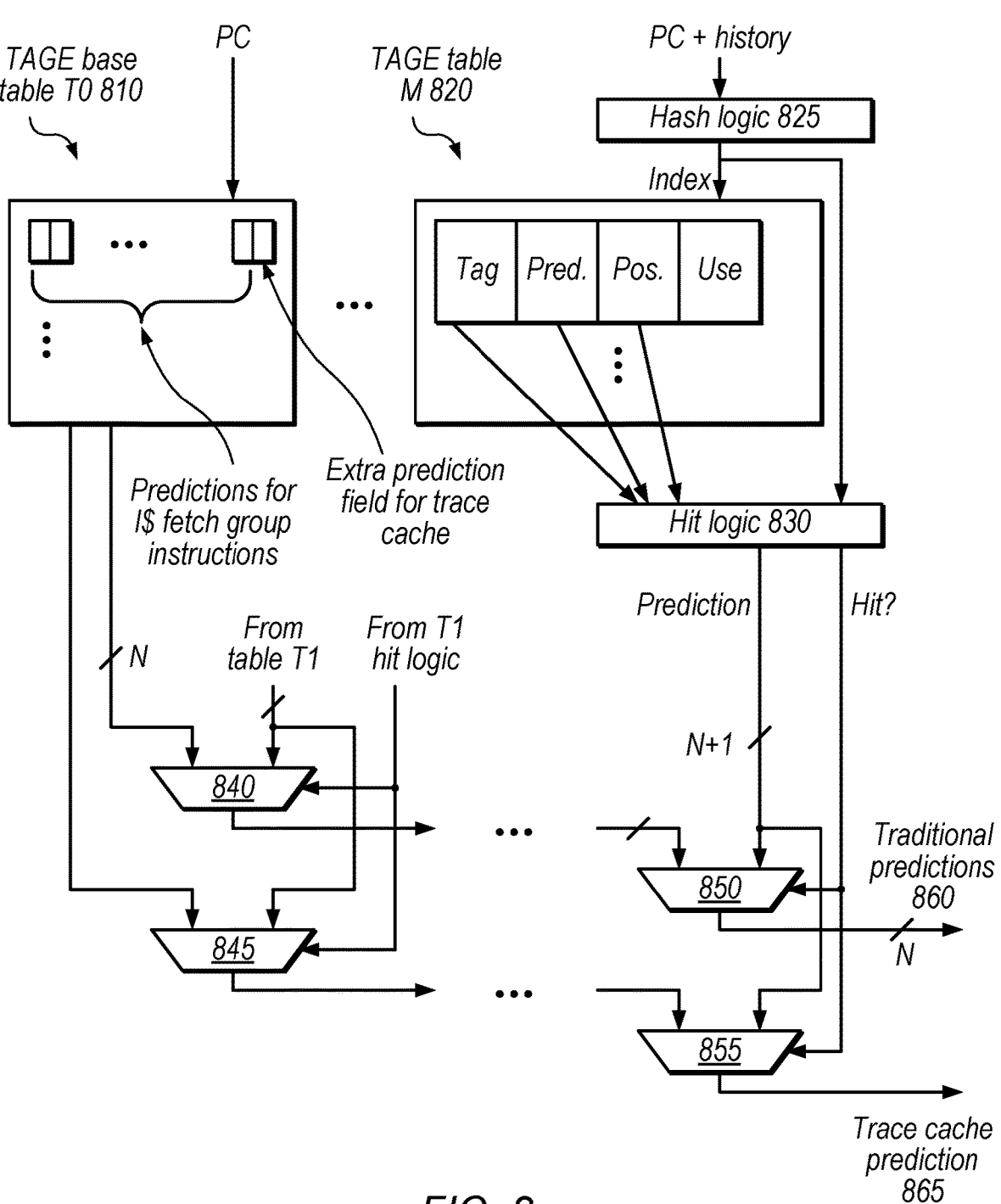
FIG. 8 is a block diagram illustrating an example trace prediction lane for a tagged geometric length (TAGE) predictor, according to some embodiments.
Figure 9:
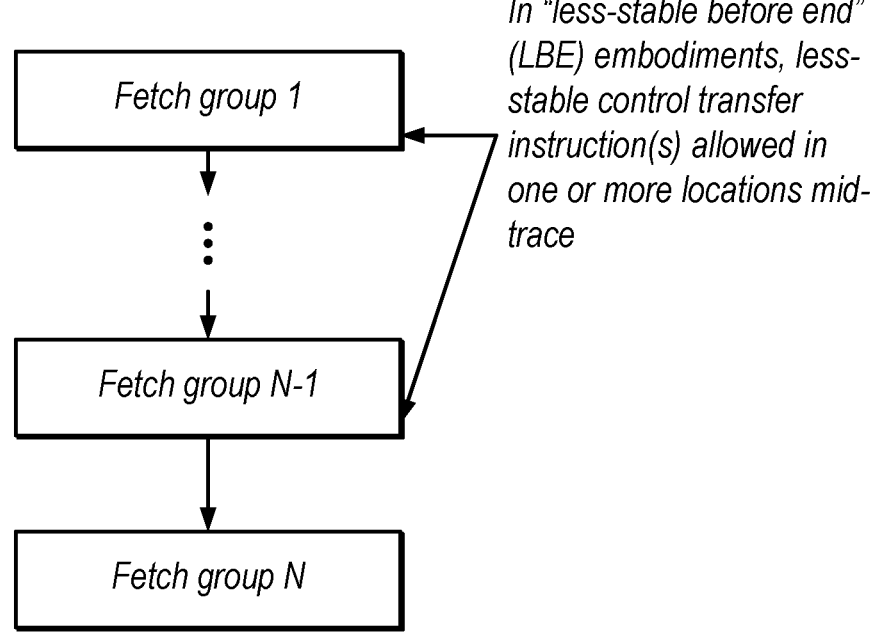
FIG. 9 is a diagram illustrating example relaxed conditions to allow a less-stable control transfer instruction before the end of a trace, according to some embodiments.

In various embodiments discussed in detail below, control circuitry for a trace cache is configured to assemble traces of instructions that meet certain criteria. For example, the control circuitry may restrict internal conditional branches to "stable" branches that meet a bias threshold toward one direction. "Internal" branches refer to branches that are not the last instruction in a trace. The following section provides a brief introduction to various disclosed techniques relating to a stable trace cache. FIGS. 1-4 show example trace cache implementations. FIGS. 5-6 relate to a next fetch predictor configured to operate in conjunction with trace cache hits. FIGS. 7-8 show logic for an extra trace cache lane for a branch predictor. FIGS. 9-10 relate to allowing less stable internal branches within a trace, in certain scenarios.

In disclosed embodiments, trace cache circuitry is configured to cache only traces with internal control transfer instructions that meet certain criteria. For example, the concept of a "stable" branch may improve trace cache performance. Restrictions on internal branches may advantageously reduce the size of the trace cache needed to achieve a given performance level. For example, for an instruction sequence with a branch that is evenly biased (50% taken and 50% not taken during execution), a trace may be cached for each branch direction to achieve desired performance. If those traces in turn include another internal branch that is also unstable, four traces might be cached, and so on. In contrast, a single trace with multiple stable branches may provide substantial performance increases, even without caching other overlapping traces. Restricting internal branches may also improve the likelihood that the entire trace will be executed when there is a hit in the trace cache (as opposed to performing a front-end redirect if any of the internal branches have a different direction than expected for the trace). Further, restricting internal branches may reduce complexity on the critical path of the processor. In some embodiments, while only stable branches are allowed as internal branches in a trace, the trace may end on a non-branch instruction, an unstable branch, or a stable branch.

As used herein, the phrases "stable branch" and "stable control transfer instruction" refer to a control transfer instruction that control circuitry has determined to treat as unconditional during a period of time, based on its execution history, even though the control transfer instruction may be conditional. Said another way, based on their historical execution, some conditional control transfer instructions have been promoted to a "stable" status. In disclosed embodiments, these control transfer instructions may be predicted based on that status and the stable status may be a criterion for inclusion within a trace cache trace. Designating a conditional control transfer instruction as stable/biased is a dynamic form of prediction that is dependent upon runtime behavior of the instruction, not a static prediction that could be performed independently of instruction execution (e.g., at compile time).

For example, control circuitry may designate a conditional branch that has always been taken (or always not taken) during execution as stable, because it was 100% biased during observed execution. In some embodiments, branches that meet a lower threshold such as 95% biased, 98% biased, 99.5% biased, etc. over some time period are considered stable. Once a branch is designated as biased/stable, a biased branch predictor is configured to always predict those branches to execute in the direction of the historical bias, in some embodiments (e.g., for a branch that was 99% taken during execution and which control circuitry has designated as stable, a biased predictor may predict the branch to be taken for every execution of the branch under the stable designation). Branch predictions for stable branches typically have a relatively high confidence level.

In some embodiments, a control transfer instruction that is initially not designated as stable could transition to a stable state based on its execution behavior. For example, if the control transfer instruction is a conditional branch instruction that is initially taken, it may be designated as stable, and thereafter treated as an unconditional taken branch. If on some later occasion, the branch instruction is determined to be not taken when executed, it may transition to an unstable state. In other embodiments, other criteria may be used to determine the transition into and out of the stable state. For example, the behavior of multiple instances of instruction execution may be considered before transitioning into or out of the stable state. Thus, for the period of time between when a control transfer instruction is designated as stable until this designation is removed, the control transfer instruction may be treated as unconditional. During this period, other forms of prediction, if available, may not be utilized. Once a control transfer instruction is no longer in a stable state, other types of predictors may be used to predict the instruction's behavior.

Note that unconditional branches or other unconditional control transfer instructions may classified and processed as stable based on their nature (rather than dynamically determined to be stable). Therefore, disclosed techniques may classify all or a subset of the following example instructions as stable: unconditional control transfer instructions (e.g., B or BL instructions), conditional control transfer instructions (e.g., CBR instructions) that satisfy a bias threshold, indirects (e.g., BR or BLR instructions) that satisfy a bias threshold, and returns that satisfy a bias threshold. Conditionals, indirects, returns, etc. that do not satisfy a bias threshold may be considered unstable.

As used herein, the phrases "control transfer instruction," "program flow instruction" and "branch instruction" may be used interchangeably. Such instructions include at least conditional branch instructions, call instructions, return instructions, jump instructions, etc. Additionally, while the term "branch instruction" (or more briefly, "branch") may be used throughout this disclosure for convenience, it should be understood that the term applies to any type of control transfer instruction that may be utilized in an instruction set architecture.

In some embodiments, a separate biased branch predictor provides predictions for biased branches. For example, U.S. patent application Ser. No. 17/590,719 filed on Feb. 2, 2022 and titled "Conditional Instructions Prediction" discusses example biased branch predictor circuitry that may be implemented in disclosed embodiments. For example, the '719 application discusses a bias table with entries that tracks whether a given allocated branch is biased over a number of executions of the branch. In other embodiments, stable branches may be predicted by multiple predictors, may be predicted by predictors that also provide predictions for unstable branches, or both.

The biased branch predictor may have priority over other predictions for a given branch. In some embodiments, the biased branch predictor maintains a field per branch (e.g., a bit) that indicates whether the branch has deviated from the expected direction during execution. The biased branch predictor may include a training interval before making predictions for a branch (e.g., such that a given branch must execute at least a threshold number of times before being predicted as biased). Control circuitry may periodically reset the biased branch predictor over relatively long intervals so that conditional branches that only very occasionally take a different direction have a chance to retrain as biased after the reset.

As mentioned above, it may be desirable to consider branches as stable that meet a lower bias threshold than 100%. For relatively high thresholds, the biased branch predictor may maintain a counter per branch that indicates the number of times the executed branch did not have the expected direction. The branch may be considered unstable when this counter meets a threshold number. For lower thresholds (e.g., 95% taken), this approach might utilize a substantial number of counter bits and therefore the biased branch predictor may encode the ratio of taken to not taken using other representations.

As one example, to reduce the circuit area and power used for tracking bias, control circuitry may initially assume that all branches meet a bias threshold. But the control circuitry may implement a usefulness filter to prevent branches that do not actually meet the threshold from being included in traces. For example, control circuitry may maintain a usefulness field and reduce the field by a greater amount, for branches that exit a given trace, than it increases the field for branches whose direction remained within the trace. Filter circuitry may prevent caching of branches that fail to meet a threshold usefulness value (which implies that one or more internal branches failed to meet a bias threshold). For example, the filter circuitry may add those branches to a Bloom filter. The filter may be updated based on buffered traces during training, based on cached traces in the trace cache, or both.

In some embodiments, the "stable" branch designation is split into multiple sub-categories that may be handled differently. For example, control circuitry may allow "less stable before end" (LBE) branches as internal branches within a trace under certain scenarios or conditions. There may be restrictions on the locations within a trace at which a less-stable branch is allowed (e.g., within certain fetch groups). These techniques may improve trace cache coverage and performance with limited tradeoffs in terms of size, unexpected trace exits, etc. Note that branches designated as various stability subcategories may be recategorized based on further execution, similarly to the most stable category.

In some embodiments, a trace next fetch predictor is configured to predict the next fetch address following execution of a trace. The trace next fetch predictor may be a single-cycle predictor. To generate fast predictions, the trace next fetch predictor may utilize a pre-hashed branch history token based on multiple taken branches within a corresponding trace (e.g., because generating multiple history updates for those branches may not be feasible in a single cycle).

In some embodiments, certain branch predictor circuitry is shared for trace-related predictions and other predictions. Note that because a trace may end with an unstable branch, it may be desirable to incorporate that branch in prediction training, predict the direction of that branch, or both. In some embodiments, the branch predictor includes a dedicated prediction lane for trace-ending branch predictions, which may advantageously provide sufficient prediction performance without including a separate branch predictor table for trace-related predictions. For embodiments that allow less-stable internal branches, a given branch predictor table entry and predictor lane may be shared for both instruction cache and trace cache hits, as discussed in detail below with reference to FIG. 12.

Overview of Example Trace Cache and Bias/Stability Criteria

FIG. 1 is a block diagram illustrating an example processor pipeline that includes a trace cache, according to some embodiments. In the illustrated example, the pipeline includes trace cache circuitry 110, trace cache tag circuitry 115, instruction cache circuitry 120, instruction cache tag circuitry 125, branch predictor(s) 130, instruction translation lookaside buffer (iTLB) 135, next fetch program counter (PC) multiplexer (MUX) 140, stitch logic and stitch queue 150, MUX 155, and decode circuitry 160.

Trace cache 110, in some embodiments, is configured to detect and store traces of instructions that includes at least one internal taken branch. Therefore, a given trace may include multiple basic blocks. A "basic block" is a sequence of instructions with no control transfers in, except to the entry, and no control transfers out, except at the exit. As discussed above, trace cache 110 may impose various conditions on traces, e.g., regarding the types of internal branches allowed, size of trace, number of taken internal branches, number of fetch groups, etc. In some embodiments, trace cache 110 is configured to store traces with multiple internal taken branches. Trace cache 110 may impose restrictions on internal conditional branches, e.g., a threshold bias level as discussed above. Trace cache 110 may cache only a trace corresponding to the biased direction of a given internal branch and not cache traces corresponding to other directions of the internal branch.

Trace cache tag circuitry 115, in some embodiments, is configured to store tag information (e.g., all or a portion of the corresponding fetch PC) for entries in trace cache 110. Fetch PCs that match a tag may result in a hit in tag circuitry 115 and may cause decode unit 160 to utilize instructions from a corresponding trace in trace cache 110, via MUX 155. Note that various other information may also be used to tag the trace cache, such as global history, path history, other branch history encodings, etc.

Stitch logic and stitch queue circuitry 150, in some embodiments, is configured to identify traces that satisfy conditions for caching in trace cache 110. Circuitry 150 may also buffer/queue traces until they are ready for caching (e.g., during a training interval). Circuitry 150 may also stitch fetch groups to generate a trace for caching. This may include selecting different portions of fetch groups or cache lines from the instruction cache (e.g., a portion up to and including a taken branch, a portion starting with a target of a taken branch, etc.) such that a trace does not include instructions that are not predicted to be included in the trace. Therefore, instructions of the trace may be stored sequentially in the trace, even though their program counters may not be sequential.

In some embodiments, circuitry 150 is configured to buffer fetch groups received from instruction cache 120 from which to stitch traces (and not buffer instructions from trace cache 110). Circuitry 150 may also perform training on candidate traces to determine whether they should be promoted within trace cache 110 (or promoted to trace cache 110 from a separate buffer).

In some embodiments, circuitry 150 utilizes a rolling window technique to identify traces. Circuitry 150 may impose various constraints on formed traces based on various criteria discussed herein. In rolling window implementations, queue circuitry may buffer multiple partially-overlapping traces (e.g., where one trace includes fetch groups A, B, and C and another trace includes fetch groups B, C, and D) and may select from among overlapping traces for promotion to an active state in trace cache 110 based on usefulness counters for different traces. (Alternatively, control circuitry may select from among overlapping traces based on various criteria such as earliest first fetch group, etc.). In some embodiments, circuitry is configured not to promote overlapping traces in the trace cache 110. This may advantageously provide substantial performance benefits associated with caching traces while limiting the size of the trace cache, relative to traditional techniques.

In the illustrated example, traces are identified post-decode for potential caching in trace cache 110. In other embodiments, traces may be identified earlier in the pipeline. Later identification, however, may allow traces to be less speculative (e.g., because any front-end redirects may have already been performed before trace formation). Note that trace cache 110 stores instructions pre-decode in the illustrated example, but similar trace caches may store decoded instructions in other embodiments.

Instruction cache 120, in some embodiments, is configured to cache instructions. Cache 120 may store multiple instructions in a given instruction cache line (e.g., corresponding to a fetch group width). In some embodiments, instructions are stored sequentially on a given cache line. Therefore, a branch on a given cache line may be followed by instructions on the fall-through path. In contrast, a cached trace in trace cache 110 may include instructions on a predicted-taken path immediately following a predicted-taken branch.

Instruction cache tag circuitry 125, in some embodiments, is configured to store tag information (e.g., all or a portion of the corresponding fetch group PC) for entries in instruction cache 120. When there are hits in both the trace cache 110 and the instruction cache 120, arbitration circuitry may prioritize the trace cache (e.g., via MUX 155). Note that a portion of the fetch group PC is also used to index into the trace cache 110, instruction cache 120, or both in some embodiments (and the index bits may be the same or may be different for the different caches).

Control circuitry may temporarily power down or otherwise reduce the power/performance state of instruction cache 120, instruction cache tag circuitry 125, or both in response to a hit in the trace cache 110. In other embodiments, instruction cache circuitry may remain powered on, e.g., in order to fetch further ahead of the end of a trace in the trace cache.

iTLB circuitry 135, in some embodiments, is configured to store translations from a virtual memory space to a physical memory space for instruction accesses. Hits in iTLB 135 may allow fast access to translation information, in contrast to performing a page walk to generate a translation on a miss. The output of iTLB circuitry 135 may be used to retrieve instructions for storage in instruction cache 120, trace cache 110, or both, in certain scenarios. In the illustrated embodiment, trace cache 110 and instruction cache 120 are virtually tagged, but in other embodiments one or both of these caches are physically tagged. Various caches discussed herein may be included in a cache/memory hierarchy that includes one or more higher-level caches and a system memory.

Branch predictor(s) 130, in some embodiments, include circuitry configured to predict the direction of conditional control transfer instructions. In some embodiments, a processor includes multiple branch predictors. Different predictors may be configured to provide predictions in different pipeline stages (e.g., a next fetch predictor may be a single-cycle predictor while other predictors may generate predictions over multiple cycles). As briefly mentioned above, branch predictor(s) 130 train based on results of executed control transfer instructions, including control transfer instructions stored as part of a trace, in some embodiments. In embodiments that fetch multiple instructions per cycle, a given branch predictor 130 may implement multiple lanes to provide separate predictions for the case where a fetch group includes multiple conditional control transfer instructions. In some embodiments, branch predictor(s) 130 include a bias branch predictor configured to provide predictions for biased branches. Detailed examples of branch predictor circuitry in the context of a trace cache are discussed below with reference to FIGS. 5-8 and 12.

Next fetch PC MUX 140, in some embodiments, is configured to select the next fetch PC from among multiple input options. For example, the inputs may include the next sequential PC (e.g., the current PC+the fetch group size), inputs from multiple branch predictors, etc. In some embodiments, arbitration circuitry is configured to control MUX 140 to select an input when multiple branch predictors provide different predicted fetch PCs. When the fetch PC from MUX 140 is mispredicted, instructions may be flushed and replayed from the misprediction point. Similarly, when there is an internal control transfer instruction that exits a cached trace in trace cache 110 (taking an unexpected direction), the pipeline may flush and replay instructions from that point.

Decode circuitry 160, in some embodiments, is configured to at least partially decode fetched instructions provided by MUX 155. Decode circuitry 160 may be configured to decode multiple instructions in a fetch group from a given source in a given cycle. MUX 155 may select the output of trace cache 110 on a trace cache hit.

Note that there may be multiple critical paths in the illustrated example, e.g., from a branch mispredict to the next fetch PC MUX 140, a loop from a next fetch predictor (discussed below with reference to FIG. 4) and the input to the next fetch predictor, find-first-taken logic and redirect control based on i-cache and branch predictor information, writes into an instruction buffer (which may be included between caches 110/120 and decode unit 160, although not explicitly shown), etc. Various disclosed techniques discussed in detail below may allow fetching past the first taken branch without substantially affecting such critical paths.

FIG. 2A is a diagram illustrating example stability categories, according to some embodiments. Note that greater or smaller numbers of categories/sub-categories may be defined and handled differently in other embodiments. FIG. 2A shows a spectrum of "biasness" of branches from never taken to always taken. As shown, branches that are almost never taken or almost always taken are designated as stable (the actual thresholds may vary, and some embodiments may consider only 100% biased branches to be stable).

Branches that are not in the stable category but are still close to one end of the spectrum may still be designated as "less stable" and may be candidates for less-stable before end (LBE) techniques as discussed in detail below with reference to FIG. 9. In these embodiments, branches that have historically executed in the LBE range are allowed at one or more positions within a trace (although those position(s) may be restricted). This may allow the trace cache to cache more traces relative to more strict implementations, without substantially increasing trace cache size or the misprediction rate of internal trace branches.

Note that some embodiments may consider only branches that are biased in one direction (e.g., biased taken) for inclusion in traces while other embodiments may consider branches that are biased in either direction.

FIG. 2B is a diagram illustrating example stable/unstable fetch group positions allowed in a trace, according to some embodiments. In the illustrated example, a trace includes N fetch groups. In this embodiment, only stable control transfer instructions are allowed internally, while unstable control transfer instructions are allowed to terminate a trace (although traces may also end on another type of instruction, e.g., when the trace size is reached). As discussed above, this may advantageously reduce situations where all instructions in a cached trace are not actually in the proper execution path, relative to implementations that do not differentiate among different categories/stabilities of control transfer instructions.

A processor may implement various criteria for trace building, in some embodiments. For example, in some embodiments a minimum number of taken branches are required to cache a trace. A trace may be allowed to end with a branch that is stable or unstable, which may be part of the trace (or a trace may end with a non-branch instruction). When selecting from among multiple traces in training using rolling window techniques, the size and number of fetch groups of a given trace may be taken into account in addition to its usefulness.

FIG. 3 is a diagram illustrating example fields of a trace cache entry, according to some embodiments. In the illustrated embodiment a given entry includes a tag field 310 (which may be implemented by circuitry 115), valid field 320, trace data 330, and replacement field 340. In some embodiments, trace cache 110 is direct mapped. In other embodiments, trace cache 110 is set associative or fully associative.

Tag field 310 may include all or a portion of the first fetch group PC (or some value derived therefrom, e.g., according to a hash function). As discussed above, this field may be used to detect hits in the trace cache 110. In various disclosed embodiments, the fetch group PC is used to access trace cache 110 (e.g., to generate index and tag information). In other embodiments, however, various additional information may be used to access a trace cache, such as global history information, signature information, security information, etc.

Valid field 320 indicates whether an entry is currently valid. Entries may be invalidated for various reasons such as failures to execute an entire trace, context switches, coherence requests, self-modifying code, etc. Replacement field 340 may be utilized to select an entry for eviction in certain scenarios.

Trace data 330, in the illustrated example, includes up to N instructions from up to M fetch groups. Note that total number of instructions, number of fetch groups, or both may be restricted in a given implementation. For example, a given embodiment may support 2, 3, 4, 5 etc. fetch groups and up to 8, 16, 32, 64, etc. total instructions in a trace. In some embodiments, a trace cache entry is configured to store targets of all potentially-taken branches in a trace, which may facilitate access to this information if a predicted-not-taken branch ends up exiting the trace.

Replacement field 340, in the illustrated embodiment, represents information used to facilitate eviction decisions, e.g., least-recently-used (LRU) information, usefulness information, etc. A usefulness-based scheme may increase a usefulness value on successful execution of the trace and may reduce the value based on various circumstances (e.g., failure to execute an entire trace on a hit, decay over time, decay based on use of other traces, etc.). When a trace is ready to be promoted to trace cache 110 and a corresponding entry is not available, control circuitry may determine whether to stall promotion of the trace or to evict a current entry to make room for the trace. Replacement field 340 may have a default value on allocation of a trace cache entry and may trigger various actions upon reaching one or more thresholds.

Detailed Example Pipeline

Figure 4:
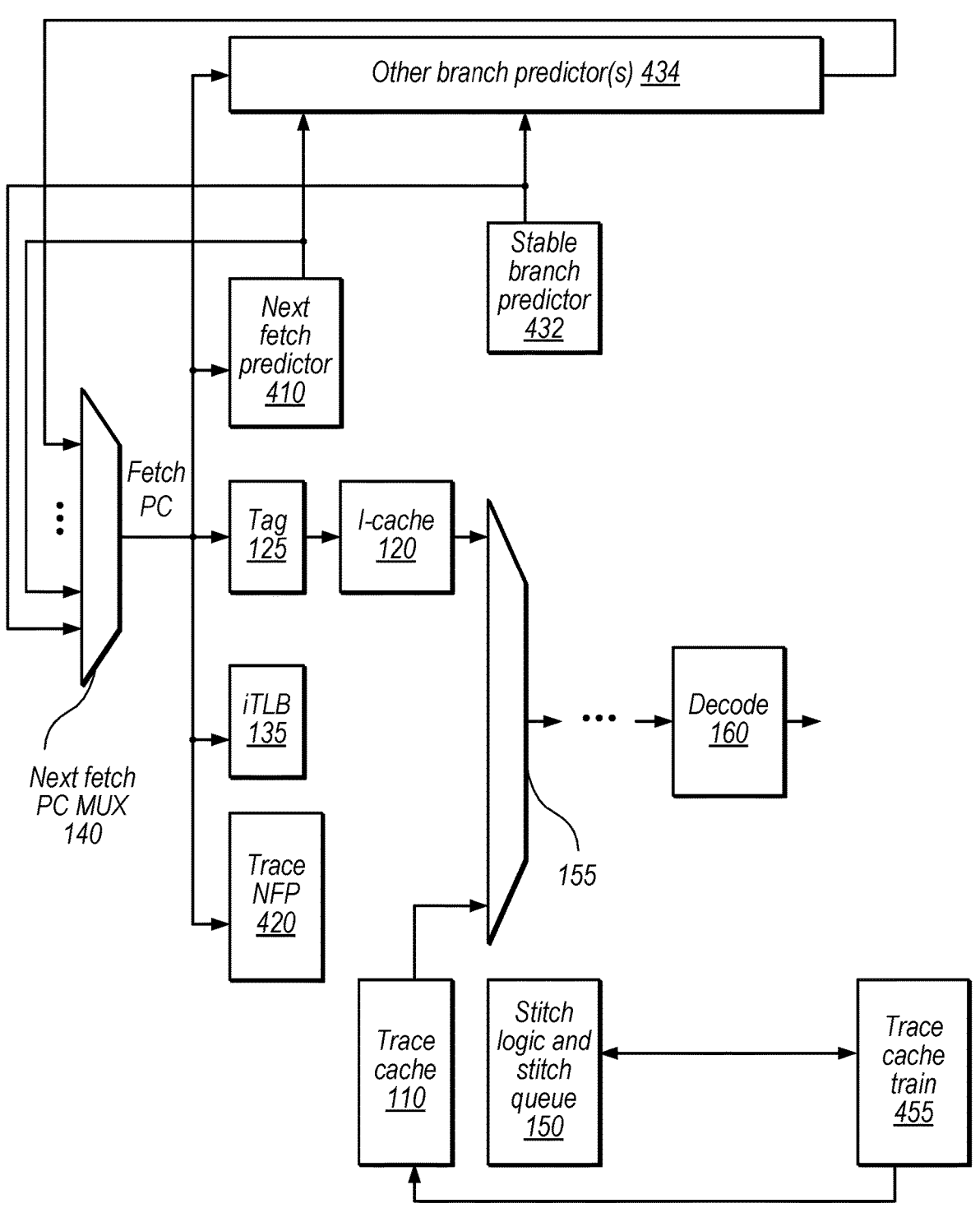
FIG. 4 is a block diagram illustrating a more detailed example pipeline, according to some embodiments.

FIG. 4 is a block diagram illustrating a more detailed example pipeline, according to some embodiments. In the illustrated embodiment, the processor includes various circuitry discussed above with reference to FIG. 1, as well as: next fetch predictor 410, other branch predictor(s) 434, stable branch predictor 432, trace next fetch predictor (NFP) 420, and trace cache train circuitry 455.

Trace cache train circuitry 455, in some embodiments, is configured to interact with stitch logic and stitch queue 150 to determine when to promote traces to trace cache 110. Trace cache train circuitry may enforce various criteria for traces, including size, categories of inner control transfer instructions, etc. In some embodiments, traces being trained are stored in trace cache 110 but are marked as "training" until they reach a usefulness/training threshold (in these embodiments, queue circuitry of element 150 may be omitted). In other embodiments, trace information for traces being trained may be stored in a separate buffer, e.g., in circuitry 150. In some embodiments, replacement field 340 is a usefulness field that is used to select from among multiple partially-overlapping traces for promotion. Generally, traces may be buffered in trace cache 110 or in a separate buffer until they meet a usefulness threshold. At that point, train circuitry 455 may allocate valid entries for those traces, e.g., by moving those traces to the trace cache 110, setting those traces as valid/ready in the trace cache 110 if they are already buffered in a trace cache entry, etc.

Stable branch predictor 432, in some embodiments, is configured to provide predictions for branches that satisfy a bias threshold. In some embodiments, arbitration circuitry (e.g., that controls MUX 140) provides greater priority to predictors from predictor 432 than one or more other predictors, e.g., because biased predictions may have a high confidence level.

The processor also includes multiple next fetch predictors, in the illustrated embodiment. Next fetch predictor 410 and trace NFP 420, in the illustrated embodiment, both provide a predicted next fetch PC to next fetch PC MUX 140 in a given cycle if there are hits in both tables.

Next fetch predictor 410 provides a prediction for a next fetch group after the current fetch group, in some embodiments. Trace next fetch predictor 420, in contrast, provides a prediction for a next fetch group after execution of a trace cache 110, which may therefore be multiple fetch groups away from the previous fetch group in certain scenarios. Detailed example embodiments of trace next fetch predictor 420 are discussed below with reference to FIGS. 5 and 6.

In some embodiments, the illustrated next fetch predictors correspond to different tables of the same next fetch predictor unit. Different next fetch predictors may access tables based on different information, e.g., different portions of a current fetch PC, using history information or not, using signature techniques or not, etc. In some embodiments, trace next fetch predictor 420 has the highest priority among multiple next fetch predictor tables.

Trace Next Fetch Predictor (tNFP)

Generally, a trace next fetch predictor for the trace cache may advantageously provide the next fetch address following the end of the trace (potentially multiple taken branches away from the current fetch address) to allow the front-end to quickly continue fetching proper instructions after a hit in trace cache 110.

FIG. 5 is a block diagram illustrating an example trace next fetch predictor, according to some embodiments. In the illustrated embodiment, the processor includes next fetch predictor 410, trace next fetch predictor 420, and next fetch PC MUX 140. Predictors 410 and 420 may be configured as briefly discussed above with reference to FIG. 4.

As shown, trace next fetch predictor 420 is configured to output a predicted PC after the end of a hit trace in the trace cache, which is multiple fetch groups away from the current PC. This may advantageously improve front-end fetch bandwidth in the context of successful execution of traces. Example formats of entries in circuitry 420 are discussed below with reference to FIG. 6.

Next fetch predictor 410 provides the predicted PC after the current fetch group and next fetch PC MUX 140 selects from among the outputs of circuits 410, 420, and the sequential next PC (although various other inputs to PC MUX 140 are also contemplated). The predicted next PC output for MUX 140 is an input to circuitry 410 and 420 for their next predictions.

In some embodiments, control circuitry is configured to disable reading the instruction cache tag circuitry 125 and instruction cache 120 in response to a hit in the trace next fetch predictor 420, e.g., because a hit in the next fetch predictor may indicate a hit in the trace cache 110.

Note that providing a prediction from the trace next fetch predictor may be challenging in terms of providing a properly-updated history value (e.g., global history, path history, some other history encoding, or some combination thereof). FIG. 6 provides an example technique for pre-calculating information used for generating the history, which may avoid dropping history updates (which may reduce predictor accuracy) without negatively affecting the critical path.

FIG. 6 is a block diagram illustrating example next fetch predictor circuitry and entry fields, according to some embodiments. In the illustrated example, a given entry in trace next fetch predictor 420 includes a tag 610, predicted next fetch address after the end of a corresponding trace 620, and pre-hashed history token 630. In the illustrated example, the processor also maintains current history value 640 and includes tag compare circuitry 650 and hash circuitry 660.

In the illustrated example, a given entry in trace next fetch predictor 420 is accessed based on an index portion of the current fetch PC and tagged (field 610) based on a portion of this PC. Tag compare circuitry 650, in the illustrated embodiment, is configured to indicate a hit or miss in the trace next fetch predictor 420 by comparing one or more tags corresponding to the index (depending on the associativity of the trace next fetch predictor table) to the tag portion of the current fetch PC.

In some embodiments, the index and tag are the same portions of the fetch PC used to access the trace cache 110. In some embodiments, the trace next fetch predictor 420 uses a smaller number of tag bits than the trace cache 110 to reduce circuit area. In other embodiments, entries in trace next fetch predictor 420 may be checked for hits using other information or additional information, such as branch history information, for example.

The predicted next fetch address 620, in some embodiments, is based on a predicted direction of a trace-ending branch, predicted target of a trace-ending branch, or both. The processor front-end may perform various fetch operations (e.g., instruction/trace cache tag checks, etc.) based on this prediction if it wins arbitration at MUX 140. Trace next fetch predictor 420 may update this value based on previous executions of the corresponding trace.

A given entry may also include a valid field indicating validity of an entry, a usefulness field, or both (these fields are not shown in FIG. 6). The usefulness field may be utilized to determine when entries are ready to provide predictions, when to evict entries to make room for another prediction, etc. and may be adjusted based on the accuracy/ number of predictions associated with an entry, predictions based on other valid entries, etc.

As briefly mentioned above, it may be challenging to update a branch history value for a next fetch prediction (e.g., in a single cycle). In particular, because a trace may include multiple taken branches, sequentially hashing multiple values to generate an updated history value may have timing effects. Therefore, in some embodiments, the trace next fetch predictor may utilize a pre-hashed branch history token 630 based on multiple branches within a corresponding trace. The processor may compute this value using multiple XOR and shift operations and store the token 630 in a trace next fetch predictor entry in response to caching a trace, for example. The token 630 is one example of branch history update information that may be pre-computed based on multiple taken branches in a trace and provided in response to a predictor hit.

When the trace next fetch predictor 420 wins arbitration, hash circuitry 660 is configured to hash the history token 630 with the current history value (which is up to date at the point of the hit in trace cache 110) to generate the next history value. This next branch history value may be used to access predictor tables in various predictors (including in predictor 420) to generate subsequent predictions.

In some embodiments, there is a 1 to 1 mapping between stable trace cache entries and trace next fetch predictor entries such that a given stable trace cache entries corresponds to a single trace next fetch predictor entry with a prediction for that trace.

Note that branch history may be represented using various formulations. Two examples mentioned above are path history and global history. Generally, path history is generated based on addresses of taken branches and global history is generated based on targets of taken branches. Various embodiments may update path history, global history, or both based on predicted/fetched branches.

Note that a given branch history update may require hashing a relatively small subset of the bits of the previous value with a new value. Therefore, the size of the token 630 may be substantially less than the size of the current history value 640, reducing the area of the trace next fetch predictor table relative to storing a complete updated history value. In other embodiments, however, the trace next fetch predictor 420 may store a pre-computed completed updated history value.

For a given path history update, hash circuitry may be configured to perform an exclusive-or operation between set of bits of the fetch address of the current fetch group and all or a portion of the bits of the previous path history. As one specific example, the path history may be an M+N bit value that is shifted left by one and XOR'd with N bits of the fetch address of the current fetch group to generate the next path history value each cycle, according to the following example equation:

15 path_hist[$M+N-1:0$]={path_hist[$M+N-2:0$],
  $1'b0$}^{$M'b0,N\_bits\_of\_PC$}

For a given global history update, hash circuitry may be configured to perform an exclusive-or operation between all or a portion of a branch target and all or a portion of the bits of the previous global history. As one specific example, the global history may be an X+Y bit value that is shifted left by one and XOR'd with Y bits of the fetch address of the current fetch group to generate the next path history value each cycle, according to the following example equation:

global_hist[$X+Y-1:0$]={global_hist[$X+Y-2:0$],
  $1'b0$}^{$X'b0,Y\_bits\_of\_target$}

Note that the Y bits of the target may or may not be contiguous and may be located at different positions within the address in different embodiments. The number of bits implemented for M, N, X, Y, etc. may affect the length of history used, control circuit area, the impact of a given address on the current history value, etc. These parameters may vary in different embodiments. In other embodiments, various other branch history encodings may be implemented.

Branch Predictor Lane for Trace-Related Predictions

Generally, various branches associated with traces may be used to train branch predictors, may be predicted by branch predictors (e.g., when ending a trace or when fetched from the instruction cache instead of the trace cache), etc. Building a dedicated branch predictor for the trace cache, however, may be undesirable in terms of area and power consumption. Therefore, in some embodiments branch predictor circuitry is shared for trace-related predictions and other predictions, with some additional circuitry dedicated for trace-related predictions. For example, predictor tables, program counter and history data paths, and hash functions may be shared.

In some embodiments, branch predictor circuitry is configured to provide only predictions for trace-ending branches among branches in a trace (although predictions may also be provided for less-stable-before-end branches as discussed in detail below with reference to FIG. 9). In some embodiments, updates for stable branches that are internal to the trace are ignored for branch prediction training purposes.

FIG. 7 is a block diagram illustrating an example trace prediction lane for a branch predictor with shared resources, according to some embodiments. In the illustrated embodiment, the processor includes trace cache 110, instruction cache 120, and branch predictor 710. Trace cache 110 and instruction cache 120 may be configured as described above and may output traces and fetch groups in response to hits for the fetch address.

Branch predictor 710, in the illustrated embodiment, is configured to provide predictions for one or more control transfer instructions in a given fetch group and is also configured to provide a prediction for the last control transfer instruction in a trace. In the illustrated embodiment, branch predictor 710 includes one or more shared prediction tables 726.

As shown, branch predictor 710 also includes dedicated logic for a trace cache lane 724 in addition to logic for branch prediction lanes for the instructions in a fetch group 722. Note that a given fetch group may include up to N instructions that could include conditional control transfer instructions at any locations within the group. Therefore, in the illustrated example, branch predictor 710 implements N lanes to provide separate predictions for the different fetch group positions. Certain lanes may not be toggled in a given cycle when that lane does not have a condition branch. More detailed examples of lane logic in the tagged geometric length predictor (TAGE) context are discussed in detail below with reference to FIG. 8. Note that once a predicted-taken branch is found, control circuitry may kill the remaining instructions in the fetch group such that they are further processed by the predictor.

Disclosed embodiments may advantageously provide accurate predictions for trace-ending branches with reasonably small increases in chip area and power consumption by sharing some circuitry with other types of predictions. In particular, internal stable branches may not need help from the branch predictor, so adding a small amount of dedicated circuitry for trace-ending branches may be sufficient.

In some embodiments, branch predictor 710 is configured to use the fetch group PC and history value corresponding to the beginning of the trace to access shared branch prediction tables to predict the direction of a trace-ending control transfer instruction (even though the trace-ending control transfer instruction is in a fetch group with a different fetch address that the trace-beginning fetch group). While this may not incorporate updates to the history value based on control transfer instructions that are internal to the trace, it may provide sufficient prediction accuracy, in these embodiments, without requiring hashing to completely bring the history value up to date. In particular, this may provide good accuracy because of the stability of the internal branches and may not require trace-specific changes to a branch predictor design.

FIG. 8 is a block diagram illustrating an example trace prediction lane for a tagged geometric length (TAGE) predictor, according to some embodiments. In the illustrated example, the TAGE predictor includes a base table TO 810 and M non-base tables 820 (only one of which is shown to facilitate explanation). As is well-understood by those of skill in the art, TAGE tables are indexed using independent functions of the global branch/path history and branch address (where the selected branch history lengths form a geometric series). Note that various numbers of TAGE levels may be implemented in various embodiments. In some embodiments, the TAGE tables are direct mapped. In other embodiments, the tables are set associative.

As shown, the base table is accessed based on all or a portion of the PC of a given branch. In some embodiments, a given base table entry may also include a tag (not shown). A given entry in the TAGE base table TO includes predictions for instructions in an instruction cache fetch group (e.g., an entry for an eight-instruction fetch group would include up to eight predictions). In the illustrated embodiments, a given TO entry includes an extra prediction field for the trace cache. The TO table provides one or more branch predictions to multiplexer (MUX) 840 and one trace cache prediction to MUX 845. The MUXes 840 and 845 also receive outputs from entries in table T1 (not shown) and are controlled based on whether there is a hit in T1. Generally, the highest-level table with a hit may be used to provide a prediction by that lane while the TO table may be used if all of the other tables miss.

Generally, the higher-level tables are indexed based on increasingly-greater portions of the global history, in conjunction with the PC (hashed, in this example). The tag may also be based on the PC, a portion of the global history, a hash thereof, etc.

In the illustrated example, table M 820 provides up to N+1 predictions for the lanes in a fetch group plus the trace cache, in the illustrated embodiment, to MUXes 850 and 855. These MUXes also receive the outputs of the MUX for the previous-level TAGE table. Up to N traditional predictions 860 are output from MUX 850 and MUX 855 outputs a trace cache prediction 865 if there was a hit in any table. In some embodiments, for traditional predictions 860, control circuitry may indicate the first predicted taken branch and kill subsequent predictions.

As shown, table M is indexed based on a hash of the program counter and history generated by hash logic 825 (it may also be tagged based on similar information using different portions of the PC/history). In the illustrated example, each entry has corresponding tag, prediction, position, and use values. The tag value is used to determine hits and misses at a given index. The prediction value indicates a prediction (e.g., taken or not taken) for a valid entry that is hit. The prediction value is maintained using a saturating counter in some embodiments and may indicate a particular direction based on meeting a threshold. Entries may be considered to be training and may not provide predictions until they reach a threshold, for example.

The position field indicates the position within a fetch group for which the prediction is made. For example, for a fetch group with N instructions, the prediction may be for the first, second, or third instruction, and so on.

The use field, in some embodiments, indicates the usefulness of a given entry. As one example, this table may be increased by a certain value when an entry is used to provide a prediction and decreased in response to other events (e.g., on a premature trace exit, or over time as other tables provide predictions). Control circuitry may determine when to evict entries in a given table based on the use field.

Hit logic 830, in some embodiments, determines whether there is a hit based on the tag and position fields and passes the prediction field for the appropriate lane(s) to MUXes 850 and 855. It also controls MUXes 850 and 855 based on whether there is a hit (e.g., to pass the value from the current level based on a hit or to select a value from a previous level based on a miss).

In some embodiments, a given entry in a non-base TAGE table includes a "trace cache" field indicating whether the prediction is a trace cache prediction or an instruction cache prediction. Control circuitry may then provide predictions from entries marked as trace cache predictions to MUX 855. Control circuitry may also use this trace cache field to determine hits and misses (e.g., where the state of the trace cache field should match the type of fetch used for the fetch group for a hit). Control circuitry may ignore the position field for trace cache entries, in these embodiments.

In other embodiments, control circuitry is configured to imply whether an entry is for an instruction cache CTI or a trace CTI. For example, allocations based on trace cache traces may populate the position field with the position of the first instruction in the trace for training, which may be unique (e.g., in embodiments where an unstable branch can only occur after one or more stable branches in a trace, the fetch group PC of the first fetch group will be unique). In this case, because no other branch will use this position, only accesses associated with the trace will hit the entry. For LBE branches (discussed in detail below), there may be potential aliasing with branch predictor entries for the instruction cache. This may be avoided, in some embodiments, e.g., by restricting LBE branches such that they cannot be the first instruction of the first fetch group of a trace, inverting tag bits (e.g., XORing with a vector of binary 1's) for trace cache entries in the branch predictor, etc.

In the illustrated example, the extra prediction field for the trace cache in entries of table TO and MUXes 845 and 855 are one example of the logic for the trace cache lane 724 of FIG. 7, while tables 1 through N of the TAGE predictor are shared for traditional instruction cache predictions and trace cache predictions.

While TAGE predictors are discussed herein for purposes of explanation, disclosed techniques with some dedicated trace prediction circuitry and other shared circuitry may be implemented in various other types of branch predictors; the example of FIG. 8 is not intended to limit the scope of the present disclosure. Similarly, while sharing predictor resources for trace cache predictions are discussed with reference to various embodiments, a separate predictor for trace cache predictions may be implemented in other embodiments.

Less-Stable Before End (LBE) Techniques

As briefly mentioned above, branch predictor circuitry may provide predictions for branches of multiple different categories of stability. For example, the stable portions of the spectrum of FIG. 2A may be one category and the LBE candidate portions another category (both of which are distinct from an unstable category that does not meet either threshold). Predictions associated with the different categories of stability may be provided by different predictors (e.g., stable branch predictor 432 and a separate LBE predictor) or the same predictor (e.g., stable branch predictor 432).

In some embodiments, one or more less-stable categories are allowed to be included as non-terminating instructions of a trace in certain scenarios. Generally, disclosed techniques that allow LBE branches within traces may permit formation of more traces than embodiments or modes that are more strict (e.g., that only allow 100% biased internal branches), which may improve trace cache coverage while limiting performance penalties associated with unstable branches.

Therefore, in some embodiments, trace formation control circuitry (e.g., circuitry 150, 455, or both) may include certain less stable branches within a trace. FIG. 9 is a diagram illustrating this concept. As shown, a trace includes N fetch groups and one or more less-stable control transfer instructions are allowed mid-trace. In some embodiments, a threshold number of less-stable branches are allowed mid-trace (e.g., a single LBE branch, two LBE branches, etc.). In some embodiments, such less-stable branches are restricted to one or more specific positions (e.g., fetch group positions) within a trace.

When a branch unexpectedly exits a cache trace, the processor may chop the retrieved fetch group (to throw away instructions after the branch) and redirect the front-end to the correct path. Note that unexpected trace exits may occur due to actual execution of a branch instruction that executes in a direction for which subsequent instructions are not cached in the trace (e.g., the branch is not taken when the trace stores instructions assuming the branch was taken). Unexpected trace exits may also occur based on a branch prediction, before the branch is actually executed. For example, the processor may chop a fetch group from a trace based on a branch predictor prediction that a branch is not taken, when the trace stores subsequent instructions from the taken path.

In some embodiments, trace cache 110 is configured to store traces with only one predicted direction for a given branch (e.g., the taken direction) and does not store traces in which the branch is predicted to execute in the other direction.

Control or prediction circuitry may track the stability of less-stable branches using different techniques in different embodiments. As one example, control circuitry may count the number of executions of a given branch in the non-biased direction (e.g., not taken for a branch that is biased taken).

As another example, control circuitry may track the overall ratio or percentage of taken/not taken for previous executions of a given branch. This may utilize substantial storage, however, on a per-branch basis.

Therefore, in some embodiments, control circuitry is configured to assume that branches that do not meet a higher stability threshold still meet a less-stable stability threshold (potentially without knowledge of their stability), but filter to prevent such branches from being cached in traces if they do not satisfy this assumption.

FIG. 10A is a flow diagram illustrating example filter-based LBE techniques, according to some embodiments. At 1002 in the illustrated embodiment, control circuitry builds a trace with up to N LBE candidates. This may include storing instructions for the trace in a training buffer or in trace cache 110. In some embodiments, N=1 and at most a single LBE branch is allowed within a trace. In some embodiments the position(s) of LBE branches are restricted within a trace, e.g., to being in the first fetch group within the trace or some other position. Note that branches that meet a higher stability threshold may be included without such restrictions, in some embodiments.

At 1004 in the illustrated embodiment, control circuitry tracks the usefulness of the trace. This may include incrementing a counter in response to a branch executing toward the next portion of the stored trace and decrementing the counter in response to the branch executing away from the next portion of the trace (exiting the trace). The decrement amount may be greater than the increment amount (e.g., twice the increment amount, three times the increment amount, etc.).

Note that the usefulness field may also be adjusted based on other factors, e.g., decremented over time. In various implementations, the usefulness field will eventually reflect the amount of bias of one or more LBE branches within a trace. In some embodiments, separate fields may be used to reflect replacement policy information and LBE usefulness.

At 1006 in the illustrated embodiment, the usefulness value drops below a threshold. In response, the control circuitry invalidates the trace. The control circuitry also adds one or more LBE candidate branches to a Bloom filter to prevent their inclusion in subsequent traces. In these embodiments, the filtering enforces the LBE minimum stability threshold. Note that an upper usefulness threshold for successful training of a trace and a lower threshold for invalidating a trace may be different distances away from an initial value of the usefulness field. Thus, in various LBE embodiments, traces may be invalidated based on unexpected LBE directions more rapidly than they are considered trained, e.g., to avoid performance impacts of branches that do not meet the LBE bias threshold.

The Bloom filter may be accessed using the PC of the branch or the PC of a fetch group that includes the branch, for example. Therefore, control circuitry may check the Bloom filter before including a given branch as an internal branch within a trace to prevent using branches from the Bloom filter internally within a trace. While a Bloom filter is discussed for purposes of illustration, other types of filters may be implemented in other embodiments.

FIG. 10B is a diagram illustrating example fields of a trace cache entry a trace cache that supports LBE, according to some embodiments. In the illustrated example, in addition to fields 310, 320, and 330 discussed above with reference to FIG. 3, a trace cache entry includes LBE field 1010, position field 1020, and usefulness field 1040. Note that these fields may be included in a training buffer, trace cache entry, or both.

LBE field 1010, in some embodiment, indicates whether the trace includes an LBE branch. Some traces may include only branches with the highest stability category and field 1010 may not be set for those traces.

Position field 1020, in some embodiments, indicates the position of an LBE branch within a trace (e.g., the Nth instruction position). Note that even if the position of LBE branches is restricted within a trace at a certain granularity (e.g., within the first fetch group) the instruction position of the LBE may still vary. Position field 1020 may provide this information. Position field 1020 may facilitate retrieval of branch predictions (e.g., from branch predictor 710) for LBE branches, may allow identification of instructions to be invalidated to chop a fetch group, or both, as discussed in detail below.

Usefulness field 1040, in some embodiments, indicates the usefulness of a given trace. This may be tracked during training, while validly cached in trace cache 110, or both. As discussed above, in some embodiments, the usefulness field is decremented by a greater amount when an LBE branch executes in the non-biased direction than when the trace is completely executed. This may allow invalidation of the trace and updating the Bloom filter for branches that turn out not to meet the LBE stability threshold. In some embodiments, the usefulness field 1040 is updated differently depending on whether the LBE field 1010 is set.

In some embodiments, a given trace is allowed to include multiple LBE branches. In these embodiments, the usefulness field may encode separate information for different LBE branches, e.g., to indicate a subset of LBE branches that contribute to a trace falling below a usefulness threshold. This may allow one or more LBE branches from a trace to be added to the Bloom filter while others remain valid for inclusion in other traces.

FIG. 10C is a diagram illustrating example fields of a trace NFP entry that supports LBE, according to some embodiments. In the illustrated example, a given NFP entry includes an LBE prediction field 1012 that indicates the predicted direction of an LBE branch. In some embodiments, control circuitry uses this field to improve performance when an LBE branch exits a trace.

For example, consider a situation where a trace that includes an LBE taken branch is successfully built and is useful. Occasionally, the LBE branch may not be taken multiple times in a row. However, the number of times may not be enough to decrement the usefulness value sufficiently to invalidate the trace. In this situation, in response to the first time the LBE branch is not taken, control circuitry chops the fetch groups and redirects the front end. It also trains the trace next fetch predictor 420 to set the predicted PC (field 620) to the PC of the LBE branch+the instruction size (to indicate the sequential instruction following the LBE branch) and sets the LBE prediction field 1012, in some embodiments. The next time the LBE branch is not taken, the trace NFP 420 provides the sequential next fetch PC. In some embodiments, control circuitry sees that the LBE prediction field 1012 is set and does not update the global history so that the next fetch group gets the correct history. In this manner, the processor can avoid the front-end redirect for one or more subsequent iterations of the LBE branch that are not taken. Control circuitry may clear the LBE prediction field 1012 in response to the LBE branch taking its expected direction and reset the predicted next fetch address 620 to the end of the trace.

In some embodiments, filter circuitry may train to prevent certain control transfer instructions from being included before the end of a trace. For example, the processor may include an LBE train filter between trace cache train circuitry 455 and trace cache 110.

The LBE train filter may set Bloom filter entries for LBE branches that cause traces to fall below a usefulness threshold. The Bloom filter may be accessed using the PC of the LBE branch, the PC of a fetch group that includes the LBE branch, etc. In embodiments with multiple LBEs allowed in a given trace, the LBE train filter may determine which LBE(s) caused the usefulness issue and write the Bloom filter accordingly. In some embodiments, the LBE train filter is configured to clear the Bloom filter periodically, e.g., every N million cycles. Periodic clearing may allow certain branches to be included in traces again, e.g., if an anomalous event caused them to fall below a bias threshold but they typically meet the bias threshold during execution.

Consider an example with a 50% biased branch. The control circuitry may initially assume that the branch meets an LBE bias threshold. Based on the assumption, traces with one or both directions of the branch may be in training or cached in the trace cache. Because the assumption was incorrect in this example, however, one or both traces will fall below the usefulness threshold and the branch will be added to the Bloom filter.

Note that when an LBE branch unexpectedly exits the trace, the processor may need to recover the global history. In embodiments in which LBE branches are only allowed in the first fetch group of a trace, the processor may simply reset the history to the value corresponding to the beginning of the trace. In other embodiments, the processor may include more complicated logic to store prior history values corresponding to different LBE positions or to perform a reverse computation to re-generate the history prior to a mispredicted LBE branch.

In some embodiments, control circuitry enables sharing a branch predictor table entry for both instruction cache and trace cache hits. For example, LBE branches may be handled differently than trace-ending branches in terms of branch prediction. In particular, as discussed in detail above with reference to FIG. 7, a branch predictor may include an extra lane for a trace-ending branch that is not stable. In contrast, LBE branches may share the same branch predictor entry and prediction lane for both instruction cache hits and trace cache hits, as discussed in detail below. Note that sharing of branch predictor entries for instruction cache hits and LBE entries may be restricted to LBEs in certain positions (e.g., LBE in the first fetch group of a given trace) while other LBE branches may allocate their own branch predictor entries.

For example, a multiplexer may receive the prediction lane outputs from MUX 850 of FIG. 8 which may include N prediction lanes for fetch groups of N instructions. Note that the same entry in one of the TAGE prediction tables may be used for instruction cache and trace cache hits (where the hit trace includes an LBE branch) in this example. For a trace cache hit, in this example, control circuitry controls the multiplexer (e.g., based on position field 1020) to select the proper prediction for the LBE branch.

The branch predictor may also provide a prediction for an unstable trace-ending CTI from MUX 855 in parallel with the LBE branch prediction. Generally, disclosed techniques may facilitate LBE branch prediction by sharing existing circuitry, which may limit area and power consumption due to LBE branches and prevent capacity pressure on the predictor tables, with only minor reductions in coverage. As discussed above, if the prediction for an LBE branch indicates an unexpected exit of the trace, control circuitry may chop the trace and redirect the front-end.

Note that various disclosed branch predictor techniques such as a dedicated trace cache lane, predictions for a trace-ending branch based on the fetch program counter of the first fetch group of a trace, etc. may be included in multiple separate branch predictors, e.g., separate predictors for direct branches and indirect branches, in some embodiments.

Section III—Detailed Example Embodiments

Example Hierarchical Trace Caches and Trace Pre-Fetching

Figure 11:
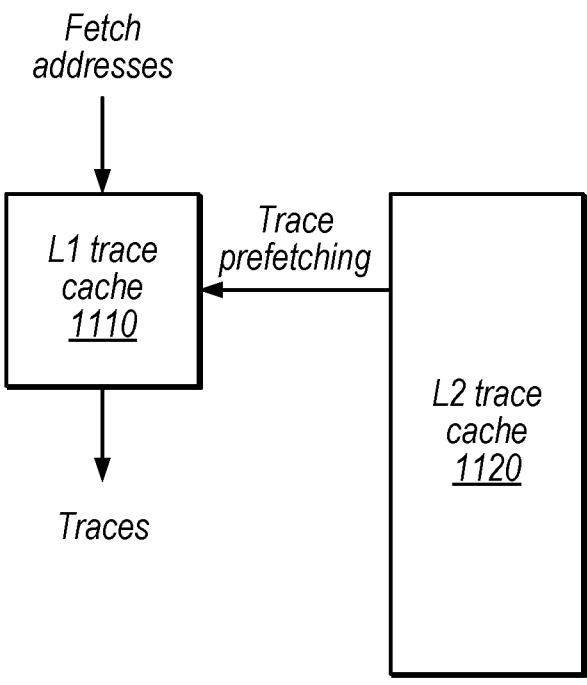
FIG. 11 is a block diagram illustrating an example processor with multiple trace cache levels, according to some embodiments.

FIG. 11 is a block diagram illustrating an example processor with multiple trace cache levels, according to some embodiments. In the illustrated example, the processor includes L1 trace cache 1110 and L2 trace cache 1120. In this example, the L1 cache is closer to the underlying processor pipeline than the L2 cache.

L2 trace cache 1120 may be substantially greater in size than L1 trace cache 1110. For example, L2 cache 1120 may include a greater number of entries configured to store traces than L1 cache 1110, may be configured to store longer traces, or both. In the illustrated example, the larger size of L2 cache 1120 makes it difficult to provide traces quickly enough for use by the processor pipeline (e.g., L2 trace cache 1120 may take a greater number of cycles to provide a fetch group than an L1 instruction cache).

Therefore, in the illustrated example, the processor is configured to prefetch traces from L2 trace cache 1120 into L1 trace cache 1110. Prefetching may allow immediate use of a trace in L1 cache 1110 for a request that hits on a prefetched entry (in contrast to non-prefetch implementations in which a miss in L1 cache 1110 might cause a fill from L2 cache 1120, but the trace would not be available for the request that caused the miss).

In some embodiments, the prefetching is signature based, as discussed in detail below with reference to FIG. 12. In other embodiments, various other prefetch topologies or techniques may be implemented. The prefetcher may look ahead multiple cycles from the fetch address used to generate the current signature. In embodiments with next fetch prediction, the prefetcher may also prefetch a target address associated with the predicted trace into the next fetch predictor. Note that the term "predict" refers to an indication of an event in advance of a determination that the event has occurred. For example, a prediction that a trace will be utilized occurs prior to actual execution of a fetch group and a tag check that confirms a hit for the trace in a trace cache. Similarly, a branch prediction occurs prior to a processor pipeline determining the direction of a branch (e.g., when the branch completes and is retired). Therefore, predictions are sometimes incorrect.

In some embodiments, traces evicted from L1 trace cache 1110 may exist in L2 trace cache 1120. Note that some traces may simply be discarded, e.g., based on multiple occurrences of incorrectly-predicted internal branches, while other traces that are used less, but not incorrectly predicted, may be stored in L2 trace cache 1120. In some embodiments, the traces stored in the L1 and L2 trace caches are mutually exclusive. In other embodiments, the traces may overlap (and in some implementations, L2 trace cache 1120 may be completely inclusive of the traces in L1 trace cache 1110). Trace caches 1110 and 1120 may implement entries with fields such as those shown in FIG. 3, for example. In some embodiments, various thresholds (e.g., for retention) in L2 trace cache 1120 are different than for L1 trace cache 1110, e.g., due to its large size.

Figure 12:
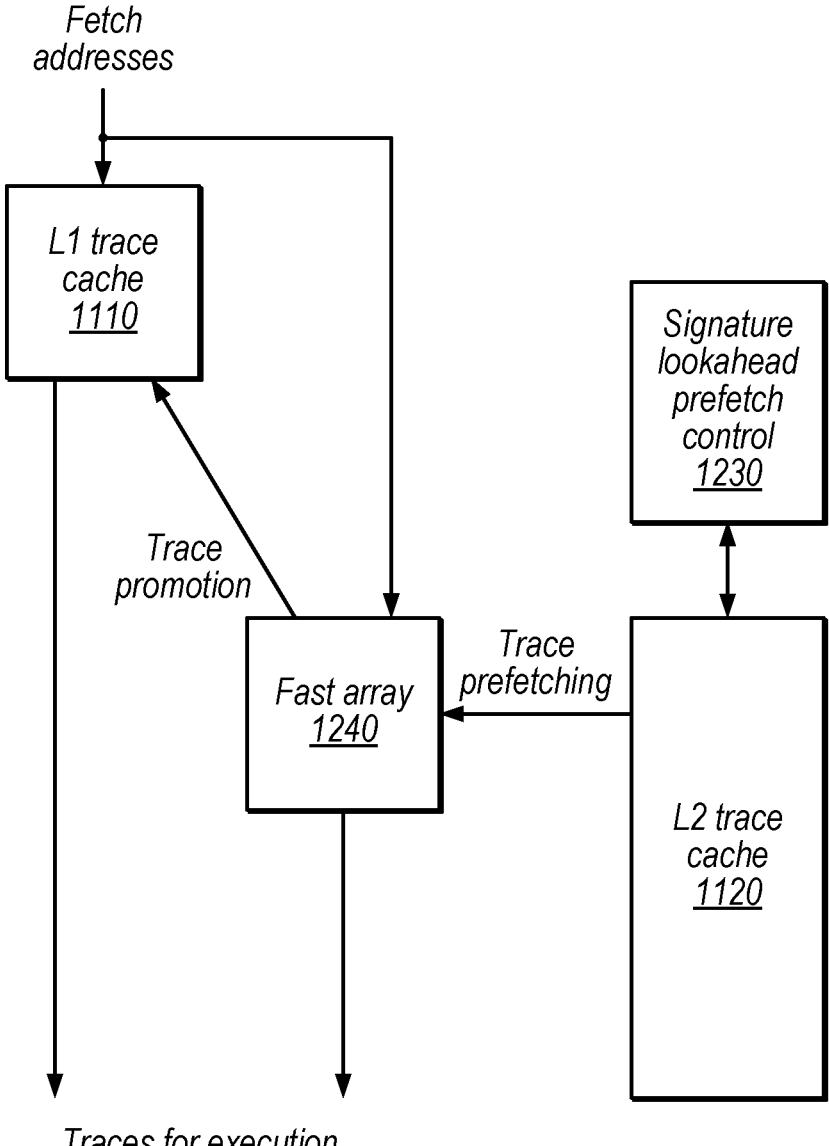
FIG. 12 is a block diagram illustrating example signature-based prefetching and a prefetch buffer, according to some embodiments.

FIG. 12 is a block diagram illustrating example signature-based prefetching and a prefetch buffer, according to some embodiments. In the illustrated example, the processor includes fast array circuitry 1240 (one example of prefetch buffer circuitry) between L2 trace cache 1120 and L1 trace cache 1110. The processor also includes signature lookahead prefetch control circuitry 1230, which is configured to control trace prefetching from L2 cache 1120 to fast array 1240.

Fast array 1240, in some embodiments, is configured to hold prefetched traces and provide traces in responses to hits. For example, when a trace is predicted to be useful, control circuitry 1230 may prefetch the trace from L2 trace cache 1120 into fast array 1240, which may provide the trace in response to a request that hits the trace in fast array 1240. Fast array 1240 may implement a smaller number of entries than L1 cache 1110. Control circuitry may promote entries from fast array 1240 into L1 cache 1110, e.g., when they are confirmed to be useful (e.g., based on being used or used a threshold number of times while in the fast array 1240). This may advantageously reduce or avoid pollution of the L1 trace cache 1110 (e.g., which could occur if a trace is prefetched but not actually used).

In some embodiments, fast array 1240 and L2 cache 1120 are configured to store a greater number of instructions per trace or per entry than L1 cache 1110 is configured to store. In those embodiments, wider traces may remain in fast array 1240 rather than being promoted to L1 cache 1110. Note that in some implementations, traces in fast array 1240 may be limited to the number of instructions supported by L1 cache 1110 and promoted to L1 cache 1110 in certain circumstances, e.g., in order to reduce thrashing in fast array 1240. Generally, however, L1 cache 1110 may not support traces that use the full instruction width of fast array 1240 in these embodiments. In other embodiments, an L1 trace cache may support wider fetch (e.g., wider than the instruction cache, the same as L2 cache 1120, or both), e.g., by increasing its instruction width or implementing an overflow buffer like the buffer discussed below with reference to FIG. 13.

Entries in fast array 1240 may include various fields similar to fields of L1 trace cache, L2 trace cache 1120, or both e.g., with replacement information to decide when to evict an entry from fast array 1240, validity information, size information (e.g., indicating whether or not a trace includes more than the number of instructions supported by L1 trace cache 1110), etc. In some embodiments, traces with more than N instructions are stitched and trained in L2 trace cache 1120. In some embodiments, traces with more than N instructions are stitched and trained in fast array 1240. Generally, longer traces may be implemented with or without trace prefetching, in various embodiments.

Signature lookahead prefetch control 1230, in some embodiments, is configured to train on misses in L1 trace cache 1110 that hit in L2 trace cache 1120. Entries with signatures corresponding to that scenario may have their confidence counter increased each time the scenario occurs. When the confidence reaches a threshold and an incoming signature matches the entry, circuitry 1230 may prefetch the corresponding trace from L2 cache 1120 to fast array 1240. Circuitry 1230 may also train based on execution results for prefetched traces (e.g., based on whether prefetched traces were hit in L1 trace cache 1110 and therefore useful). Prefetch control 1230 may implement multiple tables, e.g., a TO table based on a PC-based signature and a T1 table based on a history signature.

As used herein, the term "signature" refers to information that is generated based on locations of instructions in the taken execution path (e.g., based on addresses of one or more instructions in the taken path). When a new address is encountered, it may be used to modify the previous signature (e.g., using an exclusive-or (XOR) operation). The term "signature" encompasses a single address from the taken path as well as values generated by one or more operations that use multiple addresses in the taken path as inputs. Signatures may be generated based on all program counters on the taken path, addresses of taken control transfer instructions, targets of taken control transfer instruction, or some combination thereof, for example.

In some embodiments, circuitry generates a type of signature based on a fixed number of prior addresses. In signature-based prefetchers with multiple tables, the different tables may use signatures generated based on different categories of address information. Similarly, the different tables may use the same or different history lengths. For example, the length may range from a single address (e.g., the target of a single control transfer instruction) to the entire available execution history, sampled at certain points. The signatures for the different tables may be generated using the same or different mathematical operations or algorithms. For example, XOR circuitry may produce a new signature based on the current address and the previous signature for one type of signature, while other circuitry may implement other mathematical operations to generate another type of signature.

U.S. patent application Ser. No. 17/382,123, titled "Multi-table Signature Prefetch" and filed on Jul. 21, 2021 discusses various signature-based prefetch techniques for a next fetch predictor. Various similar techniques may be applied to generate signatures to facilitate trace prefetching by prefetch control 1230. In other embodiments, however, prefetch control 1230 may implement a single table.

Prefetch control 1230 may implement a queue to track one or more signatures for the last N fetch groups. This lookahead approach may reduce aliasing (e.g., relative to a post-retire signature) and allow smaller tables. The amount of lookahead refers to how far ahead in the instruction stream prefetching is attempted (e.g., the distance in the instruction stream between instructions that generated the signature and instructions pre-fetched based on the signature). Generally, lookahead may increase performance relative to post-retire signatures. Lookahead may allow prefetched data to arrive at or near a clock cycle in which the pipeline is ready to consume the data. On the other hand, too many cycles of lookahead may reduce prefetch accuracy. Therefore, the number of cycles of lookahead may be tuned based on these constraints.

In some embodiments, signature lookahead prefetch control 1230 is also configured to prefetch target information. For example, prefetch control 1230 may prefetch target addresses into a target prefetch buffer (e.g., trace fast NFP 1914 shown in FIG. 19 and discussed below), traces into a trace prefetch buffer (e.g., fast array 1240), or some combination thereof, as discussed below with reference to FIG. 19. Target prediction circuitry may train on a hit in L1 trace cache 1110 when there was a misprediction for the next trace in the trace next fetch predictor 420. Based on this training, circuitry 1230 may prefetch targets into the trace next fetch predictor 420.

As mentioned above, while two levels of trace cache are shown (L1 and L2 in this example), disclosed techniques may be implemented using any appropriate number of hierarchical trace cache levels. In those embodiments, techniques discussed with reference to a given cache level (e.g., L2) herein may be applied to other caches levels (e.g., L1, L3, L4, etc.).

Example Trace Caching with Multiple Trace Lengths and Sequential Instruction Caching As briefly discussed above, certain levels in the trace cache hierarchy (e.g., circuitry 1120 and 1240) may be configured to store wider traces than other levels. This may improve the overall front-end fetch bandwidth without substantial increases in size or power consumption for the L1 trace cache.

Figure 13:
FIG. 13 is a block diagram illustrating an example trace cache instruction array that supports multiple trace cache lengths, according to some embodiments.

FIG. 13 is a block diagram illustrating an example trace cache instruction array that supports multiple trace cache lengths. In some embodiments, L2 cache 1120 implements such an array to store instructions (it may also implement a tag array to store tags, e.g., in a content-addressable memory). In this example, the table includes both a standard array and an overflow buffer 1340.

A given entry in standard array, in this example, includes trace instructions 1310, an extended entry field 1320 (e.g., a bit) that indicates whether the entry has additional instructions, and a pointer field 1330 configured to store a pointer to an entry of overflow buffer 1340. For standard-length traces (e.g., supported by L1 cache 1110), the trace instructions reside in field 1310 and the overflow buffer 1340 is not used. For wider traces, control circuitry sets the extended entry field 1320 and stores a pointer to the remainder of the instructions in field 1330. The remaining instructions are stored in the corresponding entry of the overflow buffer (as shown for trace B, in the illustrated example). When the overflow buffer is full, control circuitry may chop a longer trace for storage in the standard array only, may select an overflow buffer entry for eviction, etc.

Figure 14:
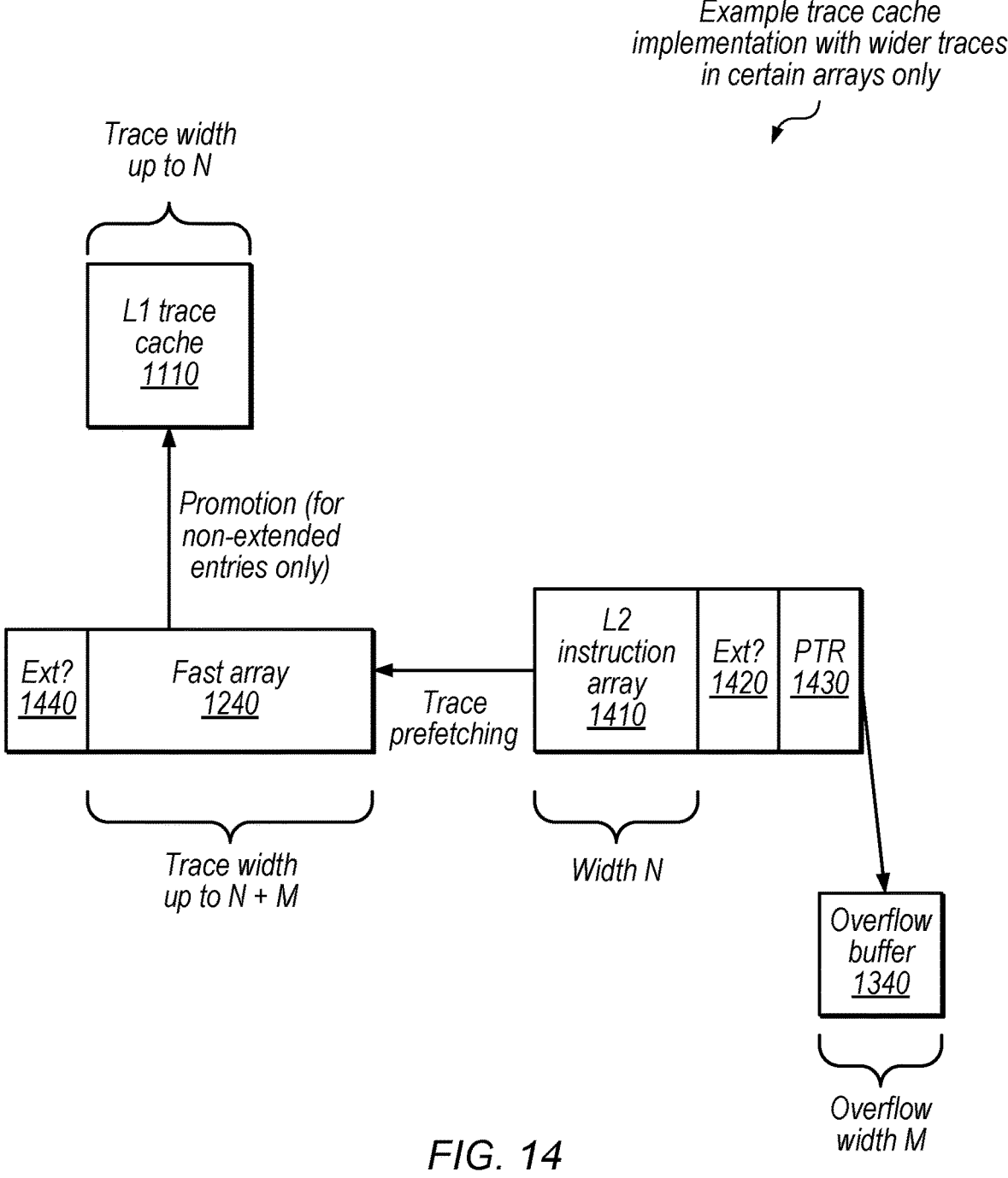
FIG. 14 is a block diagram showing a more detailed example of circuitry configured to handle wider traces, according to some embodiments.

FIG. 14 is a block diagram showing a more detailed example of circuitry configured to handle wider traces, according to some embodiments. In this example, L1 trace cache 1110 is configured to store traces having up to N instructions. In some embodiments, N instructions corresponds to the width of a fetch from the instruction cache. This may advantageously allow support of wider fetch groups without changes to other front-end circuitry.

Fast array 1240 supports wider fetch groups and implements entries configured to store up to N+M instructions. In this example, fast array 1240 implements an extended field 1440 that indicates whether an entry stores more than N instructions. If so, that entry is not allowed to promote to L1 cache 1110.

The L2 cache 1120, in this example, includes L2 instruction array 1410, extended field 1420, and pointer field 1430 (these three fields may correspond to fields 1310, 1320, and 1330 of FIG. 13) and is configured to utilize overflow buffer circuitry 1340 for traces with more than N instructions.

In some embodiments, to facilitate wide fetching more broadly, one or more trace cache levels are also configured to store sequences of up to M+N instructions (e.g., that do not include any predicted-taken branches). This may allow those sequences to be fetched at high bandwidth when they can be trained in a trace cache, e.g., without changing the width of instruction cache lines.

FIG. 15 is a block diagram illustrating an example wide fetch group of sequential instructions, according to some embodiments. In the illustrated example, up to N+M sequential instructions may be stored in an L2 or fast array entry. These entries may use various trace cache training techniques to track usefulness and determine when to retrieve a sequence of instructions in response to a hit. Similar techniques may be used to track usefulness for traces and sequences of instructions, independently or in conjunction (and usefulness may also be used to determine when to evict traces/sequences). As shown, a given set of sequential instructions may include any number of internal not-taken branches and end with a non-branch or a branch in either direction. (As discussed throughout this disclosure, a given trace cache entry may also store traces with predicted-taken internal branches with up to N+M instructions). In some embodiments, training circuitry marks a given training entry as either a sequential or a trace entry, although both types may be treated similarly for various operations. In some embodiments, control circuitry may allow storage of sequential instructions having up to a threshold number of less stable or unstable branches.

Note that various workloads may include a large number of sequential sets of up to N+M instructions, therefore certain limits may be imposed on these sequences, e.g., to avoid overrunning traditional traces in the L2 trace cache 1120. In some embodiments, the processor implements side table circuitry (not shown) which may be off the critical path. This side table may include entries that track the frequency of various sequences of instructions. (Note that the side table may track sequence frequency but may not actually store instructions). Control circuitry may limit formation and storage of sequential sets of instructions in L2 instruction array 1410 and overflow buffer 1340 to a threshold number of the most-common sequences indicated by the side table. Stored sequences in the L2 trace cache 1120 may then be prefetched by control circuitry 1230 to the fast array 1240 just like traditional traces. In some embodiments, separate limits are imposed on the number of sequential sets of instructions stored in fast array 1240 and L2 trace cache 1120 (e.g., a greater number may be allowed in L2 trace cache 1120 due to its size).

Disclosed techniques may advantageously allow wider sequential fetch groups and longer traces in certain scenarios, without increasing circuit area and power consumption for other portions of the processor front-end (e.g., the L1 trace cache 1110, the instruction cache, and various instruction buffers may remain sized to store up to N instructions).

Example Branch Prediction Techniques for Wider Fetch Groups

Allowing wider fetch groups in some tables may impact branch predictors, in various embodiments. For example, a branch predictor may include lanes configured to generate predictions for up to N instructions in a given fetch group. For wider fetch groups (e.g., M+N instructions), it may be desirable to provide branch predictions without adding M additional branch predictor lanes. Therefore, in some embodiments, the processor is configured to reinterpret branch prediction states for wide fetch groups. For example, the processor may take advantage of the fact that intermediate unstable branches in a sequential fetch group are mostly not taken and provide predictions for up to a threshold number of internal branches (where the threshold is less than N).

Note that while wide fetch groups are discussed herein in the context of trace cache storage, similar branch prediction techniques may be used for wide fetch groups stored in various other memory or cache circuitry.

Figure 16:
FIG. 16 is a diagram illustrating example relevant states for up to three branches in a wide sequential fetch group, according to some embodiments.

FIG. 16 is a diagram illustrating example relevant states for up to three branches in a wide sequential fetch group. In this example, branch 0 is earlier in program order than branch 1, which is in turn earlier in program order than branch 2. Referring to state A, if branch 0 is taken, it does not matter whether subsequent branches are taken or not (execution has left the stored sequential group of instructions because the branch was taken). For state B, if the first branch is not taken but the second branch is taken, it does not matter whether the third branch was taken. States C and D cover situations where both the first two branches were not taken. These states may be described as folding intermediate predictions into the last unstable prediction.

In some embodiments, existing branch predictor circuitry may be used with new state encodings based on the illustrated states. For example, the entries in shared prediction table(s) 726 of FIG. 7 may interpret their counters as illustrated based on an indication that a given table entry is for a sequence of instructions in which any internal branches are predicted-taken.

Figure 17:
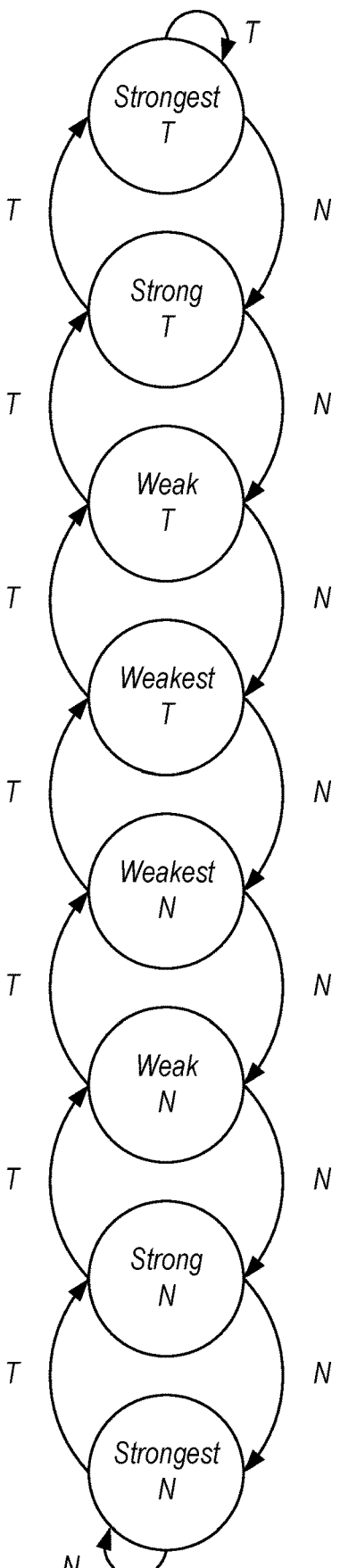
FIG. 17 is a diagram illustrating an example 3-bit branch predictor counter implementation, according to some embodiments.

FIG. 17 is a diagram illustrating an example 3-bit branch predictor counter implementation. Note that this example encoding may be used for traditional fetch groups while the encoding of FIG. 18 may be used for wide sequential fetch groups by the same branch predictor table, in some embodiments.

FIG. 17 shows four taken (T) states ranging from weakest taken to strongest taken and four not taken (N) states ranging from weakest not-taken to strongest not-taken. In this saturating counter example, the state moves toward strongest taken when a branch is confirmed taken during execution and moves toward strongest not-taken when a branch is confirmed not taken during execution. Note that 3-bit counters and example states are used herein for purposes of illustration, but various appropriate encodings and field sizes may be used for traditional fetch groups, wide fetch groups, or both.

Figure 18:
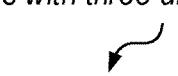
FIG. 18 is a diagram illustrating an example reinterpretation of the 3-bit branch predictor counters for certain (e.g., wide) fetch groups, according to some embodiments.

FIG. 18 is a diagram illustrating an example reinterpretation of the 3-bit branch predictor counters of FIG. 17 for certain (e.g., wide sequential) fetch groups, according to some embodiments. In the illustrated example, the branch predictor implements strong and weak versions of each of the following states from FIG. 16: TXX, NTX, NNN, and NNT. The eight represented states may be represented using the same 3-bit counter hardware as discussed for FIG. 17.

The $1^{st}$, $2^{nd}$, $3^{rd}$ references are to the first, second, and third unstable branches in a fetch group, respectively. As shown, the state transitions in certain scenarios where a given one of these branches is taken (T) or not taken (N). For example, state transitions from NNT weak to NNT strong when the third branch is confirmed to be taken during an execution of the fetch group. For states with multiple transitions, a logical OR relationship is represented. For example, the transition from NNN strong to NNN weak occurs when the third branch is taken, when the second branch is taken, or when the first branch is taken in the NNN strong state. The "observing" term in the transitions (e.g., for the $2^{nd}$ and $3^{rd}$ branches when transitions from TXX strong to TXX weak) means that the branch occurred, and it does not matter whether the branch was taken or not. In some embodiments, the base table TO 810 of FIG. 8 may be used to record the most common prediction.

The disclosed techniques may advantageously allow branch predictor(s) 130 to provide accurate predictions for multiple internal unstable or less stable predicted-not-taken branches in wide sequential fetch groups, with limited increases in area and power consumption.

Note that for long traces (e.g., with between N and M+N instructions) stored in fast array 1240, the logic for trace cache lane 724 of FIG. 7 may be used to predict the direction of the last control transfer instruction in the trace.

Example Detailed System

Figure 19:
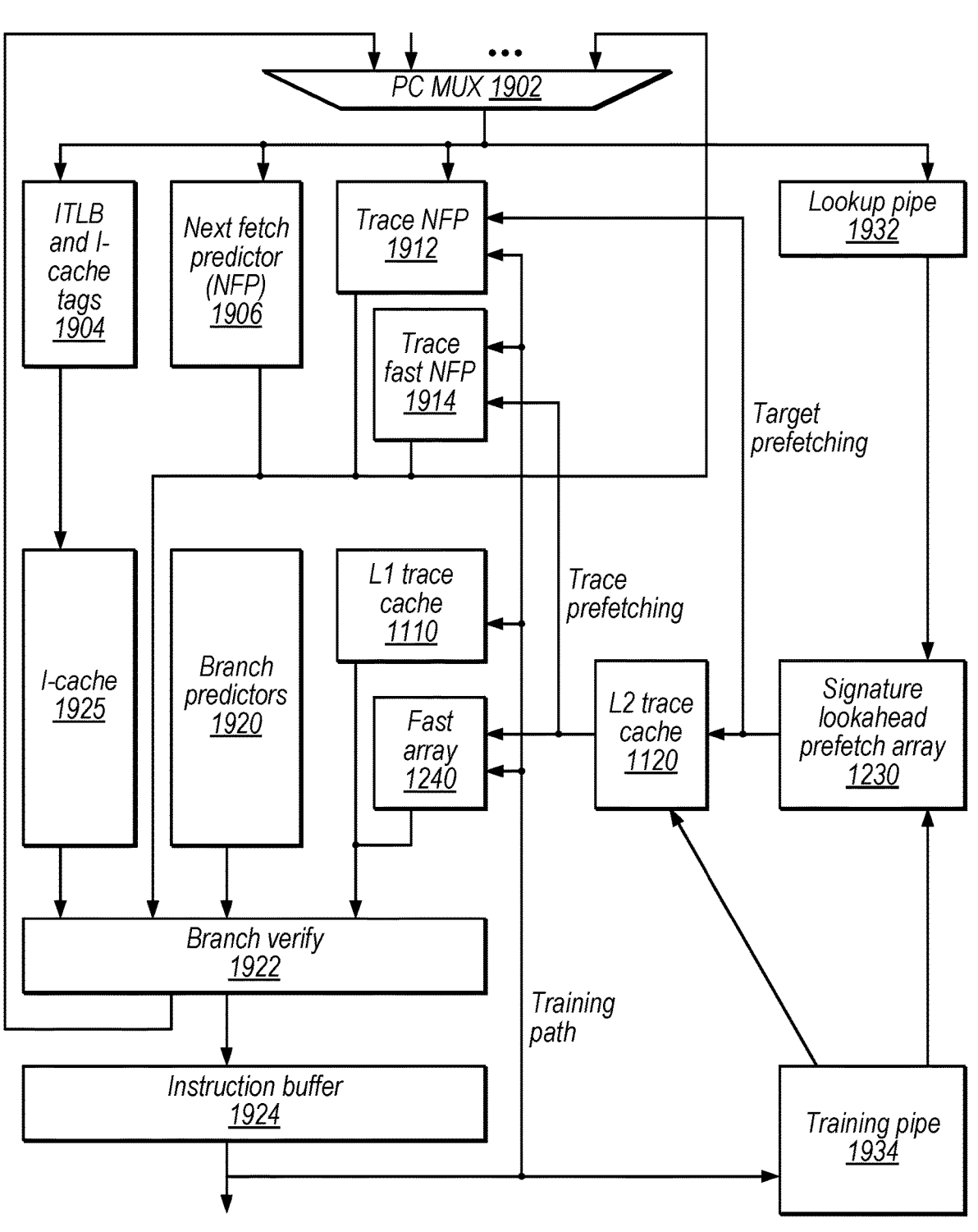
FIG. 19 is a block diagram illustrating a detailed example processor front-end that implements hierarchical trace caches, trace prefetching, target prefetching, and a fast array, according to some embodiments.

FIG. 19 is a block diagram illustrating a detailed example processor front-end that implements hierarchical trace caches, trace prefetching, target prefetching, and a fast array, according to some embodiments. In the illustrated example, the processor includes: L1 trace cache 1110, L2 trace cache 1120, signature lookahead prefetch array 1230, fast array 1240, PC multiplexer (MUX) 1902, instruction translation lookaside buffer (ITLB) and instruction cache tag circuitry 1904, next fetch predictor circuitry 1906, trace next fetch predictor circuitry 1912, trace fast next fetch predictor circuitry 1914, instruction cache circuitry (I-cache) 1925, branch predictor circuitry 1920, branch verify circuitry 1922, instruction buffer circuitry 1924, and lookup pipe circuitry 1932, training pipe circuitry 1934.

Note that, referring to previous figures, instruction cache 1925 is one example of instruction cache 120 of FIG. 1, L1 trace cache 1110 is one example of trace cache 110, next fetch predictor 1906 is one example of next fetch predictor 410 of FIG. 5, and trace next fetch predictor 1912 is one example of trace next fetch predictor 420 of FIG. 5.

PC MUX 1902, in the illustrated example, selects from among multiple possible fetch PCs, e.g., from next fetch predictors, branch predictors, the sequential next PC, etc. It provides the selected PC to the ITLB and I-cache tags 1904, to NFP 1906, to trace NFP 1912, and to lookup pipe 1932. Each of those circuit structures may utilize the PC to determine hits or misses and, for hits, a given structure may provide a subsequent prediction to PC MUX 1902, provide instructions for execution, etc.

Lookup pipe circuitry 1932, in the illustrated embodiment, is configured to determine a signature based on the incoming PC from PC MUX 1902 and access an entry in signature lookahead prefetch array 1230 based on the signature. If there is a hit and the entry is valid and trained, circuitry 1230 may initiate trace prefetching from L2 trace cache 1120. Circuitry 1230 may also prefetch corresponding target address information, as discussed in detail below.

I-cache 1925, in some embodiments, is configured to provide a fetch group (e.g., from an instruction cache line) if there is a hit in the instruction cache tags 1904. NFP 1906, trace NFP 1912, trace fast NFP 1914, or some combination thereof may provide a predicted next fetch address. As shown, circuitry 1904 may also include ITLB circuitry for virtual to physical translations.

Trace NFP 1912, in some embodiments, is configured similarly to trace next fetch predictor 420 discussed above with reference to FIG. 5, e.g., to predict the next PC after the end of a trace provided from a trace cache (where the next PC may be multiple fetch groups away). In the illustrated embodiment, signature lookahead prefetch array 1230 may prefetch a corresponding next target into trace NFP 1912 from L2 trace cache 1120 when predicting that a trace will be executed (in conjunction with prefetching a corresponding trace into fast array 1240 and trace fast NFP 1914).

Trace fast NFP 1914, in some embodiments, is configured to store targets and pre-hashed tokens corresponding to stored targets in L2 trace cache 1120. Thus, trace fast NFP 1914 may store prefetched target data similarly to fast array 1240 storing prefetched trace data. Trace fast NFP 1914 is configured to provide this information to branch verify circuitry 1922 on a hit similarly to trace NFP 1912 (and data from trace fast NFP 1914 may be promoted to trace NFP 1912 in certain scenarios, similarly to promotion of entries from fast array 1240 to L1 trace cache 1110). Note that trace fast NFP 1914 and fast array 1240 may also store trace/target information that is not pre-fetched, e.g., captured via the training path as shown in FIG. 19. Further note that there may be a 1:1 relationship between entries in fast array 1240 and trace fast NFP 1914, similarly to a 1:1 relationship between L1 trace cache 1110 and trace NFP 1912, in some embodiments. In these embodiments, a hit in one of the NFP tables may always correspond to a hit in a corresponding trace entry. In other embodiments, such a relationship is not maintained.

In some embodiments, the contents of the fast arrays 1240 and L1 trace cache 1110 are mutually exclusive (and similarly trace fast NFP 1914 and trace NFP 1912 may be mutually exclusive) such that there will only be a hit in one of these structures in a given cycle. The contents of L1 trace cache 1110 and L2 trace cache 1120 may also be mutually exclusive. In other embodiments, the contents of these structures may be allowed to overlap, and arbitration circuitry may handle scenarios with multiple hits.

Branch verify 1922, in the illustrated embodiment, receives fetched instructions (e.g., from instruction cache 1925 or one or more trace cache arrays) and branch prediction results from one or more branch predictors. If the expected direction is confirmed by the branch predictor results, branch verify circuitry 1922 stores the fetched instructions in instruction buffer 1924 (if not, branch verify 1922 may discard the instructions and re-direct the PC MUX 1902).

Instruction buffer 1924 is configured to buffer instructions for execution by subsequent pipeline stages. Instructions may be appropriately scheduled for dispatch and execution by execution circuitry according to various well-understood techniques (e.g., out-of-order with dependency checking, using priority-based scheduling, etc.). Information about buffered instructions is also provided to L1 trace cache 1110, trace NFP 1912, and training pipe circuitry 1934 via a training path. Generally, effective trace caching and wide fetch techniques may advantageously increase the number of instructions in instruction buffer 1924 available for scheduling, dispatch, and execution by a given workload.

Note that instruction buffer 1924 may include entries sized to store a single L1 trace cache trace (e.g., up to N instructions), which may advantageously allow various portions of the illustrated circuitry to remain the same width, even through fast array 1240 and L2 trace cache 1120 may support wider sequential fetch groups, longer traces, or both. In these embodiments, instruction buffer 1924 may utilize multiple entries to store a sequence or trace of instructions with more than N instructions (e.g., from fast array 1240 or L2 trace cache 1120). For example, entry [i] may store the first N instructions while entry [i+1] may store up to M additional instructions (or multiple entries may store the additional instructions if M is greater than N).

As briefly discussed above, traces are prefetched from L2 trace cache 1120 into trace fast NFP 1914 or fast array 1240 based on predictions by circuitry 1230. L2 trace cache 1120 also trains based on results from instruction buffer 1924 (e.g., to update trace usefulness based on traces that were used, mis-predicted, or unexpectedly executed). Trace cache training may utilize a stitch buffer (not explicitly shown) to aggregate traces. Training pipe 1934 may maintain usefulness information to determine when to promote a trace from the stitch buffer into L2 trace cache 1120. Traces may also train for promotion directly into L1 trace cache 1110, in some embodiments.

Training pipe 1934 also trains signature lookahead prefetch array 1230 to predict which traces will be executed (e.g., updating entries that match the execution signature based on the corresponding results from instruction buffer 1924). This training may also update confidence values for target predictions for target prefetching. In some embodiments, circuitry 1230 trains for trace prefetching on situations where there is a miss in L1 trace cache 1110 but a hit in L2 trace cache 1120. In some embodiments, circuitry 1230 trains for target prefetching on a hit in L1 trace cache 1110 and a misprediction by trace next fetch predictor 1912.

Example Filtering Techniques for Cache Maintenance Operations

A processor typically supports various cache maintenance operations, e.g., instruction cache invalidates, TLB invalidates (TLBIs), permission change updates, etc. In this context, flushing corresponding trace cache data may be important. It may be challenging, however, to determine which trace cache data should be flushed. For example, checking the trace cache tags may consume substantial power, may utilize translations from virtual to physical addresses (e.g., because the trace caches may be virtually indexed and virtually tagged while the instruction cache may be physically tagged), may involve determining alignment when a trace cache is not aligned with cache lines of the instruction cache or memory pages, etc. In the virtual address context, a given trace with taken internal branches may include instructions from multiple different pages. Flushing an entire trace cache level for cache maintenance events, however, may reduce performance by impacting trace cache hit rates when trace data is flushed unnecessarily.

In some embodiments, control circuitry is configured to flush one or more trace cache levels entirely (e.g., L1) in response to certain cache maintenance events, but is configured to filter flushing at one or more other levels (e.g., L2) at intermediate granularity, as discussed in detail below. This may preserve most of the trace cache performance that would be achieved with explicit tracking, but with limited increases in area and power consumption to ensure correctness for cache maintenance events.

Figure 20:
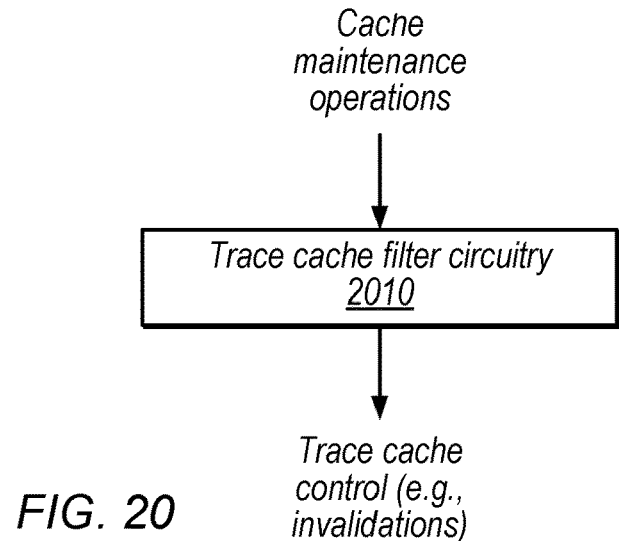
FIG. 20 is a block diagram illustrating example trace cache filter circuitry, according to some embodiments.

FIG. 20 is a block diagram illustrating example trace cache filter circuitry, according to some embodiments. In the illustrated example, trace cache filter circuitry 2010 is configured to receive cache maintenance operations and generate trace cache control signals (e.g., invalidations) based on various filtering parameters. Specific example control circuitry is discussed in detail below for TLB invalidates, cache invalidations, and permission changes. These specific examples are included for the purpose of illustration but are not intended to limit the scope of the present disclosure. For example, various other appropriate techniques may be utilized that provide filtering that triggers at a granularity that is greater than specific trace cache entries but less than the entirety of a given trace cache level.

Figure 21:
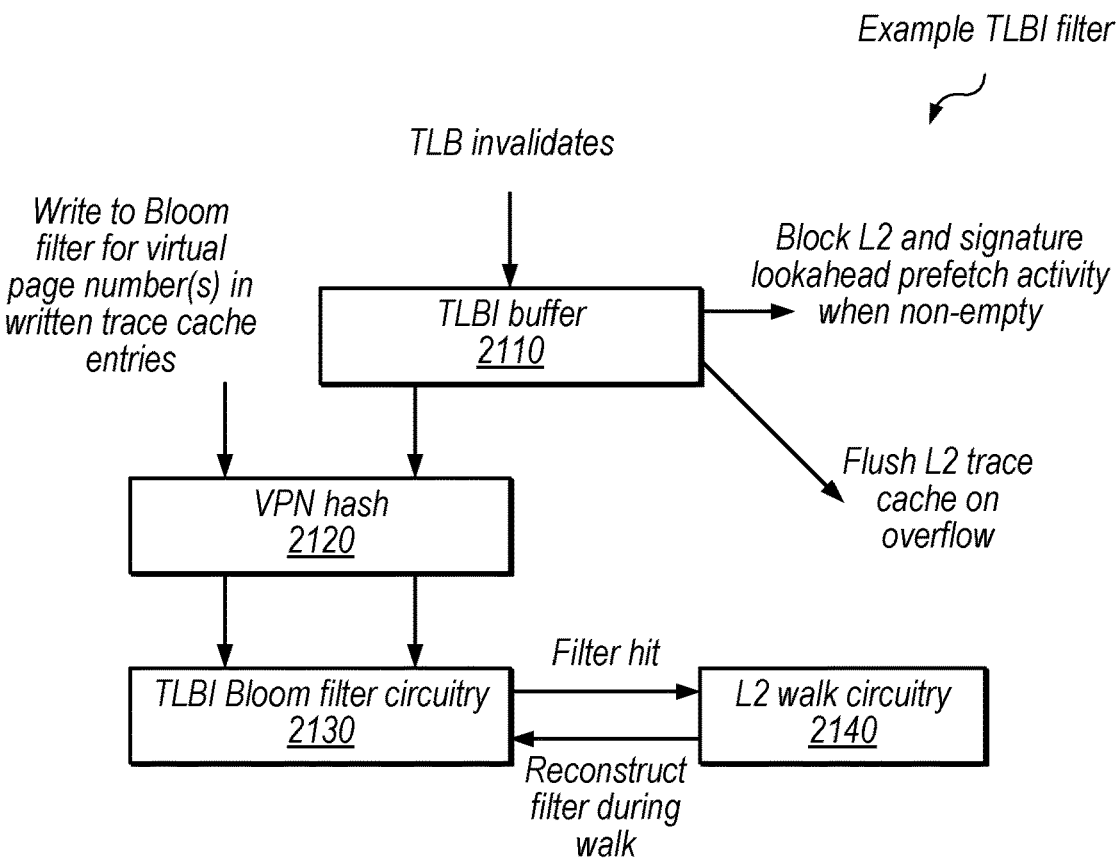
FIG. 21 is a block diagram illustrating example filter circuitry for translation lookaside buffer invalidate operations, according to some embodiments.

FIG. 21 is a block diagram illustrating example filter circuitry for translation lookaside buffer invalidate operations, according to some embodiments. In the illustrated example, the processor includes TLBI buffer circuitry 2110, virtual page number (VPN) hash circuitry 2120, TLBI Bloom filter circuitry 2130, and L2 walk circuitry 2140. Generally, the circuitry of FIG. 21 is configured to determine when to flush data from the L2 trace cache in response to a TLBI.

TLBI buffer 2110, in the illustrated embodiment, is configured to store received TLB invalidates. As shown, control circuitry may block L2 trace cache and signature lookahead prefetch activity when the buffer 2110 is non-empty. This may ensure that stale trace cache data is not improperly used. Also, if the buffer 2110 overflows, control circuitry may flush the entire L2 trace cache. This may be unusual, however, even with a relatively small buffer 2110.

VPN hash 2120, in the illustrated embodiment, is configured to receive VPNs corresponding to written L2 trace cache entries and hash each received VPN. The output hash is used to set a corresponding bit in TLBI Bloom filter circuitry 2130. Note that a given trace may correspond to multiple VPNs because of internal taken branches, so control circuitry may set multiple bits in filter circuitry 2130 in response to writing a given L2 trace cache entry.

VPN hash 2120 is also configured to hash virtual page numbers from TLBIs from the buffer 2110 and use the hash output to check the TLBI Bloom filter circuitry 2130. If there are no hits in the filter circuitry 2130, no further L2 trace cache action need be taken for that TLBI. If there is a hit in the Bloom filter circuitry for a TLBI from buffer 2110, control circuitry signals to L2 walk circuitry 2140 to walk the L2 trace cache and flush indicated data. Note that disclosed techniques may result in false positives (e.g., it is understood that Bloom filters may be rise to false conflicts), but the costs of occasionally performing unnecessary L2 trace cache walks may be outweighed by the advantages (e.g., over implementations that flush the entire L2 trace cache on TLBIs or implementations that track cache maintenance operations at finer granularity to avoid false positives).

L2 walk circuitry 2140, in the illustrated embodiment, is configured to walk each valid entry in the L2 trace cache, read those entries to determine whether any of its VPN(s) match the TLBI, and invalidate any matching entries. Note that in these embodiments, trace cache entries may directly store virtual page numbers. Control circuitry may stall the prefetch pipeline during the entire walk so that the fast and L1 tables do not receive trace data from the L2 trace cache during the walk interval.

In the illustrated example, L2 walk circuitry 2140 also reconstructs the Bloom filter of circuitry 2130 during the walk. This may update the filter to keep it from becoming stale (e.g., any trace cache writes that caused a bit to be set in the filter and later became invalid will not be reflected after the reconstruction during the walk by circuitry 2140).

Note that in some embodiments, prefetching may not be paused during the entirety of the L2 walk. For example, in some embodiments, the walk may maintain a pointer indicating the current progress and prefetches may be allowed for entries behind that point (that have already been verified as not being invalidated for the cache maintenance operation). Cache control circuitry for the L1 trace cache may also begin constructing and training traces during the walk of the L2 cache.

Further note that while disclosed filtering and permission check techniques are applied to a trace cache structure, these techniques may also be applied to other instruction storage circuitry. These techniques may be particularly relevant for instruction storage circuitry that is accessed using virtual addresses, that stores many instructions, that is not cache-line aligned, or some combination thereof.

Figure 22:
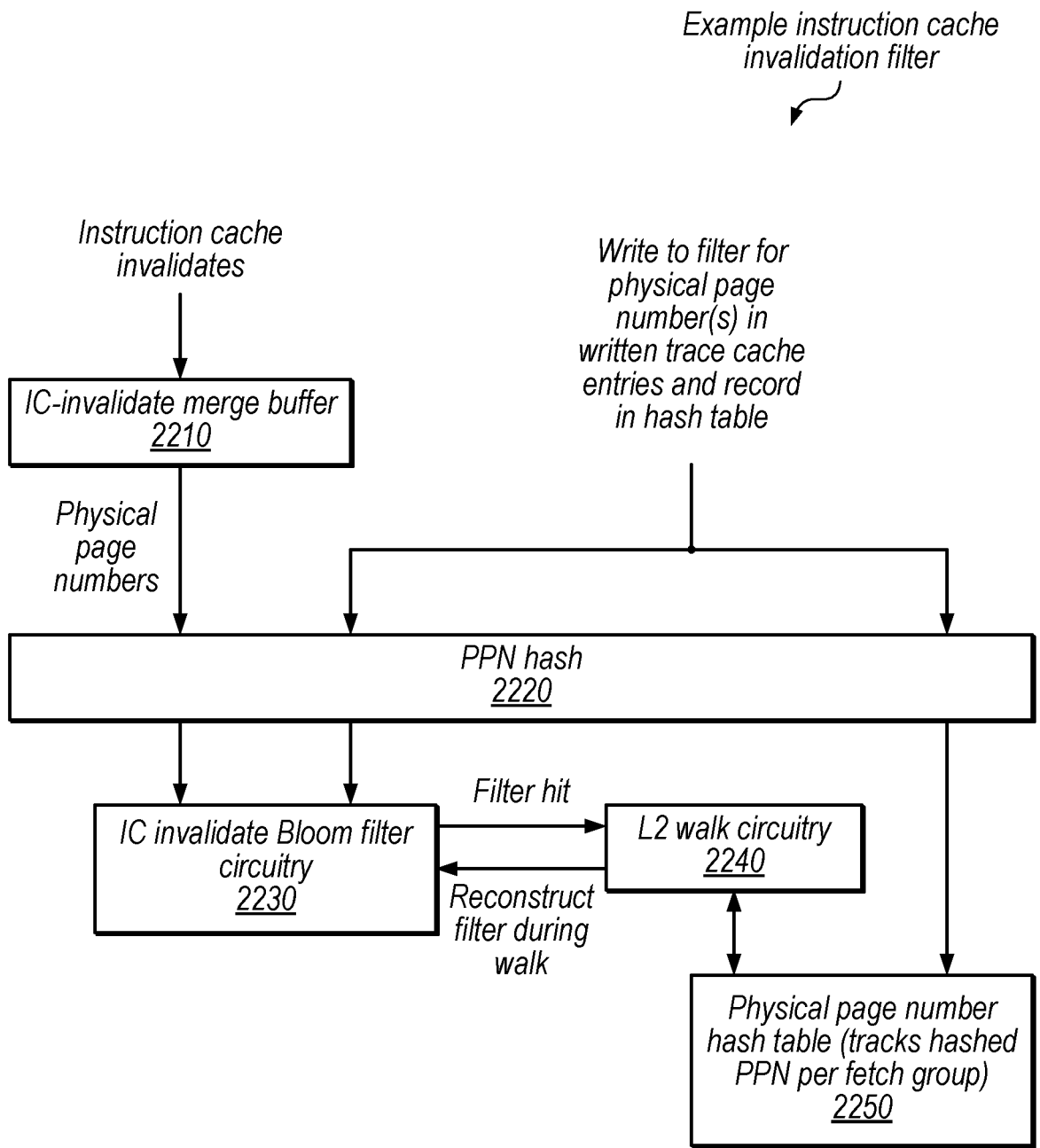
FIG. 22 is a block diagram illustrating example filter circuitry for cache invalidation operations, according to some embodiments.

FIG. 22 is a block diagram illustrating example filter circuitry for cache invalidation operations, according to some embodiments. In the illustrated example, the processor includes instruction cache (IC)-invalidate merge buffer 2210, physical page number (PPN) hash circuitry 2220, IC invalidate Bloom filter circuitry 2230, L2 walk circuitry 2240, and PPN hash table circuitry 2250. Generally, the circuitry of FIG. 22 is configured to determine when to flush data from the L2 trace cache in response to an instruction cache invalidate.

IC-invalidate merge buffer 2210, in the illustrated embodiment, is configured to buffer instruction cache invalidates and provide corresponding physical page numbers for filtering. Note that merge buffer 2210 may also merge multiple cache line invalidates. For example, a page invalidation may correspond to multiple instruction cache line invalidates. Therefore, merge buffer 2210 may often receive multiple instruction cache invalidates back-to-back to the same page. Merge buffer 2210 may merge invalidations to the same physical page number and send a single physical page number to PPN hash circuitry 2220 for multiple merged entries.

Control circuitry may flush the L2 trace cache if the merge buffer 2210 overflows, as discussed above in the context of an overflow of buffer 2110.

PPN hash circuitry 2220, as shown, is also configured to receive information for writes to physical page number written to the L2 trace cache. As shown, the hashed physical page numbers may be used to set entries in IC invalidate Bloom filter circuitry 2230 and also stored in PPN hash table 2250, which may track a hashed PPN for a given fetch group. Note that in embodiments in which trace cache entries use virtual page numbers, a given trace cache entry may not store the corresponding physical page numbers. Therefore, hash table 2250 may maintain this information on the side and provide the information to L2 walk circuitry 2240. In some embodiments, PPN hash table 2250 is implemented as a side SRAM.

In response to a filter hit from a hashed PPN from merge buffer 2210, L2 walk circuitry 2240 is configured to walk the L2 trace cache, access corresponding entries in PPN hash table 2250, and compare the data with the PPN that hit in the filter. As discussed above for TLBIs, L2 walk circuitry 2240 may also rebuild the Bloom filter maintained by circuitry 2230 during the L2 trace cache walk. Thus, the circuitry of FIG. 22 may appropriately invalidate L2 trace cache entries corresponding to instruction cache invalidations, in various embodiments.

Figure 23:
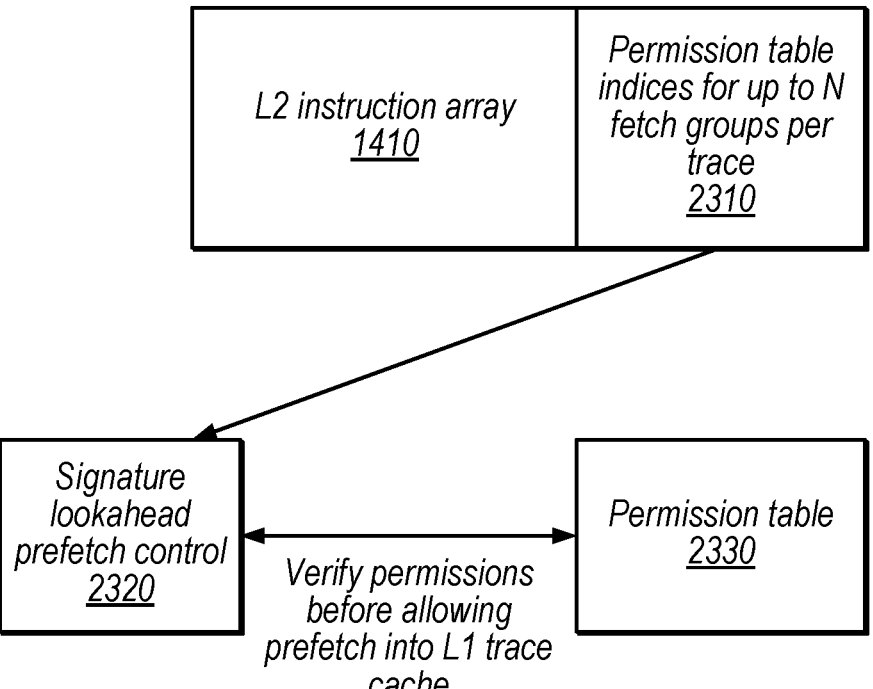
FIG. 23 is a block diagram illustrating example permission change tracking, according to some embodiments.

FIG. 23 is a block diagram illustrating example permission change tracking, according to some embodiments. In the illustrated example, the processor includes, for a given entry in the L2 instruction array 1410 of the L2 trace cache, permission table indices for up to N fetch groups per trace. Note that permissions may change for various reasons. For correctness and security, control circuitry could flush the entire L2 trace cache on a permissions change (and the control circuitry flushes the entire L1 trace cache when permissions change in some embodiments). In the embodiment of FIG. 23, however, the control circuitry uses the stored permission table indices to prevent prefetching of traces from the L2 cache when sufficient permissions are not detected, which may advantageously avoid a complete flush of the L2 cache.

Note that permissions may change in various scenarios. For example, a processor may implement overlayed permission bits for a page table. Just-in-time (JIT) compilation software or the operating system may change the overlayed permission bits. Permission table 2330 is an example of such a permission overlay. Disclosed techniques may reduce trace cache invalidates relative to traditional techniques for changing permissions.

Signature lookahead prefetch control 2320, in the illustrated embodiment, is configured to first retrieve permission table indices from 2310 for a given trace and use the indices to verify permissions in permission table 2330, prior to allowing prefetches from the L2 instruction array 1410 to the L1 trace cache. If the permissions are not satisfied, control circuitry 2320 blocks those prefetches. This may advantageously ensure that traces from the L2 trace cache are not improperly executed without requiring a flush of the entire L2 trace cache. Further, disclosed techniques may involve limited augmentation to the L2 trace cache storage, e.g., to store up to N indices for traces that include up to N taken branches.

Example Prediction and Power Control Techniques

Figure 24:
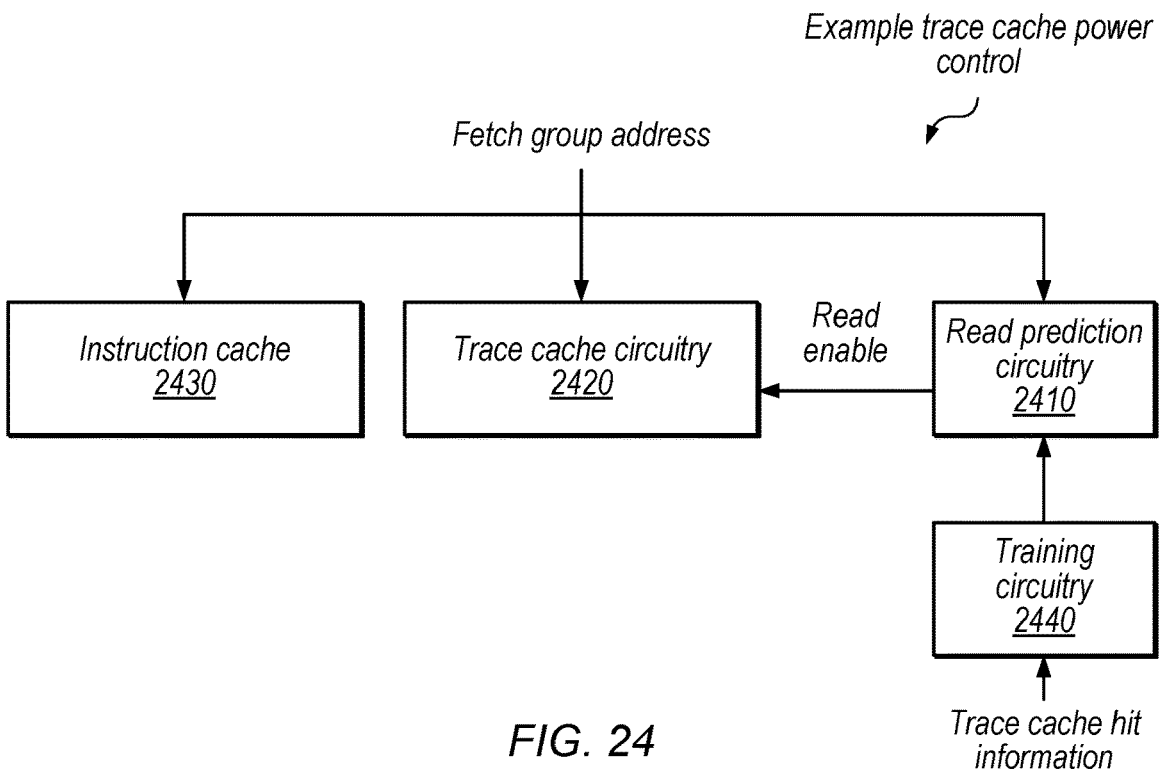
FIG. 24 is a block diagram illustrating example trace cache read prediction circuitry, according to some embodiments.
Figure 25:
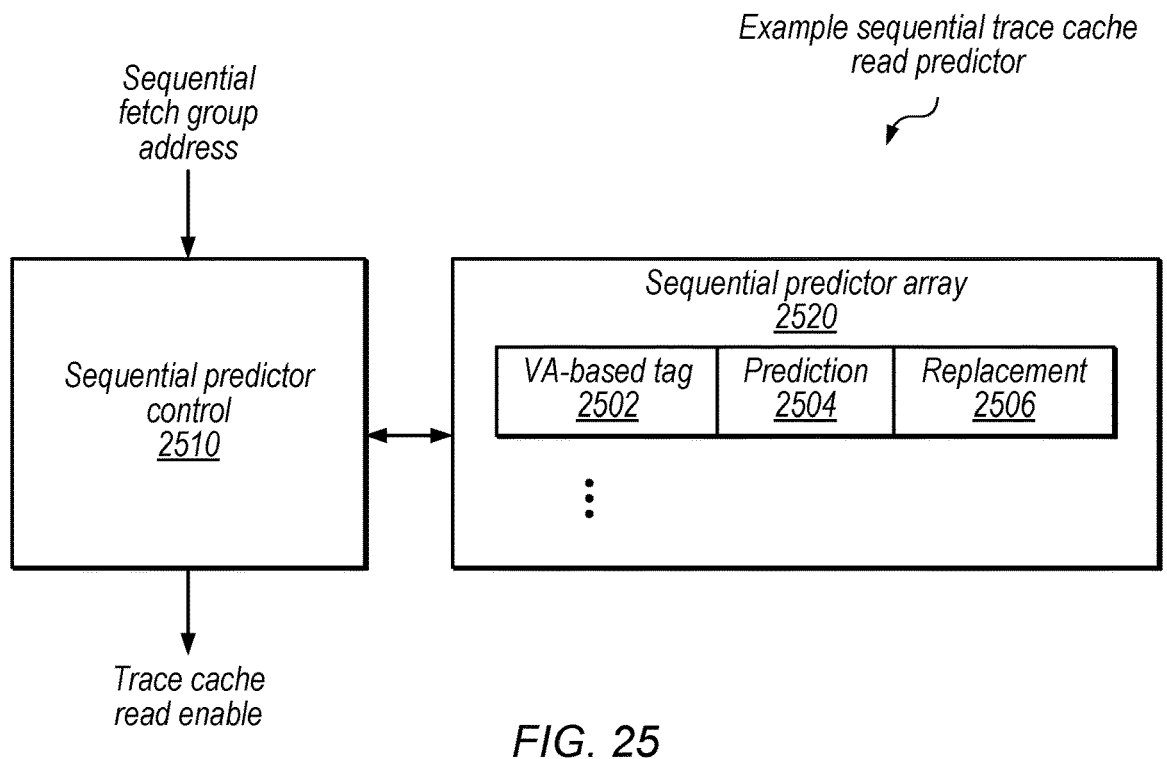
FIG. 25 is a block diagram illustrating example read predictor circuitry for sequential addresses, according to some embodiments.

Trace caches typically improve performance but also increase processor power consumption when active. Therefore, it may be desirable to reduce power to portions of the trace cache when those portions are not being used (e.g., by clock gating). In disclosed embodiments, prediction circuitry predicts whether a corresponding instruction fetch will hit in the trace cache. FIG. 24 provides an overview of controlling read enable for trace cache circuitry while FIGS. 25-27 provide examples of prediction circuitry configured to predict whether there will be a trace cache hit in specific scenarios (e.g., sequential, non-sequential, and return scenarios).

FIG. 24 is a block diagram illustrating example trace cache read prediction circuitry, according to some embodiments. In the illustrated example, the processor includes read prediction circuitry 2410, instruction cache 2430, trace cache circuitry 2420, and training circuitry 2440. Note that instruction cache 2430 may be configured as discussed above with reference to various disclosed instruction caches. Similarly, trace cache circuitry 2420 may correspond to various trace cache circuitry discussed herein (e.g., one or more of trace cache 110, L1 trace cache 1110, L2 trace cache 1120, etc.).

In the illustrated example, front-end circuitry (e.g., PC MUX 1902) provides a fetch group address to multiple instruction storage circuits (instruction cache 2430 and trace cache circuitry 2420 in this example).

Read prediction circuitry 2410, in the illustrated example, also receives the fetch group address and predicts whether the address will hit in the trace cache circuitry 2420. If a hit is predicted, circuitry 2410 may enable reads of the trace cache circuitry 2420. If a hit is not predicted, read prediction circuitry 2410 may not enable reads of the trace cache circuitry 242. For example, de-assertion of the read enable signal may cause clock gating, power gating, signal gating, etc. to one or more portions of trace cache circuitry 2420. Note that certain arrays of trace cache circuitry 2420 may be accessed for a given fetch group even when the read enable signal is not asserted (e.g., the tag array may be accessed to determine whether a given prediction was correct, for training purposes, even when the trace data array is clock gated).

Note that disclosed read prediction techniques may generally be conservative and attempt to disable trace cache reads only when there is a high degree of confidence that there will not be a hit in the trace cache. However, disclosed techniques may underpower (e.g., disable reads when there would have been a hit) or overpower (enable reads when a fetch address does not hit) the trace cache in certain scenarios. Note that some underpowering may be acceptable, given that the cost of predicting a miss when there would have been a hit is simply missing out on the performance gain of providing the instructions from the trace cache for that instance of executing the trace. Generally, the cost of predicting a hit that does not occur is unnecessary power consumption but may have no performance cost.

Note that read prediction circuitry 2410 may implement different prediction arrays for different scenarios, as discussed in detail below. Therefore, read prediction circuitry 2410 may include various combinations of the predictors discussed below with reference to FIGS. 25-27. Note that, in some embodiments, the prefetch buffers (e.g., trace fast NFP 1914 and fast array 1240) may remain powered even when corresponding trace cache hardware is operated in a reduced power state, which may advantageously leverage predictions by signature lookahead prefetch array 1230 to provide traces/targets from the prefetch buffers when read prediction circuitry 2410 does not predict a hit.

Training circuitry 2440, in the illustrated example, is configured to train read prediction circuitry based on trace cache hit information (e.g., based on whether prior accesses to the trace cache were hits). Example training techniques for specific scenarios are discussed in detail below.

FIG. 25 is a block diagram illustrating example read predictor circuitry for sequential addresses, according to some embodiments. In the illustrated example, the processor includes sequential predictor control circuitry 2510 and sequential predictor array circuitry 2520. Sequential predictor array 2520, in the illustrated example, implements entries that includes a virtual-address-based tag 2502, a prediction field 2504, and replacement information 2506.

The tag 2502 may include all a portion of a virtual address corresponding to a fetch group, for example. In other embodiments, the tag 2502 may be a hash of all or a portion of the virtual address. Tag 2502 may be used to check an incoming sequential fetch group address for a hit in the array. The prediction field 2504 indicates whether a hit in L1 trace cache 1110 is predicted for addresses that hit the tag field 2502. For example, the prediction field may utilize a saturating counter based on whether previous accesses hit in the trace cache. In some embodiments, array 2520 is initialized to predict that the STC will not be read, but quickly begins to predict reads based on trace cache hits.

Array 2520 is set associative, in some embodiments. Replacement field 2506 may be used to determine which entries to evict to allocate an entry for a new access, e.g., based on recency of use. Also, control circuitry 2510 may downgrade the replacement value of an entry when it predicts a trace cache read but the trace cache is not actually utilized.

Sequential predictor control 2510, as shown, checks the predictor array 2520 for a given sequential fetch group address and appropriately asserts or de-asserts the trace cache read enable signals. Control circuitry 2510 may also train entries in array 2520, allocate and de-allocate entries in array 2520, etc. For example, control circuitry 2510 may allocate an entry in array 2520 in response to trace cache training and potentially in other cases as well. In some embodiments, control circuitry 2510 is configured to establish an entry in array 2520 in response to a prefetch from signature lookahead prefetch array 1230, which may avoid an under-power scenario for the prefetched trace. Control circuitry 2510 may update the value of predictor field 2504 when there is a mismatch between the prediction and the actual hit or miss in a trace cache (e.g., an overpower situation where a hit was predicted and did not occur or an underpower situation where a miss was predicted and there was actually a hit). Note that this training (which detects under/overpower scenarios) may use trace cache tag information to determine hits and misses even when reads are not enabled. Therefore, the tag portion of a trace cache may remain enabled even when other portions (e.g., the trace data array) are clock gated.

FIG. 26 is a block diagram illustrating example read predictor information for non-sequential addresses, according to some embodiments. In the illustrated example, control circuitry (not explicitly shown) controls trace cache read enable field 2606 in a given entry of next fetch predictor array 2610. Note that next fetch predictor array 2610 may be included in next fetch predictor 1906 or trace next fetch predictor 1912, for example. In some embodiments, each next fetch predictor table implemented by the processor includes a trace cache read enable field.

Next fetch predictor array 2610, in the illustrated embodiment, implements the following fields for a given entry: tag field 2602, predictor data 2604, and trace cache read enable 2606. The tag 2602 may be compared with all or a portion of the current fetch group address, information derived from the fetch group address (e.g., a hash thereof), etc. The predictor data 2604 may include a predicted next fetch address. A given entry may also implement various cache control information such as validity information, retention information, etc. The trace cache read enable field 2606 indicates whether a trace cache hit is predicted for the predicted next fetch address.

In the illustrated example, in response to a hit in predictor array 2610, control circuitry accesses both the predicted next fetch address from predictor data 2604 and the trace cache read enable signal. If the trace cache read enable is asserted, trace cache(s) may be fully accessed for the predicted next fetch address.

As shown, control circuitry may train trace cache read enable field 2606 based on various events. In the illustrated example, the trace cache hit result is compared with the status of the read enable signal. If there is a mismatch, the control circuitry trains the entry (e.g., inverts the read enable field if it is a single bit). Note that field 2606 may be a single bit or may include multiple bits (e.g., implemented as a saturating counter, which may provide hysteresis for more accuracy at the cost of area/power for more bits).

In some embodiments, control circuitry is configured to initially set the read enable field 2606 to enable reads, e.g., in an optimistic/conservative approach. A pessimistic approach may be utilized in other embodiments, however.

Note that if a trace cache read enable field is implemented in both next fetch predictor 1906 and trace next fetch predictor 1912, power prediction may be provided for trace-to-trace transitions as well as transitions from control transfer instructions that are not included in a trace.

FIG. 27 is a block diagram illustrating example read predictor circuitry for return operations, according to some embodiments. In the illustrated example, return power predictor circuitry 2710 is configured to predict target addresses for return instructions (which may have multiple possible targets). Return power predictor circuitry 2710 also implements a trace cache read enable field per entry.

Tag field 2702, in the illustrated example, may be all or a portion of a program counter of the return instruction, or information derived therefrom. Return target prediction 2704 may include the predicted target address. Return power predictor 2710 may be configured to push these predictions onto a return address stack (RAS). Branch predictor bank enable 2706 may be used to determine whether to enable one or more banks of branch predictor(s) 1920. Trace cache read enable 2708, in the illustrated example, is used by control circuitry to predict whether the return target prediction will hit in a trace cache.

As shown, in response to a hit for an entry, return power predictor 2710 provides both the predicted next fetch address and the trace cache read enable signal. As shown, control circuitry may train field 2708 when there is a mismatch between the trace cache read enable signal and the hit result in the trace cache.

In some embodiments, if a return does not hit in the array of return power predictor 2710, the trace cache read enable signal is enabled (such that a trace cache read is the default state). Generally, the trace cache read may be enabled in the absence of information predicting that it will not be used.

Example Methods

FIG. 28 is a flow diagram illustrating an example method for operating hierarchical trace caches, according to some embodiments. The method shown in FIG. 28 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2810, in the illustrated embodiment, a processor (e.g., branch predictors 1920) predicts directions of executed control transfer instructions. These predictions may be used to form traces for caching in a trace cache.

At 2820, in the illustrated embodiment, the processor (e.g., training pipe 1934) identifies traces of instructions that satisfy one or more criteria, where one or more of the identified traces include at least one internal taken control transfer instruction.

At 2830, in the illustrated embodiment, the processor stores identified traces in one or both of first-level trace cache storage circuitry (e.g., L1 trace cache 1110) and second-level trace cache storage circuitry (e.g., L2 trace cache 1120).

At 2840, in the illustrated embodiment, the processor (e.g., prefetch control 1230) predicts that a trace will be executed by the processor circuitry. In some embodiments, prefetch circuitry predicts whether traces will be executed by the processor circuitry based on signature information that is generated based on addresses of instructions in an execution path. In some embodiments, the signature information is generated by an exclusive-OR operation between a given address (e.g., a branch address or branch target) and a previous signature. In some embodiments, the prediction is a lookahead prediction that predicts multiple cycles ahead of an address used to generate the signature information upon which the prediction is based.

At 2850, in the illustrated embodiment, the processor prefetches the predicted trace from the second-level trace cache storage circuitry to the first-level trace cache storage circuitry in response to the prediction.

In some embodiments the trace cache includes prefetch buffer circuitry (e.g., fast array 1240) configured to store a prefetched predicted trace from the second-level trace cache storage circuitry and provide the prefetched predicted trace for execution. In some embodiments, the trace cache is configured to promote the prefetched predicted trace from the prefetch buffer circuitry (e.g., into L1 trace cache 1110) based on one or more execution metrics corresponding to execution of the prefetch predicted trace.

In some embodiments, the processor (e.g., trace next fetch predictor 1912) is configured to predict a next fetch address for the processor front-end. In some embodiments, the prefetch circuitry prefetches a target address associated with the predicted trace into the next fetch predictor circuitry.

In some embodiments, the processor (e.g., trace cache filter circuitry 2010) determines whether to invalidate cached trace data in response to a cache maintenance operation. For example, the processor may, in response to a set of one or more cache maintenance operations, flush the entire first-level trace cache storage circuitry but use a filter to determine whether to flush a portion of the second-level trace cache storage circuitry.

For example, cache maintenance control circuitry (e.g., TLBI Bloom filter circuits 2130) may update the filter circuitry based on hashed virtual page numbers of fetch groups in traces written to the trace cache storage circuitry. In response to a hit in the filter circuitry, the cache maintenance control circuitry (e.g., L2 walk circuitry 2140) may walk the trace cache storage circuitry to determine a set of one or more cached traces to invalidate based on the cache maintenance operation and re-populate the filter circuitry based on the walk.

As another example, cache maintenance control circuitry (e.g., IC invalidate Bloom filter circuitry 2230) may update filter circuitry based on hashed physical page numbers of fetch groups in traces written to trace cache storage circuitry and store for a given entry in the trace cache storage circuitry, hashed physical page numbers of fetch groups included in the given trace. In response to a hit in the filter circuitry, the control circuitry (e.g., L2 walk circuitry 2240) may walk the trace cache storage circuitry to determine a set of one or more cached traces to invalidate that match a hashed physical page number of the cache maintenance operation and re-populate the filter circuitry based on the walk. In some embodiments, merge buffer circuitry (e.g., circuitry 2210) may merge multiple cache maintenance operations that target the same physical page.

As another example, the cache maintenance control circuitry may include permission circuitry configured to check permission information for memory pages corresponding to fetch groups of a given trace prior execution of the given trace. The permission circuitry may track, for a given cached trace in the second-level trace cache storage circuitry, locations of corresponding permission information for pages that include fetch groups in the given cached trace. The permission circuitry may use the tracked locations to verify permissions for the predicted trace prior to prefetching the predicted trace to the first-level trace cache storage circuitry.

Figure 29:
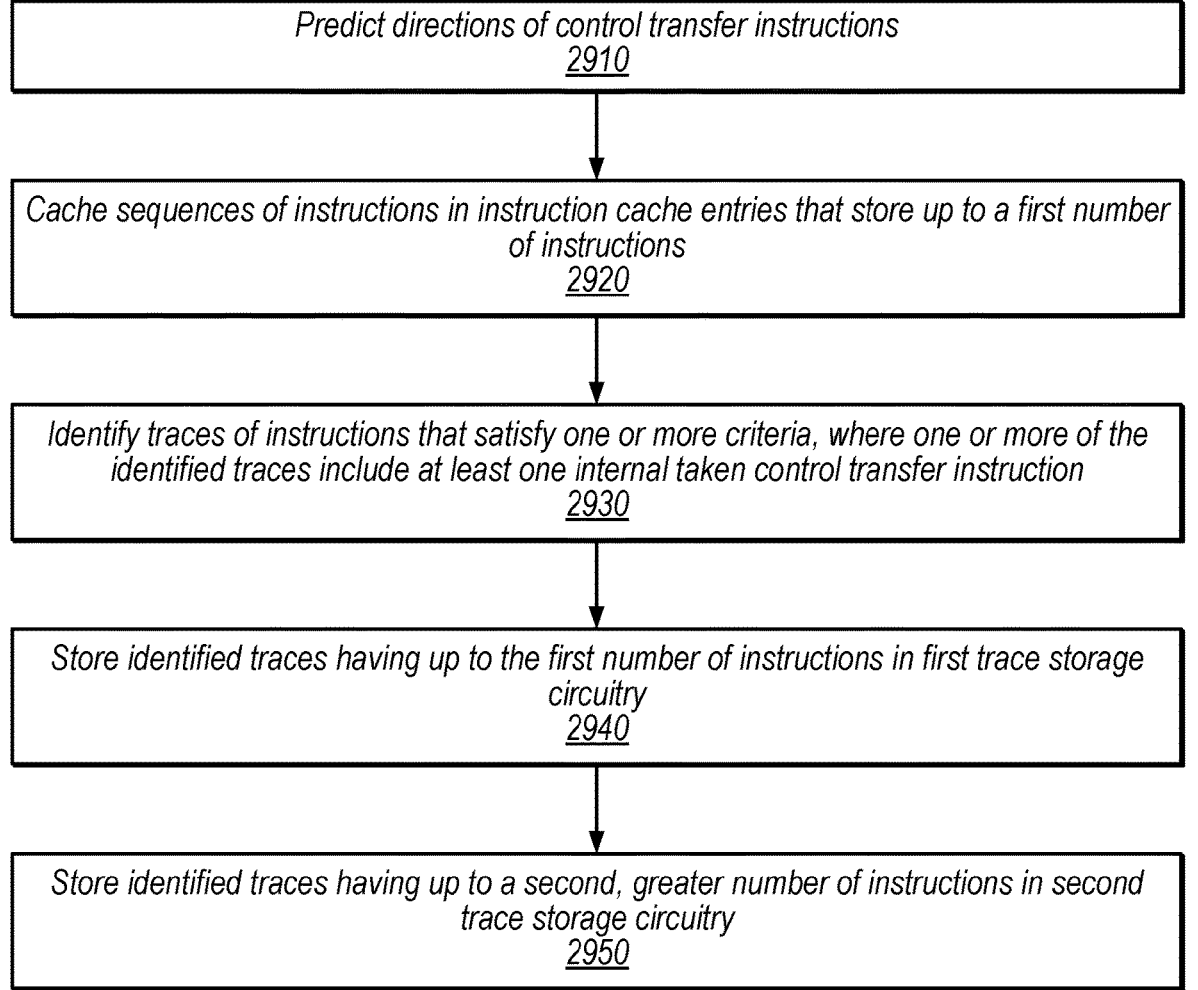
FIG. 29 is a flow diagram illustrating an example method for operating trace cache circuitry with entries that store different numbers of instructions per trace, according to some embodiments.

FIG. 29 is a flow diagram illustrating an example method for operating trace cache circuitry with entries that store different numbers of instructions per trace, according to some embodiments. The method shown in FIG. 29 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2910, in the illustrated embodiment, the processor (e.g., branch predictors 1920) predicts directions of control transfer instructions (e.g., that have been fetched and begun execution but not completed). These predictions may be used to form traces for caching in a trace cache (e.g., by forming traces with internal predicted-taken branches). These predictions may also be used to form wide sequences of instruction (e.g., with internal predicted-not-taken branches).

At 2920, in the illustrated embodiment, the processor caches sequences of instructions in instruction cache entries (e.g., in instruction cache 1925) that store up to a first number of instructions.

At 2930, in the illustrated embodiment, the processor identifies traces of instructions that satisfy one or more criteria, where one or more of the identified traces include at least one internal taken control transfer instruction.

At 2940, in the illustrated embodiment, the processor stores identified traces having up to the first number of instructions (e.g., N instructions as shown in FIG. 14) in first trace storage circuitry (e.g., in storage of L1 trace cache 1110).

At 2950, in the illustrated embodiment, the processor stores identified traces having up to a second, greater number of instructions (e.g., N+M instructions as shown in FIG. 14) in second trace storage circuitry (e.g., in storage of L2 trace cache 1120).

In some embodiments, instruction buffer circuitry (e.g., circuitry 1924) is configured to use a single entry to store a cache line or a trace from the first trace storage circuitry but is configured to use multiple entries to store a longer trace from the second trace storage circuitry.

In some embodiments, the processor is configured to provide instructions (e.g., to instruction buffer 1924) from one or both of the first trace storage circuitry and the second trace storage circuitry in response to detecting a hit (e.g., instead of providing instructions from the instruction cache or some other element of a cache/memory hierarchy). In some embodiments, the processor is configured to provide instructions for execution from the first trace storage circuitry but not the second trace storage circuitry (e.g., for timing reasons).

In some embodiments, the first trace storage circuitry is at a first level (e.g., L1) in a cache hierarchy and the second trace storage circuitry is at a second level (e.g., L2) in the cache hierarchy that is further from the processor circuitry than the first level. The trace cache circuitry may include prefetch circuitry configured to predict that a trace will be executed by the processor circuitry and prefetch the predicted trace from the second trace storage circuitry to the first trace storage circuitry in response to the prediction.

For wider traces (e.g., having the second number of instructions that is greater than supported by the first trace storage circuitry), the prefetch circuitry may instead prefetch a predicted trace into a prefetch buffer and provide the prefetched predicted trace for execution (the prefetch buffer circuitry may support traces having up to the second, greater number of instructions). In these embodiments, trace cache circuitry may promote entries from the prefetch buffer circuitry, having up to the first number of instructions, to the first trace storage circuitry but may be configured not to promote entries from the prefetch buffer circuitry having more than the first number of instructions (those traces may remain in the prefetch buffer for potential hits, however).

In some embodiments, the second trace storage circuitry includes overflow buffer circuitry and entries configured to store a pointer to an entry of the overflow buffer circuitry to store remaining instructions for a trace having more than the first number of instructions. In some embodiments, entries in the prefetch buffer natively support the second number of instructions and do not utilize an overflow buffer. In other embodiments, the first level trace cache may also support wider traces and may utilize an overflow buffer.

In some embodiments, the processor (e.g., control circuitry for L2 instruction cache 1120) is also configured to store a set of sequential instructions having up to the second number of instructions in the second trace storage circuitry, including up to a threshold number of predicted-not-taken control transfer instructions. These sequential fetch groups may not be referred to as traces because they do not include predicted-taken branches. They may still, however, benefit from the wide instruction storage provided by one or more trace cache levels. Therefore, the processor may fetch the set of sequential instructions from the second trace storage circuitry for execution in response to a hit (or prefetch the set of sequential instructions into a prefetch buffer in response to a predicted hit).

In some embodiments, the set of sequential instructions is allowed to include up to the second number of stable not-taken control transfer instructions (e.g., up to all of the instructions n the sequence) and up to the threshold number (e.g., a limited number supported by the number of reinterpreted branch predictor states) of unstable predicted-not-taken control transfer instructions. Note that the stable not-taken control transfer instructions may not be 100% biased in the taken direction but may satisfy a bias/stability threshold based on past execution, as discussed in detail above. In some embodiments, usefulness control circuitry tracks use of cached traces and sets of sequential instructions in the second trace storage circuitry and select entries for eviction based on the tracked use.

In some embodiments, for a set of sequential instructions stored in the second trace storage circuitry, the prediction circuitry is configured to maintain prediction information for a given set of sequential instructions, wherein the prediction information encodes one of multiple states (e.g., the states of FIG. 18), including: two or more states that indicate which control transfer instruction was taken among control transfer instructions in the set of sequential instructions (e.g., the TXX, NNT, and NTX states of FIG. 18) and a state that indicates that none of the control transfer instructions in the set of sequential instructions was taken (e.g., the NNN states of FIG. 18). In some embodiments, the prediction information includes at least two states that encode the same predicted directions for control transfer instructions in a given set of sequential instructions (e.g., the NNT strong and NNT weak states of FIG. 18), where different states of the at least two states correspond to different prediction confidence levels.

FIG. 30 is a flow diagram illustrating an example method for predicting hits in a trace cache, according to some embodiments. The method shown in FIG. 30 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 3010, in the illustrated embodiment, the processor (e.g., branch predictors 1920) predicts directions of control transfer instructions. These predictions may be used to form traces for caching in a trace cache.

At 3020, in the illustrated embodiment, the processor caches instructions sequentially in a given cache line of an instruction cache (e.g., instruction cache 1925).

At 3030, in the illustrated embodiment, the processor identifies traces of instructions that satisfy one or more criteria, where one or more of the identified traces include at least one internal taken control transfer instruction.

At 3040, in the illustrated embodiment, the processor stores identified traces in a trace cache.

At 3050, in the illustrated embodiment, the processor (e.g., read prediction circuitry 2410) predicts whether a fetch address will hit in the trace cache circuitry. In some embodiments, read predictor circuitry controls a read-enable field corresponding to a given entry in next fetch predictor circuitry to predict whether the next fetch address predicted by the next fetch predictor circuitry will hit in the trace cache circuitry (e.g., as shown in FIG. 26). For example, the prediction that the fetch address will not hit in the trace cache may be based on the read-enable field for a hit entry in the next fetch predictor circuitry.

In some embodiments, the read predictor circuitry includes sequential predictor array circuitry with entries that are tagged using at least a portion of a fetch address and include a prediction whether a sequential fetch address will hit in the trace cache circuitry. For example, the prediction may be based on an entry of the sequential predictor array circuitry. In some embodiments, the read predictor circuitry is configured to allocate an entry in the sequential predictor array in response to allocation of an entry for a trace in the trace cache circuitry (entries in the sequential predictor array may also be allocated for other reasons as well). Entries of the sequential predictor array may include a replacement field to track candidate entries for eviction.

In some embodiments, the read predictor circuitry uses a trace cache read enable field (e.g., in return predictor circuitry such as return power predictor 2710) that predicts whether a return target will hit in the trace cache circuitry. For example, the prediction that the fetch address will not hit in the trace cache is based on the trace cache read enable field. The return predictor circuitry may be configured to predict return targets for return instructions.

At 3060, in the illustrated embodiment, the processor reads, in response to a prediction that the fetch circuitry will not hit in the trace cache, instruction data from the instruction cache circuitry and not the trace cache circuitry for the fetch address (e.g., based on the read enable signal of FIG. 24). Note that if there is a miss in the instruction cache, the processor may wait for fill data before accessing the data from the instruction cache. The process front-end may reduce power to a portion of the trace cache (e.g., using clock gating) based on the read enable signal being de-asserted.

Note that the trace cache circuitry may include a tag array and a trace instruction storage array. The front-end circuitry may access the tag array but not the trace instruction storage array based on the prediction that the fetch address will not hit in the trace cache. The front-end circuitry may train the read prediction circuitry based on the access to the tag array and a comparison of whether the access was a hit with a prediction by the read prediction circuitry This may help meet timing targets, may aid in detecting trace cache under-power scenarios (e.g., when the trace cache is not used to provide instructions because it was predicted not to hit, but there was actually a hit), or both.

In some embodiments, for one or more categories of predictions, the read prediction circuitry is configured to provide conservative predictions that cannot include false miss predictions but are allowed to include false hits predictions. In some embodiments, one or more categories of predictions may lead to overpowering the trace cache (e.g., asserting read enable when there is a miss in the trace cache), underpowering the trace cache (e.g., de-asserting read enable when there would have been a hit in the trace cache), or both. In various embodiments, however, disclosed techniques may provide good prediction performance to allow the trace cache to provide performance increases while limiting overall trace cache power consumption, with reasonable area and power costs for the read prediction circuitry.

Note that the read enable predictor, in some embodiments, is separate from prefetch predictor (e.g., signature lookahead prefetch array 1230) and these predictors may operate in parallel.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

For a given program or portion of a program, flow typically proceeds in a sequential fashion. Consider the following group of instructions: ld mem1→r1; add r1, r2→r3; str3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

Example Device

Figure 31:
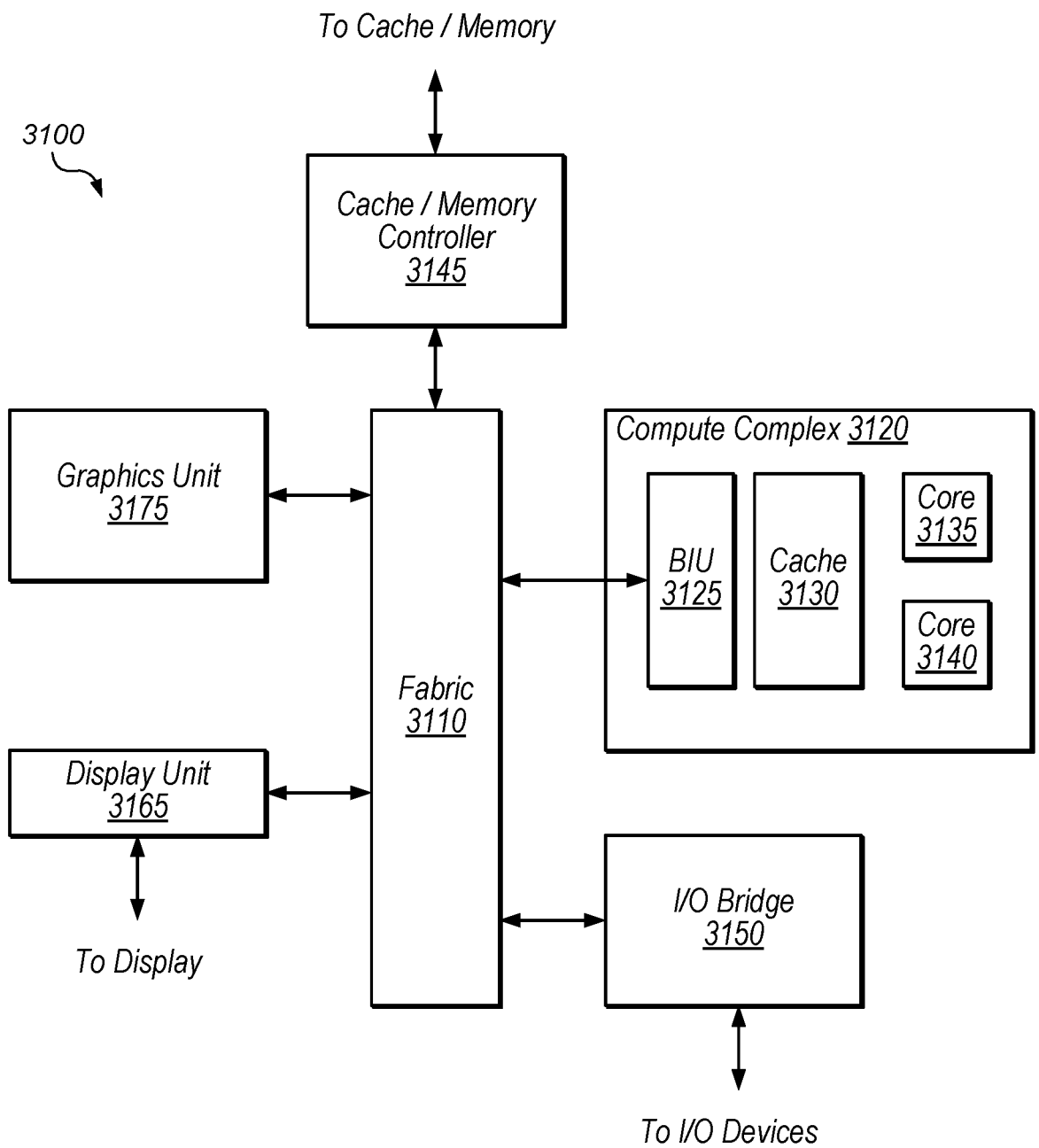
FIG. 31 is a block diagram illustrating an example computing device, according to some embodiments.

Referring now to FIG. 31, a block diagram illustrating an example embodiment of a device 3100 is shown. In some embodiments, elements of device 3100 may be included within a system on a chip. In some embodiments, device 3100 may be included in a mobile device, which may be battery-powered. Therefore, power consumption by device 3100 may be an important design consideration. In the illustrated embodiment, device 3100 includes fabric 3110, compute complex 3120 input/output (I/O) bridge 3150, cache/memory controller 3145, graphics unit 3175, and display unit 3165. In some embodiments, device 3100 may include other components (not shown) in addition to or in place of the illustrated components, such as video processor encoders and decoders, image processing or recognition elements, computer vision elements, etc.

Fabric 3110 may include various interconnects, buses, MUX's, controllers, etc., and may be configured to facilitate communication between various elements of device 3100. In some embodiments, portions of fabric 3110 may be configured to implement various different communication protocols. In other embodiments, fabric 3110 may implement a single communication protocol and elements coupled to fabric 3110 may convert from the single communication protocol to other communication protocols internally.

In the illustrated embodiment, compute complex 3120 includes bus interface unit (BIU) 3125, cache 3130, and cores 3135 and 3140. In various embodiments, compute complex 3120 may include various numbers of processors, processor cores and caches. For example, compute complex 3120 may include 1, 2, or 4 processor cores, or any other suitable number. In one embodiment, cache 3130 is a set associative L2 cache. In some embodiments, cores 3135 and 3140 may include internal instruction and data caches. In some embodiments, a coherency unit (not shown) in fabric 3110, cache 3130, or elsewhere in device 3100 may be configured to maintain coherency between various caches of device 3100. BIU 3125 may be configured to manage communication between compute complex 3120 and other elements of device 3100. Processor cores such as cores 3135 and 3140 may be configured to execute instructions of a particular instruction set architecture (ISA) which may include operating system instructions and user application instructions. These instructions may be stored in computer readable medium such as a memory coupled to memory controller 3145 discussed below.

In various embodiments, disclosed trace cache techniques may improve front-end performance for compute complex 3120, reduce power consumption, or both relative to traditional techniques.

As used herein, the term "coupled to" may indicate one or more connections between elements, and a coupling may include intervening elements. For example, in FIG. 31, graphics unit 3175 may be described as "coupled to" a memory through fabric 3110 and cache/memory controller 3145. In contrast, in the illustrated embodiment of FIG. 31, graphics unit 3175 is "directly coupled" to fabric 3110 because there are no intervening elements.

Cache/memory controller 3145 may be configured to manage transfer of data between fabric 3110 and one or more caches and memories. For example, cache/memory controller 3145 may be coupled to an L3 cache, which may in turn be coupled to a system memory. In other embodiments, cache/memory controller 3145 may be directly coupled to a memory. In some embodiments, cache/memory controller 3145 may include one or more internal caches. Memory coupled to controller 3145 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc.

One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 3145 may be any type of non-volatile memory such as NAND flash memory, NOR flash memory, nano RAM (NRAM), mag-neto-resistive RAM (MRAM), phase change RAM (PRAM), Racetrack memory, Memristor memory, etc. As noted above, this memory may store program instructions executable by compute complex 3120 to cause the comput-ing device to perform functionality described herein.

Graphics unit 3175 may include one or more processors, e.g., one or more graphics processing units (GPUs). Graph-ics unit 3175 may receive graphics-oriented instructions, such as OPENGL®, Metal®, or DIRECT3D® instructions, for example. Graphics unit 3175 may execute specialized GPU instructions or perform other operations based on the received graphics-oriented instructions. Graphics unit 3175 may generally be configured to process large blocks of data in parallel and may build images in a frame buffer for output to a display, which may be included in the device or may be a separate device. Graphics unit 3175 may include trans-form, lighting, triangle, and rendering engines in one or more graphics processing pipelines. Graphics unit 3175 may output pixel information for display images. Graphics unit 3175, in various embodiments, may include programmable shader circuitry which may include highly parallel execution cores configured to execute graphics programs, which may include pixel tasks, vertex tasks, and compute tasks (which may or may not be graphics-related).

Display unit 3165 may be configured to read data from a frame buffer and provide a stream of pixel values for display. Display unit 3165 may be configured as a display pipeline in some embodiments. Additionally, display unit 3165 may be configured to blend multiple frames to produce an output frame. Further, display unit 3165 may include one or more interfaces (e.g., MIPI® or embedded display port (eDP)) for coupling to a user display (e.g., a touchscreen or an external display).

I/O bridge 3150 may include various elements configured to implement: universal serial bus (USB) communications, security, audio, and low-power always-on functionality, for example. I/O bridge 3150 may also include interfaces such as pulse-width modulation (PWM), general-purpose input/output (GPIO), serial peripheral interface (SPI), and inter-integrated circuit (I2C), for example. Various types of peripherals and devices may be coupled to device 3100 via I/O bridge 3150.

In some embodiments, device 3100 includes network interface circuitry (not explicitly shown), which may be connected to fabric 3110 or I/O bridge 3150. The network interface circuitry may be configured to communicate via various networks, which may be wired, wireless, or both. For example, the network interface circuitry may be con-figured to communicate via a wired local area network, a wireless local area network (e.g., via Wi-Fi™), or a wide area network (e.g., the Internet or a virtual private network). In some embodiments, the network interface circuitry is configured to communicate via one or more cellular net-works that use one or more radio access technologies. In some embodiments, the network interface circuitry is con-figured to communicate using device-to-device communi-cations (e.g., Bluetooth® or Wi-Fi™ Direct), etc. In various embodiments, the network interface circuitry may provide device 3100 with connectivity to various types of other devices and networks.

Example Applications

Figure 32:
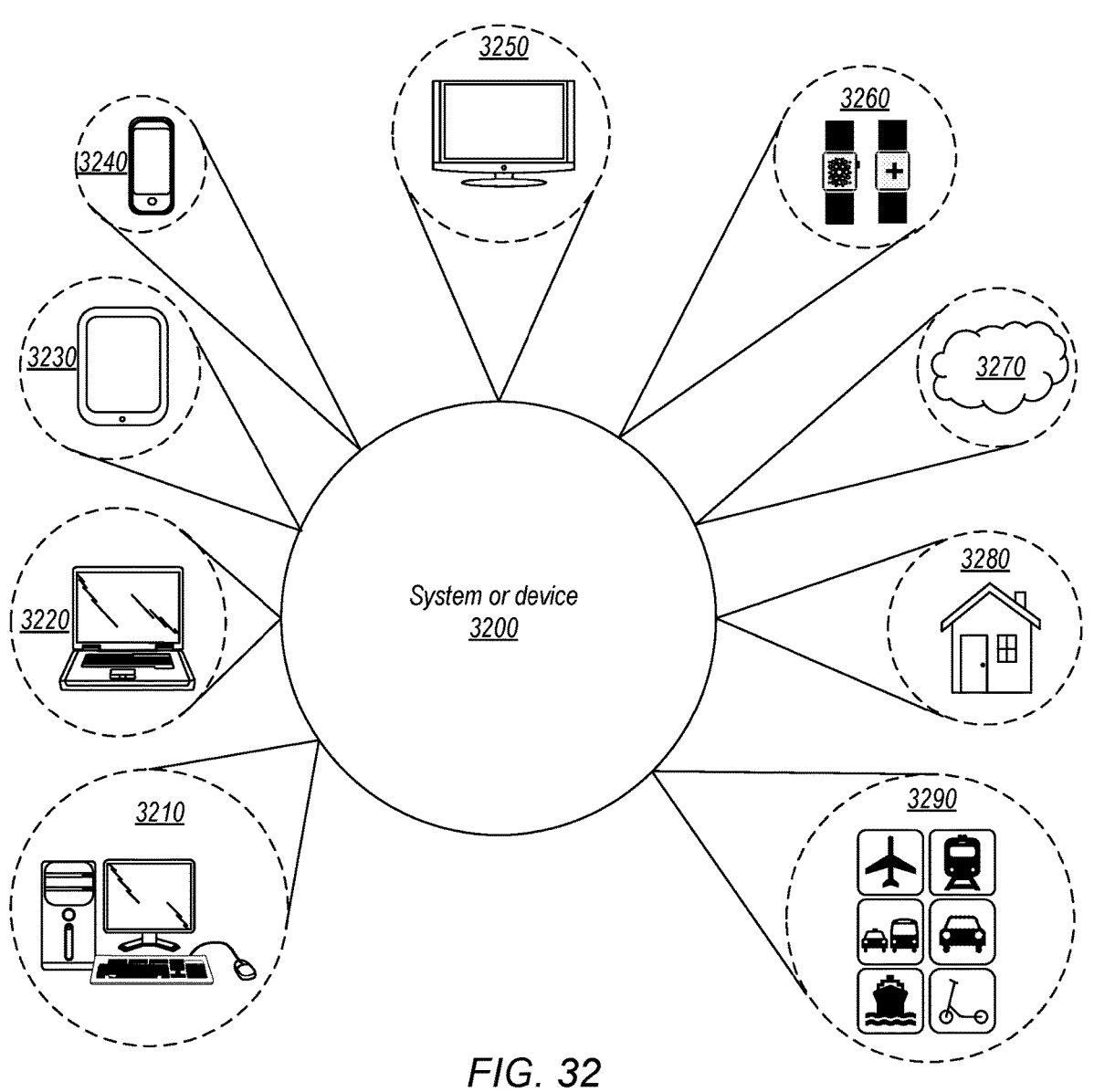
FIG. 32 is a diagram illustrating example applications of disclosed systems and devices, according to some embodiments.

Turning now to FIG. 32, various types of systems that may include any of the circuits, devices, or system discussed above. System or device 3200, which may incorporate or otherwise utilize one or more of the techniques described herein, may be utilized in a wide range of areas. For example, system or device 3200 may be utilized as part of the hardware of systems such as a desktop computer 3210, laptop computer 3220, tablet computer 3230, cellular or mobile phone 3240, or television 3250 (or set-top box coupled to a television).

Similarly, disclosed elements may be utilized in a wear-able device 3260, such as a smartwatch or a health-moni-toring device. Smartwatches, in many embodiments, may implement a variety of different functions—for example, access to email, cellular service, calendar, health monitor-ing, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 3200 may also be used in various other contexts. For example, system or device 3200 may be utilized in the context of a server computer system, such as a dedicated server or on shared hardware that implements a cloud-based service 3270. Still further, system or device 3200 may be implemented in a wide range of specialized everyday devices, including devices 3280 commonly found in the home such as refrigerators, thermostats, security cameras, etc. The interconnection of such devices is often referred to as the "Internet of Things" (IoT). Elements may also be implemented in various modes of transportation. For example, system or device 3200 could be employed in the control systems, guidance systems, entertainment systems, etc. of various types of vehicles 3290.

The applications illustrated in FIG. 32 are merely exem-plary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hard-ware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 33:
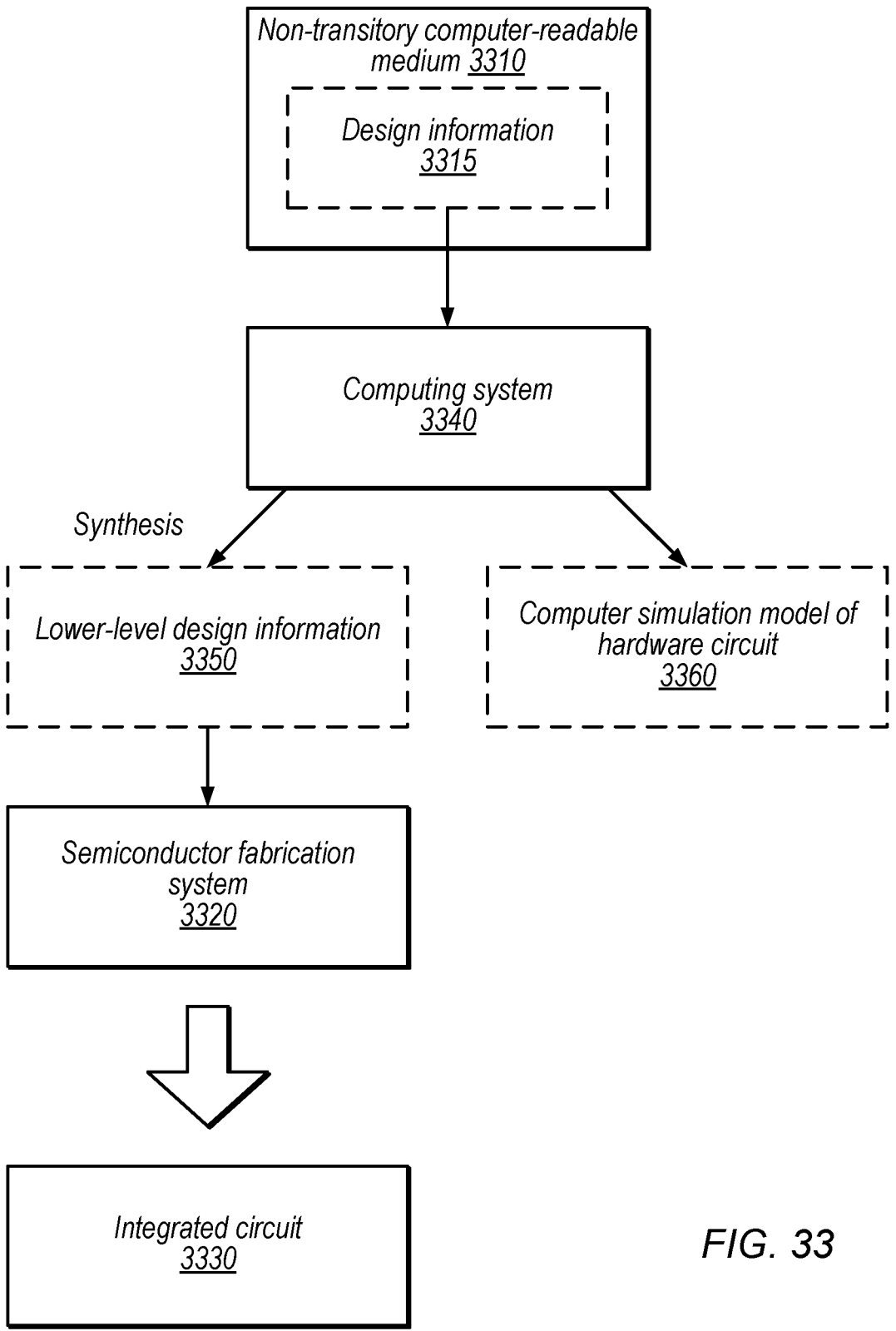
FIG. 33 is a block diagram illustrating an example computer-readable medium that stores circuit design information, according to some embodiments.

FIG. 33 is a block diagram illustrating an example non-transitory computer-readable storage medium that stores circuit design information, according to some embodiments. In the illustrated embodiment, computing system 3340 is configured to process the design information. This may include executing instructions included in the design information, interpreting instructions included in the design information, compiling, transforming, or otherwise updating the design information, etc. Therefore, the design information controls computing system 3340 (e.g., by programming computing system 3340) to perform various operations discussed below, in some embodiments.

In the illustrated example, computing system 3340 processes the design information to generate both a computer simulation model of a hardware circuit 3360 and lower-level design information 3350. In other embodiments, computing system 3340 may generate only one of these outputs, may generate other outputs based on the design information, or both. Regarding the computing simulation, computing system 3340 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 3340 also processes the design information to generate lower-level design information 3350 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 3350 (potentially among other inputs), semiconductor fabrication system 3320 is configured to fabricate an integrated circuit 3330 (which may correspond to functionality of the simulation model 3360). Note that computing system 3340 may generate different simulation models based on design information at various levels of description, including information 3350, 3315, and so on. The data representing design information 3350 and model 3360 may be stored on medium 3310 or on one or more other media.

In some embodiments, the lower-level design information 3350 controls (e.g., programs) the semiconductor fabrication system 3320 to fabricate the integrated circuit 3330. Thus, when processed by the fabrication system, the design information may program the fabrication system to fabricate a circuit that includes various circuitry disclosed herein.

Non-transitory computer-readable storage medium 3310, may comprise any of various appropriate types of memory devices or storage devices. Non-transitory computer-readable storage medium 3310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 3310 may include other types of non-transitory memory as well or combinations thereof. Accordingly, non-transitory computer-readable storage medium 3310 may include two or more memory media;

such media may reside in different locations—for example, in different computer systems that are connected over a network.

Design information 3315 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 3340, semiconductor fabrication system 3320, or both. In some embodiments, design information may also include one or more cell libraries that specify the synthesis, layout, or both of integrated circuit 3330. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 3330 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 3320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 3320 may also be configured to perform various testing of fabricated circuits for correct operation.

In various embodiments, integrated circuit 3330 and model 3360 are configured to operate according to a circuit design specified by design information 3315, which may include performing any of the functionality described herein. For example, integrated circuit 3330 may include any of various elements shown in FIGS. 1, 4-8, 11-12, 14, 19-27, and 31. Further, integrated circuit 3330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 3320 to fabricate integrated circuit 3330.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on"

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:

processor circuitry configured to execute control transfer instructions;

prediction circuitry configured to predict directions of control transfer instructions;

instruction cache circuitry configured to cache instructions sequentially in a given cache line;

trace cache circuitry configured to:

identify traces of instructions that satisfy one or more criteria, wherein one or more of the identified traces include at least one internal taken control transfer instruction; and store identified traces;

read prediction circuitry configured to predict whether a fetch address will hit in the trace cache circuitry; and front-end circuitry configured to, in response to a prediction that the fetch address will not hit in the trace cache circuitry:

access tag circuitry for the trace cache circuitry based on the fetch address;

read instruction data from the instruction cache circuitry for the fetch address; and prevent instruction data being read from the trace cache circuitry for the fetch address regardless of whether there is a tag match in the tag circuitry.

2. The apparatus of claim 1, further comprising:

next fetch predictor circuitry configured to predict a next fetch address for the processor circuitry;

wherein:

the read prediction circuitry is configured to control a read-enable field corresponding to a given entry in the next fetch predictor circuitry to predict whether the next fetch address predicted by the next fetch predictor circuitry will hit in the trace cache circuitry; and the prediction that the fetch address will not hit in the trace cache is based on the read-enable field for a hit entry in the next fetch predictor circuitry.

3. The apparatus of claim 1, wherein:

the read prediction circuitry includes sequential predictor array circuitry with entries that are tagged using at least a portion of a fetch address and include a prediction whether a sequential fetch address will hit in the trace cache circuitry; and the prediction is based on an entry of the sequential predictor array circuitry.

4. The apparatus of claim 3, wherein the read prediction circuitry is configured to allocate an entry in the sequential predictor array circuitry in response to allocation of an entry for a trace in the trace cache circuitry.

5. The apparatus of claim 3, wherein entries of the sequential predictor array further include a replacement field to track candidate entries for eviction.

6. The apparatus of claim 1, further comprising:

return predictor circuitry configured to:

predict return targets for return instructions; and store a trace cache read enable field that predicts whether a return target will hit in the trace cache circuitry;

wherein the prediction that the fetch address will not hit in the trace cache is based on the trace cache read enable field.

7. The apparatus of claim 1, wherein the processor circuitry is configured to determine whether to access instructions from the instruction cache circuitry or the trace cache circuitry when there is a hit in both the trace cache circuitry and the instruction cache circuitry.

8. The apparatus of claim 1, wherein the front-end circuitry is configured to train the read prediction circuitry based on the access to the tag circuitry and a comparison of whether the access was a hit with a prediction by the read prediction circuitry.

9. The apparatus of claim 1, further comprising:

prefetch circuitry configured to:

predict that a trace will be executed by the processor circuitry; and prefetch the predicted trace from second-level trace cache storage circuitry to first-level trace cache storage circuitry in response to the prediction.

10. The apparatus of claim 1, wherein the front-end circuitry is further configured to, in response to the prediction that the fetch address will not hit in the trace cache, reduce power to a portion of the trace cache.

11. A method, comprising:

predicting, by a computing system, directions of control transfer instructions executed by a processor of the computing system;

caching, by the computing system in instruction cache circuitry, instructions sequentially in a given cache line;

identifying, by the computing system, traces of instructions that satisfy one or more criteria, wherein one or more of the identified traces include at least one internal taken control transfer instruction;

storing, by the computing system in a trace cache, identified traces;

predicting, by the computing system, whether a fetch address will hit in the trace cache; and in response to a prediction that the fetch address will not hit in the trace cache;

accessing tag circuitry for the trace cache based on the fetch address;

reading instruction data from the instruction cache circuitry for the fetch address; and preventing instruction data being read from not the trace cache for the fetch address regardless of whether there is a tag match in the tag circuitry.

12. The method of claim 11, further comprising:

controlling, by the computing system, a read-enable field corresponding to a given entry in a next fetch predictor to predict whether a next fetch address predicted by the next fetch predictor will hit in the trace cache;

wherein the prediction that the fetch address will not hit in the trace cache is based on the read-enable field for a hit entry in the next fetch predictor.

13. The method of claim 11, further comprising:

controlling, by the computing system, one or more entries of a sequential predictor, wherein entries of the sequential predictor are tagged using at least a portion of a fetch address and include a prediction whether a sequential fetch address will hit in the trace cache;

wherein the prediction that the fetch address will not hit in the trace cache is based on a hit entry of the sequential predictor.

14. The method of claim 11, further comprising:

predicting, by the computing system using a return predictor, return targets for return instructions; and storing, by the computing system, a value in a trace cache read enable field of the return predictor, wherein the read enable field predicts whether a return target will hit in the trace cache;

wherein the prediction that the fetch address will not hit in the trace cache is based on the trace cache read enable field.

15. The method of claim 11, further comprising:

in response to hits in both the trace cache and the instruction cache circuitry when a hit in the trace cache is predicted, determining to access instructions from the trace cache and not the instruction cache circuitry.

16. The method of claim 11, further comprising:

predicting, by the computing system, that a trace will be executed by the processor; and prefetching, by the computing system, the predicted trace from second-level trace cache storage circuitry to first-level trace cache storage circuitry in response to the prediction.

17. The method of claim 11, further comprising:

in response to the prediction that the fetch address will not hit in the trace cache, the computing system reducing power to a portion of the trace cache.

18. A non-transitory computer-readable medium having instructions of a hardware description programming language stored thereon that, when processed by a computing system, program the computing system to generate a computer simulation model, wherein the model represents a hardware circuit that includes:

processor circuitry configured to execute control transfer instructions;

prediction circuitry configured to predict directions of control transfer instructions;

instruction cache circuitry configured to cache instructions sequentially in a given cache line;

trace cache circuitry configured to:

identify traces of instructions that satisfy one or more criteria, wherein one or more of the identified traces include at least one internal taken control transfer instruction; and store identified traces, wherein the processor circuitry is configured to determine whether to access instructions from the instruction cache circuitry or the trace cache circuitry when there is a hit in both the trace cache circuitry and the instruction cache circuitry;

read prediction circuitry configured to predict whether a fetch address will hit in the trace cache circuitry; and front-end circuitry configured to, in response to a prediction that the fetch address will not hit in the trace cache circuitry:

access tag circuitry for the trace cache circuitry based on the fetch address;

read instruction data from the instruction cache circuitry for the fetch address; and prevent instruction data being read from not the trace cache circuitry for the fetch address regardless of whether there is a tag match in the tag circuitry.

19. The non-transitory computer-readable medium of claim 18, wherein the hardware circuit represented by the model further includes:

next fetch predictor circuitry configured to predict a next fetch address for the processor circuitry;

wherein:

the read prediction circuitry is configured to control a read-enable field corresponding to a given entry in the next fetch predictor circuitry to predict whether the next fetch address predicted by the next fetch predictor circuitry will hit in the trace cache circuitry; and the prediction that the fetch address will not hit in the trace cache is based on the read-enable field for a hit entry in the next fetch predictor circuitry.

20. The non-transitory computer-readable medium of claim 18, wherein:

the read prediction circuitry includes sequential predictor array circuitry with entries that are tagged using at least a portion of a fetch address and include a prediction whether a sequential fetch address will hit in the trace cache circuitry; and the prediction is based on an entry of the sequential predictor array circuitry.

* * * * *